(12) United States Patent
Olson et al.

(10) Patent No.: US 11,582,196 B2
(45) Date of Patent: Feb. 14, 2023

(54) SYSTEM FOR MANAGING AND CONTROLLING MESH VIRTUAL PRIVATE NETWORK AND METHOD ASSOCIATED THEREWITH

(71) Applicant: DATTO, INC., Norwalk, CT (US)

(72) Inventors: Zachary Kenneth Olson, Rochester, NY (US); Shashidhar Lakkavalli, Portland, OR (US)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 17/379,006

(22) Filed: Jul. 19, 2021

(65) Prior Publication Data
US 2022/0141190 A1 May 5, 2022

Related U.S. Application Data

(60) Provisional application No. 63/108,679, filed on Nov. 2, 2020.

(51) Int. Cl.
*H04L 9/40* (2022.01)
*H04L 12/46* (2006.01)
*H04L 67/104* (2022.01)
*G06F 9/451* (2018.01)

(52) U.S. Cl.
CPC ...... *H04L 63/0272* (2013.01); *H04L 12/4641* (2013.01); *H04L 67/104* (2013.01); *G06F 9/452* (2018.02)

(58) Field of Classification Search
CPC ............ H04L 63/0272; H04L 12/4641; H04L 67/104; G06F 9/452
See application file for complete search history.

(56) References Cited

U.S. PATENT DOCUMENTS

| 7,447,901 B1 | 11/2008 | Sullenberger et al. |
| 7,801,030 B1 | 9/2010 | Aggarwal et al. |

(Continued)

OTHER PUBLICATIONS

Pennarun, Avery, How Tailscale Works, downloaded from the Internet on Mar. 16, 2021, https://tailscale.com/blog/how-tailscale-works/, Mar. 20, 2020—15 pages.

(Continued)

*Primary Examiner* — Blake J Rubin
(74) *Attorney, Agent, or Firm* — Maschoff Brennan

(57) ABSTRACT

A system for managing and controlling a mesh VPN includes a management computing platform, a control computing platform, teleworker computing subsystems, and an office computing subsystem. The management computing platform provides deployment and management services to an organization for operation of a mesh VPN in a WAN in accordance with a service profile. The mesh VPN includes a hub node and a plurality of end nodes. Each end node communicates with the VPN hub node and with other end nodes via peer-to-peer paths. The control computing platform is the hub node and provide a control service for operation of the mesh VPN based on the service profile. The teleworker and office computing subsystems are end nodes. Various methods for operation of the computing platforms and subsystems in the mesh VPN are also provided.

21 Claims, 34 Drawing Sheets

(56) References Cited

U.S. PATENT DOCUMENTS

| | | | |
|---|---|---|---|
| 8,260,922 B1* | 9/2012 | Aggarwal | H04L 45/24 |
| | | | 709/239 |
| 8,443,435 B1 | 5/2013 | Schroeder | |
| 9,531,766 B2* | 12/2016 | Young | H04L 12/4679 |
| 11,343,247 B1* | 5/2022 | Ozarkar | H04L 63/0471 |
| 2004/0223497 A1 | 11/2004 | Sanderson et al. | |
| 2005/0223111 A1 | 10/2005 | Bhandaru et al. | |
| 2012/0054487 A1 | 3/2012 | Sun et al. | |
| 2013/0182712 A1* | 7/2013 | Aguayo | H04L 12/4633 |
| | | | 370/395.53 |
| 2015/0188949 A1 | 7/2015 | Mahaffey et al. | |
| 2015/0263865 A1 | 9/2015 | Rangarajan et al. | |
| 2015/0372982 A1 | 12/2015 | Herle et al. | |
| 2016/0359811 A1* | 12/2016 | Chan | H04L 12/6418 |
| 2016/0373372 A1* | 12/2016 | Gillon | H04L 43/0882 |
| 2017/0195161 A1 | 7/2017 | Ruel et al. | |
| 2017/0310640 A1 | 10/2017 | Chechani et al. | |
| 2018/0234456 A1 | 8/2018 | Adams et al. | |
| 2018/0343146 A1* | 11/2018 | Dunbar | H04L 45/50 |
| 2018/0375760 A1 | 12/2018 | Saavedra | |
| 2019/0253393 A1* | 8/2019 | Syvänne | H04L 63/0272 |
| 2019/0372936 A1* | 12/2019 | Sullenberger | H04L 63/164 |
| 2020/0145256 A1* | 5/2020 | Medamana | H04L 67/306 |
| 2020/0252234 A1* | 8/2020 | Ramamoorthi | H04L 45/22 |
| 2021/0036887 A1* | 2/2021 | Meng | H04L 12/66 |
| 2021/0168061 A1* | 6/2021 | Kolesnik | H04L 43/0882 |
| 2021/0185011 A1* | 6/2021 | Zhang | H04L 63/107 |
| 2021/0288881 A1* | 9/2021 | Zhang | H04L 12/4633 |
| 2022/0124019 A1* | 4/2022 | Boutros | H04L 45/02 |

OTHER PUBLICATIONS

Ilyoung Chong Hufs Korea (Republic of) Jeong Yun Kim et al., "Revision 3 for Proposed amendments to draft Y.ngn-vpn (May 14, 2009)", ITU-T Draft ; Study Period 2009-2012, International Telecommunication Union, Geneva; CH, vol. 3/13, Sep. 13, 2010 (Sep. 13, 2010), p. 1-27, XP017440165.

International Search Report and Written Opinion for International Application No. PCT/US2021/057544 dated Sep. 23, 2022.

* cited by examiner

SYSTEM FOR MANAGING AND CONTROLLING MESH VIRTUAL PRIVATE NETWORK AND METHOD ASSOCIATED THEREWITH

CROSS-REFERENCE TO RELATED APPLICATION

This application claims priority to and the benefit of U.S. Provisional Patent Application Ser. No. 63/108,679, filed Nov. 2, 2020 and entitled WIDE AREA NETWORK MESH VIRTUAL PRIVATE NETWORK, the contents of which are fully incorporated herein by reference.

BACKGROUND

The present exemplary embodiment relates to a system and an associated method that provides a mesh virtual private network (VPN) service to an organization that enables teleworkers at remote sites to communicate with services at office sites and other VPN nodes. The system includes VPN computing platforms for deployment and management of the mesh VPN service. The VPN computing platforms also control operation of the mesh VPN. It finds application in conjunction with adaptively selecting communication paths for VPN tunnels between VPN nodes and other routing considerations in response to degraded and failed network conditions and will be described with particular reference thereto. The various embodiments disclosed herein permit continuation of the mesh VPN service during such network conditions with minimal impact on teleworkers and other users of the mesh VPN. However, it is to be appreciated that the various exemplary embodiments of the system and associated method are also amenable to other network conditions and various scenarios for operation of the mesh VPN.

In conventional VPN topologies, multiple end-clients may connect to a single client aggregator (e.g., a VPN concentrator), which is then configured with tunnels to one or more (hub) endpoints. However, in some situations, it is desirable to provide internet traffic security services without having to pass all the traffic through a client aggregator. Further, it is desirable to provide such services with redundancy and failover alternatives to keep the network safe and stable.

U.S. Patent Publication No. 2004/0223497 A1, published on Nov. 11, 2004 and entitled "Communications Network with Converged Services", describes a communications network that provides shared services to customers over a respective VPN, wherein trust and security are established at the edge of the network, thereby reducing the number of security measures required within the shared service VPN.

U.S. Patent Publication No. 2005/0223111 A1, published on Oct. 6, 2005 and entitled "Secure, Standards-Based Communications Across A Wide-Area Network", describes extending security features from enterprise networks to wide-area networks by allowing secure connectivity to the enterprise layer network across a wide-area layer network, such as the Internet.

U.S. Pat. No. 8,443,435 B1, issued on May 14, 2013 and entitled "VPN Resource Connectivity in Large-Scale Enterprise Networks", describes techniques for managing VPN access to enterprise resources for large-scale enterprises that have multiple VPN concentrators.

U.S. Patent Publication No. 2015/0188949 A1, published on Jul. 2, 2015 and entitled "Cloud-Based Network Security", describes techniques for providing security by authenticating users in a cloud-based security platform and by managing the use of gateways on a network.

U.S. Patent Publication No. 2015/0372982 A1, published on Dec. 24, 2015 and entitled "Intelligent, Cloud-Based Global Virtual Private Network Systems and Methods", describes systems and methods for an intelligent, cloud-based global VPN with edge security, wherein the systems and methods dynamically create a connection through a secure tunnel between three entities (an endpoint, a cloud, and an on-premises redirection proxy) and the connection between the cloud and the on-premises proxy is dynamic, on-demand, and orchestrated by the cloud.

U.S. Patent Publication No. 2015/0263865 A1, published on Sep. 17, 2015 and entitled "Dynamic and Interoperable Generation of Stateful VPN Connection Profiles for Computing Devices", describes systems and methods that enable a computing device to dynamically generate VPN connection profiles to which policies, such as tariff-based policies and multi-network connection policies, can be mapped and then subsequently enforced.

U.S. Patent Publication No. 2018/0234456 A1, published on Aug. 16, 2018 and entitled "System and Method for Creating Encrypted Virtual Private Network Hotspot", describes systems and methods for extending zones of control through a hotspot for communications to and from computing devices based on specific criteria corresponding to zones on control.

U.S. Patent Publication No. 2018/0375760 A1, published on Dec. 27, 2018 and entitled "System, Apparatus and Method for Providing a Virtual Network Edge and Overlay with Virtual Control Plane", describes network infrastructures with utilization of diverse carriers and diverse connections via high-quality link aggregation in combination with a secured and trusted virtual network overlay, wherein the virtual network overlay can allow a managed and encrypted connection of virtual links to provide a virtual wide area network (WAN).

U.S. Patent Publication No. 2017/0310640 A1, published Oct. 26, 2017 and entitled "Mobile Hotspot Managed by Access Controller", describes systems and methods for a mobile hotspot that can be managed by an access controller, wherein a WAN connection is established by a mobile hotspot located outside of range of access points (APs) of a wireless network of an enterprise through a telecommunication data network via a wireless WAN module of the mobile hotspot.

These and other similar systems all face various drawbacks. For example, VPN systems with network address translation (NAT) setups suffer from a loss of performance, inability to initiate communication with clients behind an AP from the office, and a loss of security control and response efficacy, especially for cloud-based access control lists (ACLs) or security services. Distributed systems performing static addressing from managed "sub-pools" incur difficulty scaling the quantity of network nodes, resizing managed subnets, and accounting for APs which have more or fewer clients than average. Further, systems implementing Open Systems Interconnection (OSI) layer 2 tunneling mechanisms incur performance and scalability issues across geographically distributed network endpoints. This increases the complexity and overhead of securing and monitoring connections between clients within the same network and may not be desirable for security reasons in a distributed environment. Thus, it is desirable to provide WAN mesh VPN solutions without the drawbacks mentioned above.

BRIEF DESCRIPTION

In one aspect, a system for managing and controlling a mesh virtual private network (VPN) is provided. In one embodiment, the system includes a VPN management computing platform, a VPN control computing platform, a first teleworker computing subsystem, a second teleworker computing subsystem, and an office computing subsystem. The VPN management computing platform is configured to provide a deployment service and a management service to an organization in conjunction with operation of a mesh VPN in a wide area network (WAN) in accordance with a mesh VPN service profile. The mesh VPN includes a VPN hub node and a plurality of VPN end nodes. Each of the plurality of VPN end nodes is configured to communicate with the VPN hub node via at least one spoke communication path to form a star VPN topology. Each of the plurality of VPN end nodes is configured to communicate with at least one other VPN end node via peer-to-peer communication paths between the plurality of VPN end nodes that form at least a partial mesh VPN topology. The VPN control computing platform in operative communication with the VPN management computing platform. The VPN control computing platform is configured to implement the VPN hub node and configured to provide a control service for operation of the mesh VPN in accordance with the mesh VPN service profile. The first teleworker computing subsystem in operative communication with the VPN management computing platform and the VPN control computing platform. The first teleworker computing subsystem is configured to implement a first VPN end node of the plurality of VPN end nodes and configured to use the mesh VPN in accordance with the mesh VPN service profile. The second teleworker computing subsystem in operative communication with the VPN management computing platform and the VPN control computing platform. The second teleworker computing subsystem is configured to implement a second VPN end node of the plurality of VPN end nodes and configured to use the mesh VPN in accordance with the mesh VPN service profile. The office computing subsystem in operative communication with the VPN management computing platform and the VPN control computing platform. The office computing subsystem is configured to implement a third VPN end node of the plurality of VPN end nodes and configured to use the mesh VPN in accordance with the mesh VPN service profile.

In another aspect, a method for managing and controlling a mesh VPN is provided. In one embodiment, the method includes provisioning a VPN management computing platform with a deployment service application program, a management service application program, and a mesh VPN service profile; providing the deployment and management services to an organization from the VPN management computing platform in conjunction with operation of a mesh VPN in a wide area network (WAN) using the deployment and management service application programs in accordance with the mesh VPN service profile, wherein the mesh VPN includes a VPN hub node and a plurality of VPN end nodes, wherein each of the plurality of VPN end nodes is configured to communicate with the VPN hub node via at least one spoke communication path to form a star VPN topology, wherein each of the plurality of VPN end nodes is configured to communicate with at least one other VPN end node via peer-to-peer communication paths between the plurality of VPN end nodes that form at least a partial mesh VPN topology; implementing the VPN hub node as a VPN control computing platform and provisioning the VPN control computing platform with a control service application program; providing a control service from the VPN control computing platform in conjunction with operation of the mesh VPN using the control service application program in accordance with the mesh VPN service profile; implementing a first VPN end node of the plurality of VPN end nodes as a first teleworker computing subsystem and provisioning the first teleworker computing subsystem with a first VPN client application program to use the mesh VPN in accordance with the mesh VPN service profile; implementing a second VPN end node of the plurality of VPN end nodes as a second teleworker computing subsystem and provisioning the second teleworker computing subsystem with a second VPN client application program to use the mesh VPN in accordance with the mesh VPN service profile; and implementing a third VPN end node of the plurality of VPN end nodes as an office computing subsystem and provisioning the office computing subsystem with a third VPN client application program to use the mesh VPN in accordance with the mesh VPN service profile.

DETAILED DESCRIPTION

Provided in various embodiments are systems and methods of establishing and maintaining communication networks with improved security and reliability. The various embodiments disclosed herein enable the propagation of a self-healing Wi-Fi network across the Internet with end-to-end encryption, configured as a VPN. This is accomplished without a dependency on the global infrastructure of a cellular/mobile network provider, or the need for physically collocated access point nodes covering the geographic zones served by the VPN. The mesh co-exists with wired subnets behind any devices that can be sufficiently controlled.

One advantage of the systems and methods disclosed herein is that administrators can take advantage of the resilience and flexibility of a VPN concentrator with the performance and scalability of point-to-point connections. Another advantage is that administrators can configure the desired network behavior all in one place and are able to monitor the network behavior in real-time from a dedicated point of coordination. Still further advantages of the systems and methods of the instant disclosure may be appreciated, such as improved reliability in the event of session or node failovers, automated event-response, and the ability to implement security-focused routing decisions. Described in more detail below are various embodiments of systems and methods for establishing and maintaining a wide-area network (WAN) mesh virtual private network (VPN).

Figure 1:
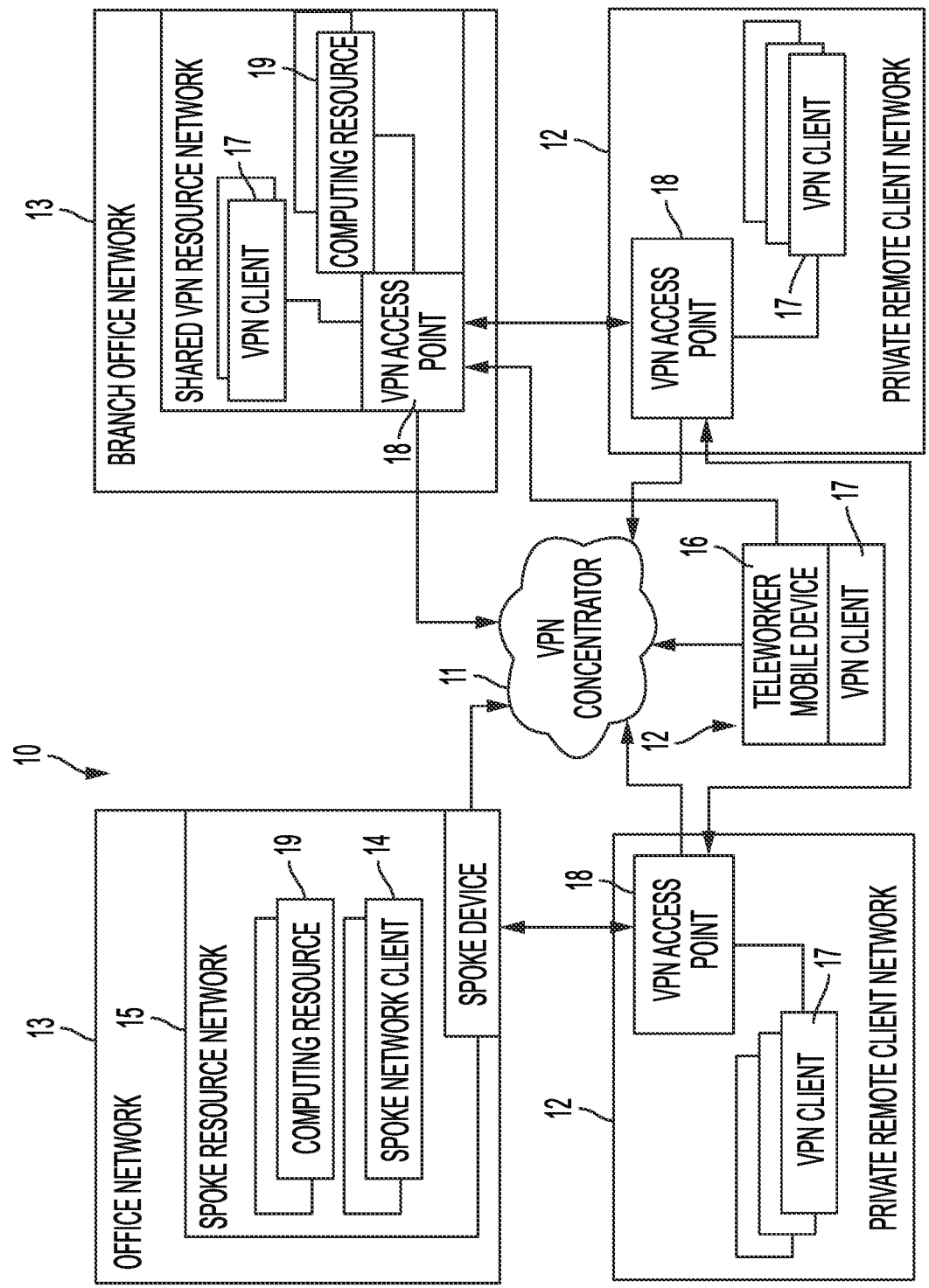
FIG. 1 is a block diagram of an exemplary embodiment of a WAN mesh VPN topology.

With reference to FIG. 1, an exemplary embodiment of a WAN mesh VPN topology 10 (e.g., system) includes a VPN concentrator 11. Both individual VPN clients 12 and spoke devices 13 connect to VPN concentrator 11. Clients 12 may be addressed within a single, shared IP pool provided by the concentrator 11 (used to distribute addresses to both Wi-Fi network clients and software clients). Spoke devices 13 may provide their own addressing to clients 14 within the spoke resource network 15 for network segmentation/segregation purposes. Clients 12 which are unable to communicate directly with peers 12, 13 can fall back to the tunnel with the concentrator 11. Similarly, spoke devices 13 which the system 10 is unable to dynamically control tunneling/routing can also fall back to the tunnel with the concentrator 11.

In certain embodiments, the WAN mesh VPN topology 10 includes a cloud-hosted endpoint that is deployed on-demand to serve as a VPN tunnel orchestration hub within the VPN concentrator 11. Rather than acting solely as an endpoint for client VPN tunnels, the concentrator 11 provides network services such as client addressing, discovery, routing, and network ACLs. In doing so, the concentrator 11 develops and maintains a profile of all spoke device 13 and client endpoints 12 within the network 10. These clients 12 may access the VPN through mobile end-client devices 16 utilizing a managed software application 17 or access points 18 deployed inside private remote networks 12.

Once deployed, the access points 18 and software client applications 19 assigned to the VPN can bring up encrypted tunnels to the concentrator 11 for their own management traffic. They will then address and configure clients 12 through this management tunnel. The SSIDs broadcasted by the access points 18 can be configured as if they reside within the office(s) 13 they are providing VPN access to, allowing clients 12 to connect with the same authentication settings while receiving IP addresses from a shared VPN pool. This is achieved through a controlled dynamic host configuration protocol (DHCP) relay mechanism integrated with the VPN concentrator 11 and firewall configuration, allowing for a tighter integration of security controls and centralized authentication hooks within the VPN 10.

The concentrator 11 can regularly update the allowable/desired configurations for client 12 data connections to the access points 18 over the management tunnels, preferring direct connections between access points 18 and office locations 13. Following any change to the (inter)network topology 10 which prevents direct connections between VPN peer nodes 12, 13, the concentrator 11 may invoke itself as the primary accessible tunnel endpoint for any impacted network resources 19, ensuring continuity for connectivity within the VPN 10.

Figure 2:
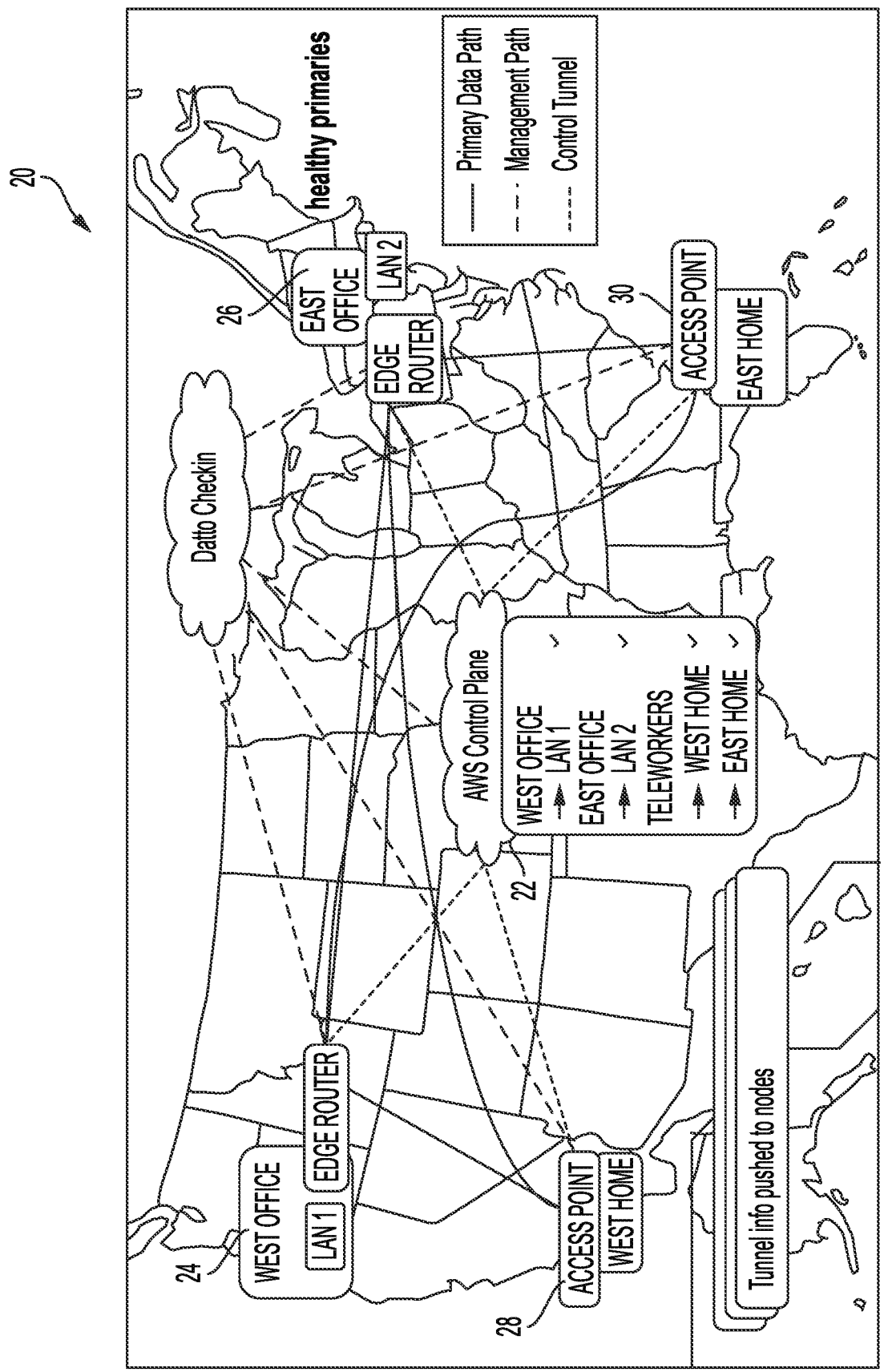
FIG. 2 is a graphical illustration of an exemplary embodiment of a WAN mesh VPN in a healthy baseline state.

With reference to FIG. 2, a healthy baseline state for an exemplary embodiment of a WAN mesh VPN is graphically illustrated. As shown, a WAN mesh VPN 20 is established between a concentrator 22 (Amazon web service (AWS) control plane), a WEST OFFICE 24, an EAST OFFICE 26, and two teleworker APs 28, 30. An initial check-in will instruct each one of the nodes to create their management tunnels. Once they do, the control plane/concentrator 22 will develop a profile of all the individual nodes within the network 20. The concentrator 22 will then broadcast the profile that it sees as instructions for each one of those nodes to make its own direct connection(s) as needed.

Figure 3:
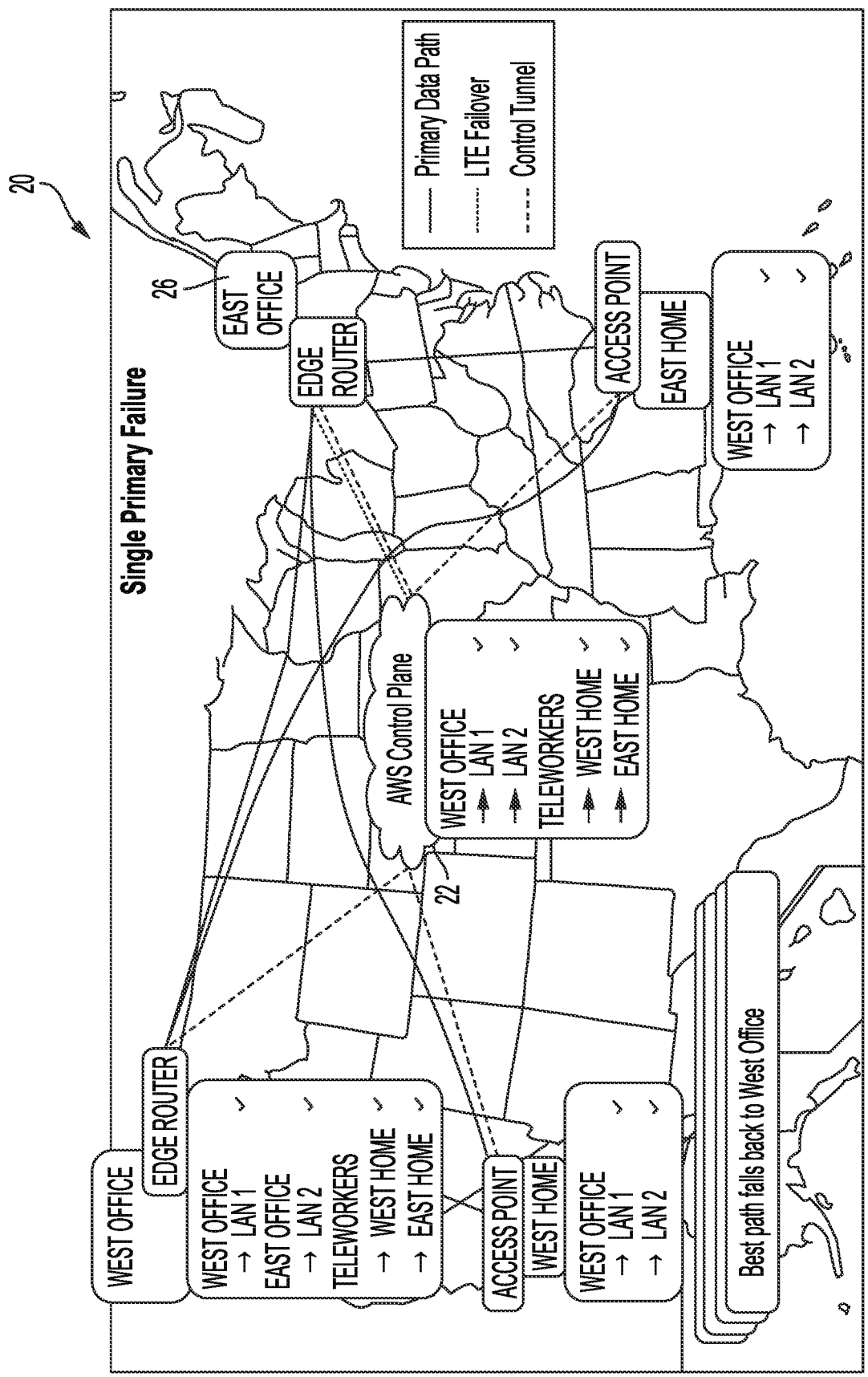
FIG. 3 is a graphical illustration of the WAN mesh VPN of FIG. 2 in a single primary failure state.

With reference to FIG. 3, a single primary failure state for the WAN mesh VPN 20 is graphically illustrated. As shown, the EAST OFFICE 26 while experiencing a primary WAN failure will retain its connection to the concentrator 22 through a secondary WAN uplink. The concentrator 22 will observe the connectivity change and will update the EAST OFFICE profile after performing any additional authentication or processing required by the VPN service profile. The concentrator 22 will then broadcast any applicable changes to subscribing nodes within the network 20. Subscribing nodes will then update and reconfigure their connection profiles as needed.

Figure 4:
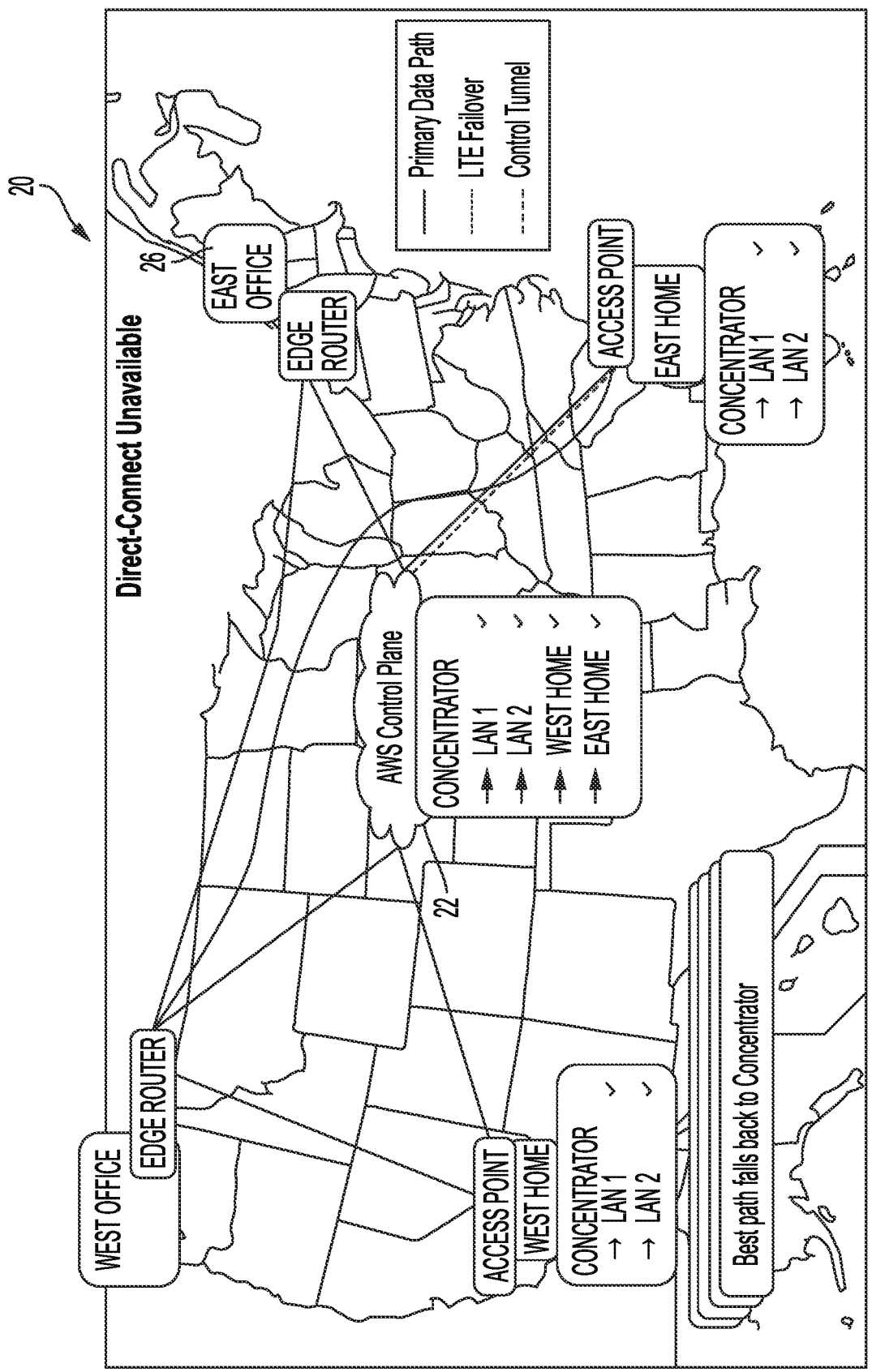
FIG. 4 is a graphical illustration of the WAN mesh VPN in a direct-connect unavailable state.

With reference to FIG. 4, a direct-connect unavailable state for the WAN mesh VPN 20 is graphically illustrated. As shown, this is a full concentrator failover state. This state may occur when direct connections between nodes cannot be orchestrated due to a lack of control over their remote network or uplink. For example, ISP NAT or home firewall configurations may reduce the feasibility of initiating a direct connection to or from a teleworker WLAN access point (TWAP) deployment. In certain embodiments, the TWAP contacts the concentrator 22 with a report of connections that are available to them. The concentrator 22 may use the report to identify discrepancies (e.g., the concentrator 22 can connect to the EAST OFFICE node 26 but the TWAP EAST HOME 30 cannot). The concentrator 22 may then claim ownership of any of the networks that it previously assigned for direct connection, and the concentrator 22 can then trigger a full failover mode, where the concentrator 22 will route traffic as needed to any node within the network 20. In further embodiments, the direct-connect unavailability failover method may be implemented with respect to one or more of the nodes (e.g., TWAPs). For example, if only certain TWAPs (i.e., less than all of them) are unable to form direct connections, the concentrator 22 may selectively claim and reroute the traffic from those affected TWAPs without altering the functional paths between directly connected resources within the network.

The multi-phased tunnel setup and direct spoke-to-spoke peering is different from a dynamic multipoint VPN (DMVPN) protocol topology. There are many differentiators between the WAN mesh and existing DMVPN (and other) topologies. For example, the WAN mesh uses an external (e.g., publicly reachable) system to provide any initial endpoint address configuration required for VPN spokes. In contrast, DMVPN requires the use of mGRE tunnels and NHRP protocol support, in addition to the IPSec tunnels for the VPN communication, to address publicly reachable address changes from the spokes.

The WAN mesh supports client address roaming. For example, a hub node, which can be a cloud-managed node, can collect roaming information for dispersion to both current spokes, and the mesh VPN service provider management infrastructure through an out-of-band check-in mechanism. The check-in mechanism can be used to collect routing and addressing information which is indifferent to the underlying tunnel protocols. The WAN mesh can use WireGuard as an internal tunneling protocol. For example, WireGuard can allow roaming of one spoke address as long as the hub endpoint remains stable. Combining this roaming functionality with the out-of-band management infrastructure eliminates the need for the DMVPN protocols listed above and reduces the technological footprint and resource overhead for the devices and client applications deployed within the mesh VPN.

The WAN mesh supports internal addressing for VPN end-clients. In contrast, DMVPN requires prior, static addressing for all local spoke local interfaces. The DMVPN topology requires this to prevent addressing conflicts and support the route broadcasting protocols used. The WAN Mesh supports statically addressed local subnets from spokes (e.g., an office router which already provides addressing for a predetermined subnet) but makes use of a centralized addressing scheme to facilitate shared private network spaces across both spoke nodes (e.g., Datto Secure Edge Access Points) and end clients connecting to the VPN (e.g., Datto Secure Edge Soft Clients). The WAN Mesh integrates this centralized addressing mechanism with both end-client authentication and route broadcasting (best path propagation) services. This allows for the meshing of a shared WiFi SSID across many remotely distributed access points without additional changes required by the party hosting the authentication servers used. Clients connected to the Access Points can be addressed within, and behave as though they are a part of, a single logical network subnet. This also allows a single client application to use an entirely separate authentication mechanism (than the WiFi network) to join the same VPN network address space, acting as a singular client "spoke" within the VPN. This further enables the integration of additional authentication mechanisms beyond those used for in-office WiFi networks to allow for the application of stricter security policies for teleworker clients.

In the WAN mesh, both the VPN concentrator (e.g., hub node) and client deployments can check-in with the mesh VPN service provider cloud through an out-of-band check-in mechanism. This provides a redundant pathway for the collection and redistribution of required tunnel configuration or stateful information if the primary mechanism for doing so (through the management paths to the concentrator) fails. This also provides a centralized mechanism to remove direct tunnels or alter ACLs for any direct peering within the deployed VPN, without requiring the ability to initiate a connection to them. The mesh VPN service provider cloud removes the need to rely on additional tunneling technologies (e.g., mGRE) or routing protocols which other vendors may not support and allows the WAN mesh to deploy over a wider selection of devices.

Existing VPN topologies, including those that offer mesh functionality, prescribe the underlying protocols required for any node to function within the VPN. The WAN Mesh can make behavior-driven routing decisions based on the technologies selected by the provisioner, and the paths available within the deployment environment.

Figure 5:
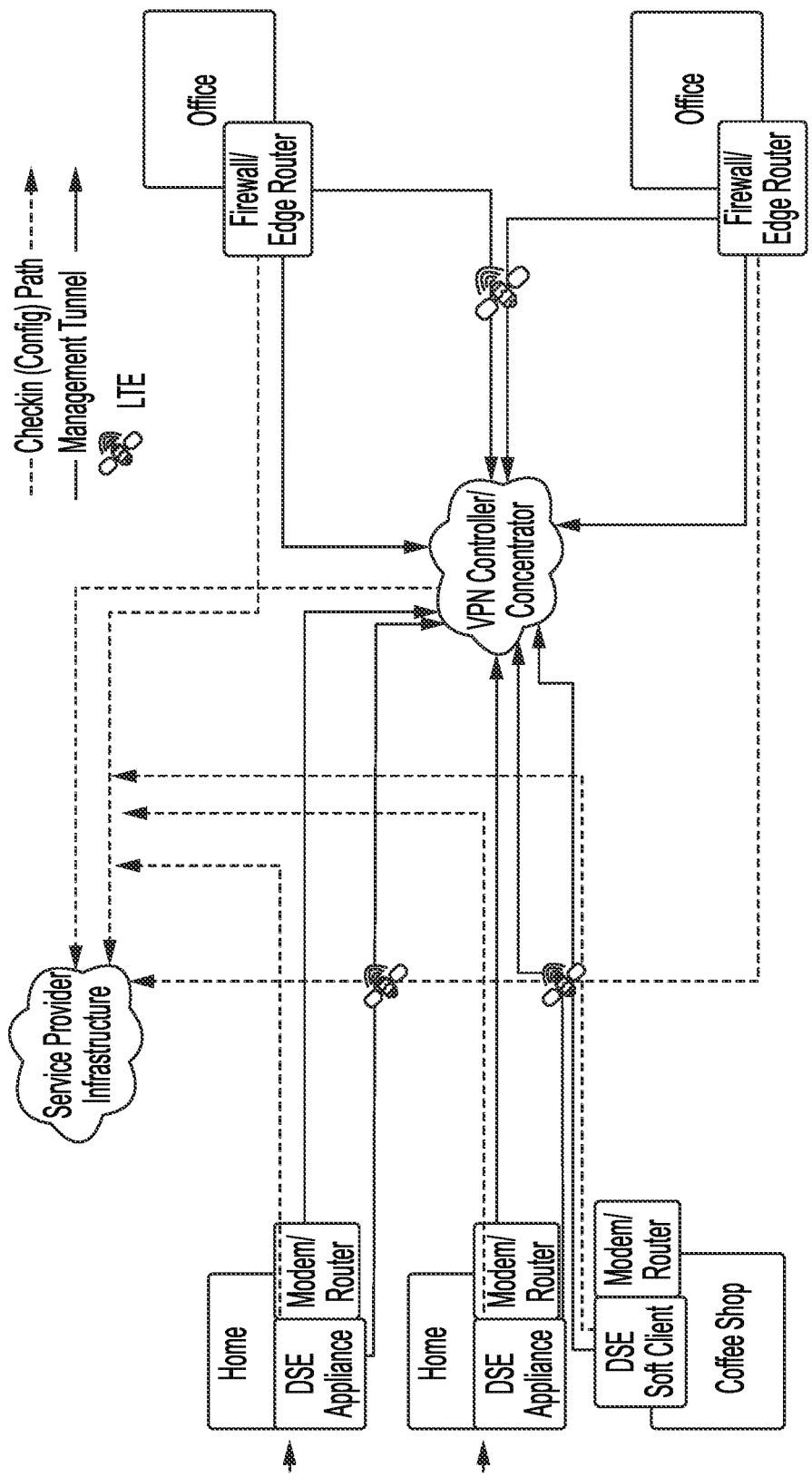
FIG. 5 is a functional diagram of an initial provisioning phase for an exemplary embodiment of a system for managing and controlling a mesh VPN.

With reference to FIG. 5, an initial provisioning phase for VPN end nodes (e.g., hardware and software clients, concentrator, and office edge devices) is performed through the check-in/configuration path the mesh VPN service provider infrastructure. The information negotiated via check-in is used to securely create the management tunnels. End nodes with an LTE uplink available can also check into the service provider Infrastructure configuration service this way. Similarly, end nodes with an LTE uplink available can reach the VPN controller/concentrator this way. If the VPN controller/concentrator is unable to check into the service provider infrastructure, the hub node will be replaced or repaired.

Each home appliance, soft client, or edge device within the VPN will negotiate a primary data tunnel to the concentrator during a data plane initialization phase. The primary data tunnel will be usable across any uplink available (e.g., LTE, cable ISP, etc.) to the connecting entity. The traffic allowed over the primary data tunnel is configured by the partner according to IP range and/or desired domain names. This can include any traffic which could also be passed through a direct (or redundant, peer-to-peer) tunnel. The traffic selections can be motivated by traffic the partner wants to be included in the VPN. Any traffic not included in the traffic selections can travel directly to its original destination along whichever path is available to it outside the VPN. The traffic selectors may be set up as inclusionary or exclusionary.

For example, an inclusionary traffic selector may only send traffic matching the following through the VPN:

| Type | Selectors |
|---|---|
| IP Range | 8.57.12.0/24, 10.0.0.0/8 |
| Domain | salesforce.com |

An example of an exclusionary traffic selector may send all traffic except for the following through the VPN:

| Type | Selectors |
|---|---|
| IP Range | 192.168.0.0/16 |
| Domain | youtube.com, netflix.com |

Next, direct peering tunnels are configured based on the access levels granted to each user. For example, if a specific user only needs to access resources from a single office within the VPN, their client device would receive a configuration for a second data tunnel to that office alone.

Next, the redundant tunnel priorities are determined by the partner's configuration according to their desired behavior in a healthy, baseline state. Determining such priorities can take any of the following factors into account: i) the location of pre-existing security appliances/endpoints within the VPN (e.g., if a partner wants to ensure traffic is inspected by a security appliance located in the office); ii) the type of traffic being passed (e.g., if a partner wants to ensure HTTP traffic is routed through the concentrator's security inspection engines); iii) the cost or reliability of any traffic path (e.g., if a partner wants to attempt only direct peerings while a user has failed over to an LTE uplink); iv) the geographic location of the traffic destination (e.g., route all traffic associated with country X through the concentrator first); and v) time (e.g., route traffic through the concentrator during these windows of time used for office maintenance windows, otherwise prefer direct connections).

In general, the partner can configure which paths to allow and which paths to prefer when there is a choice to be made. This configuration defines the tunnels that any node within the VPN is ever able to make, and which ones to favor for which reasons. The connecting appliances can be responsible for implementing run-time decisions where: i) a re-configuration could not effectively be triggered out of band, or outside of the flow of the traffic initiation itself (e.g., application-based or domain-based routing decisions must take place from the device originating the traffic); and ii) the state of the network changed from the perspective of the originating device. For example, the change to the network state may include: i) a failure to pass traffic over one of the paths for any unexpected or unknown reason; and ii) a change in the device uplink (e.g., failing over to LTE).

Figure 6:
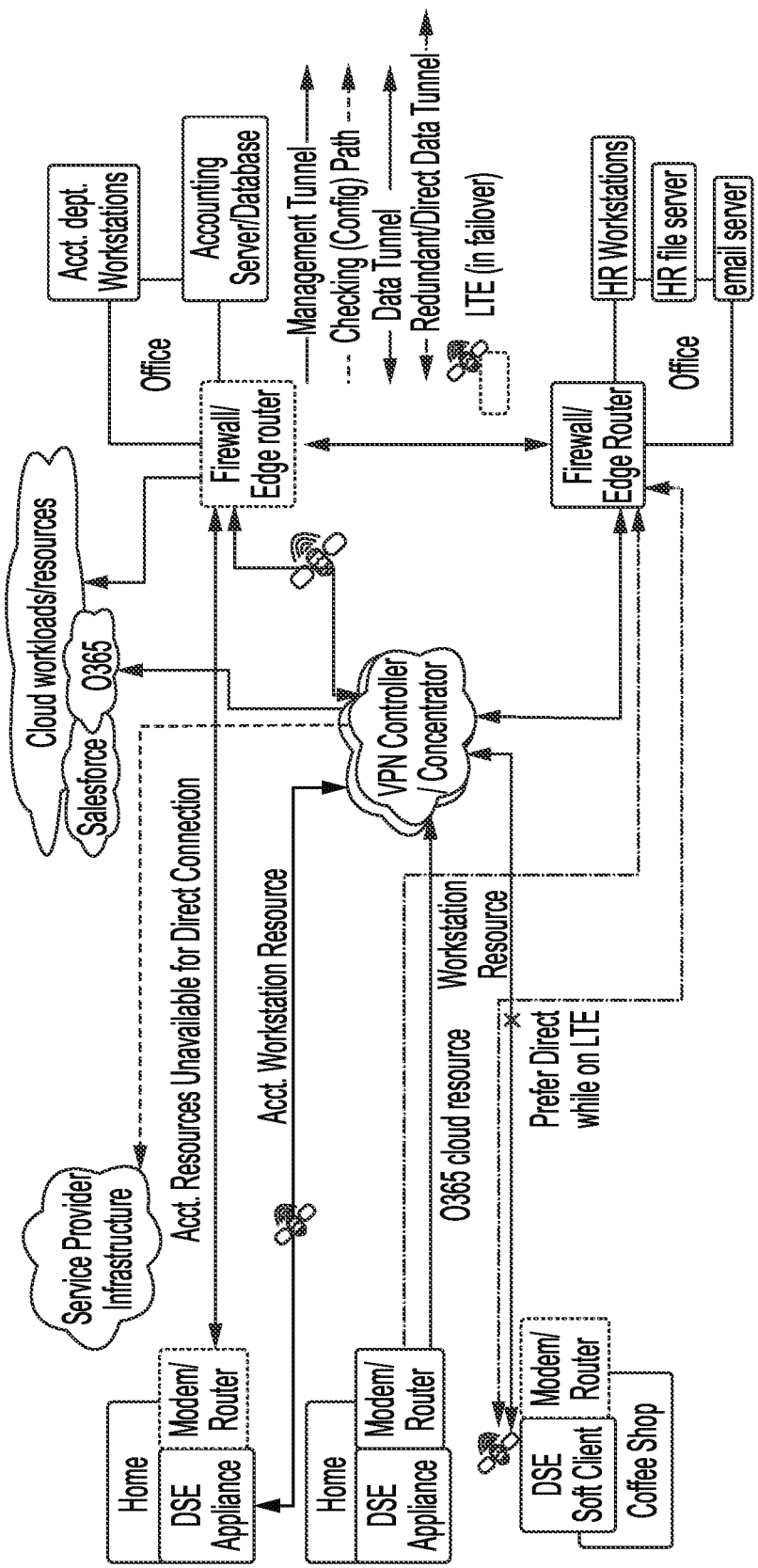
FIG. 6 is a functional diagram showing redundant data paths and traffic selection scenarios for an exemplary embodiment of a system for managing and controlling a mesh VPN.

With reference to FIG. 6, the WAN mesh is shown with multiple redundant data paths and traffic selection scenarios. For example, end nodes within the VPN may prefer direct connections over LTE to reduce cost. The top home end node may be unable to access its office resources because the office is experiencing an LTE failover. This creates an unusable tunnel resulting in the appliance choosing the data path through the concentrator. In another scenario, the end node at the coffee shop wants to access resources located at the bottom office, which it is able to access while on LTE failover, so the preferred path is used. The home end node above the coffee shop end node in the drawing selectively sends traffic destined for an O365 cloud resource to the concentrator for security inspection, but the traffic is routed directly to its destination at the cloud workloads/resources. This reduces unnecessary congestion on the office firewalls if the home end node alternatively sent the traffic to the O365 cloud resource via a path traversing the firewall/edge router in the office at the lower right portion of the drawing and the firewall/edge router in the office at the upper right portion of the drawing. In another scenario (not shown), the home end node above the coffee shop end node in the drawing selectively sends email or HR traffic destined for an office resource directly to the office at the lower right portion of the drawing to prevent unnecessary congestion on the concentrator.

System for Managing and Controlling a Mesh VPN

Figure 7:
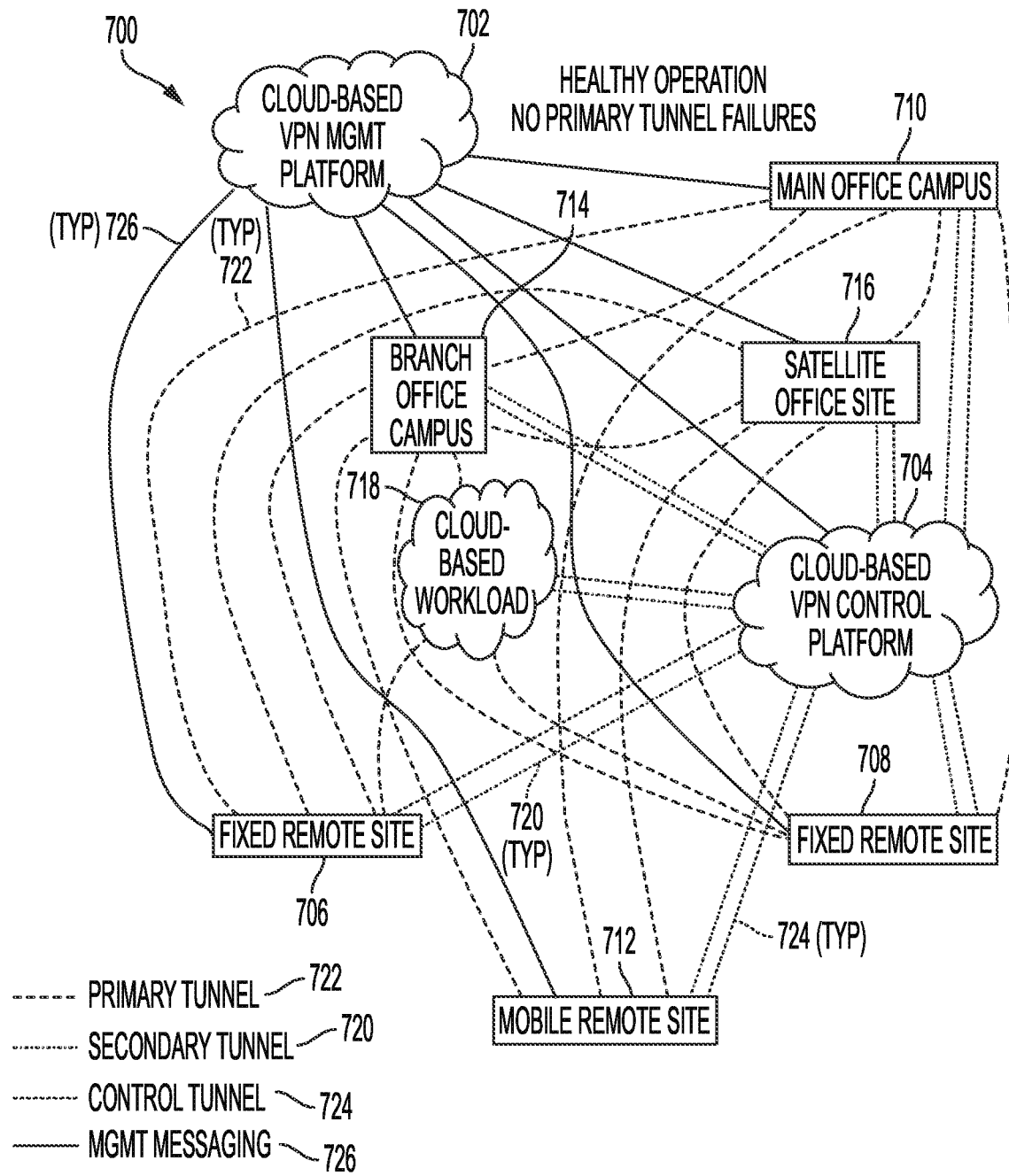
FIG. 7 is a functional block diagram of another exemplary embodiment of a system for managing and controlling a mesh VPN.

With reference to FIG. 7, an exemplary embodiment of a system 700 for managing and controlling a mesh virtual private network (VPN) includes a VPN management computing platform 702, a VPN control computing platform 704, a first teleworker computing subsystem 706 (e.g., fixed remote site), a second teleworker computing subsystem 708 (e.g., fixed remote site), and an office computing subsystem 710 (e.g., main office campus). In other embodiments, the system 700 may also include a third teleworker computing subsystem 712 (e.g., mobile remote site), a second office computing subsystem 714 (e.g., branch office campus), a third office computing subsystem 716 (e.g., satellite office site), a cloud-based workload 718, additional teleworker computing subsystems, additional office computing subsystems, and additional cloud-based workloads and/or resources in any suitable combination.

The VPN management computing platform 702 provides a deployment service and a management service to an organization (e.g., partner) in conjunction with operation of a mesh VPN in a wide area network (WAN) in accordance with a mesh VPN service profile. The mesh VPN includes a VPN hub node (e.g., VPN control computing platform) and a plurality of VPN end nodes (e.g., teleworker computing subsystem(s) and office computing subsystem(s)). Each of the plurality of VPN end nodes is configured to communicate with the VPN hub node via at least one spoke communication path 720 to form a star VPN topology. Each of the plurality of VPN end nodes is configured to communicate with at least one other VPN end node via peer-to-peer communication paths 722 between the plurality of VPN end nodes that form at least a partial mesh VPN topology.

The VPN control computing platform 704 is in operative communication with the VPN management computing platform 702. The VPN control computing platform 704 is configured to implement the VPN hub node and provides a control service for operation of the mesh VPN in accordance with the mesh VPN service profile.

The first teleworker computing subsystem 706 is in operative communication with the VPN management computing platform 702 and the VPN control computing platform 704. The first teleworker computing subsystem 706 is configured to implement a first VPN end node of the plurality of VPN end nodes and uses the mesh VPN in accordance with the mesh VPN service profile.

The second teleworker computing subsystem 708 is in operative communication with the VPN management computing platform 702 and the VPN control computing platform 704. The second teleworker computing subsystem 708 is configured to implement a second VPN end node of the plurality of VPN end nodes and uses the mesh VPN in accordance with the mesh VPN service profile.

The office computing subsystem 710 is in operative communication with the VPN management computing platform 702 and the VPN control computing platform 704. The office computing subsystem 710 is configured to implement a third VPN end node of the plurality of VPN end nodes and uses the mesh VPN in accordance with the mesh VPN service profile.

In another embodiment of the system 700, the VPN control computing platform 704 is cloud-based. In yet another embodiment of the system 700, the VPN management computing platform 702 is cloud-based. In still another embodiment of the system 700, the WAN includes one or more of a wired network, a wireless network, a telecommunication network, a data communication network, a telephone network, a cellular network, a mobile network, a cable television network, and a satellite television network.

In still yet another embodiment of the system 700, the VPN control computing platform 704, the first and second teleworker computing subsystems 706, 708, and the office computing subsystem 710 use a tunneling protocol to encapsulate and encrypt data traffic for routing from an originating node of the mesh VPN to a destination node of the mesh VPN via virtual tunnels that utilize at least one of the peer-to-peer and spoke communication paths 722, 720. In a further embodiment, the VPN control computing platform 704 uses the virtual tunnels that utilize the spoke communication paths 720 to encapsulate and encrypt control traffic exchanged with the first teleworker computing subsystem 706, the second teleworker computing subsystem 708, and the office computing subsystem 710. The control traffic is used by the VPN control computing platform 704 in conjunction with controlling operation of the mesh VPN.

In another embodiment of the system 700, the VPN control computing platform 704 uses a tunneling protocol to encapsulate and encrypt control traffic exchanged with the first teleworker computing subsystem 706, the second teleworker computing subsystem 708, and the office computing subsystem 710 via virtual tunnels that utilize a second spoke communication path 724 between the VPN control computing platform 704 and the corresponding VPN end nodes. The control traffic is used by the VPN control computing platform 704 in conjunction with controlling operation of the mesh VPN.

In yet another embodiment of the system 700, the VPN control computing platform 704 uses the WAN for control traffic exchanged with the first teleworker computing subsystem 706, the second teleworker computing subsystem 708, and the office computing subsystem 710. The control traffic is used by the VPN control computing platform 704 in conjunction with controlling operation of the mesh VPN.

In still another embodiment of the system 700, the peer-to-peer communication paths 722 and the spoke communication paths 720 form a hybrid VPN topology in which each VPN end node of the plurality of VPN end nodes has a direct peer-to-peer communication path 722 and at least one indirect communication path to communicate with other VPN end nodes with which the corresponding VPN end node is authorized to communicate. The at least one indirect communication path associated with each combination of two VPN end nodes enables selection of a preferred communication path for a given communication based on any combination of a default communication path, current health characteristics relating to the default communication path and the at least one alternate communication paths, current operating characteristics relating to the default communication path and the at least one alternate communication paths, and a type of service associated with the corresponding communication.

In a further embodiment, the mesh VPN service profile specifies the default communication path for each of the first teleworker computing subsystem 706, the second teleworker computing subsystem 708, and the office computing subsystem 710. In another further embodiment, the mesh VPN service profile specifies criteria for the VPN management computing platform 702 to select a desired communication path from the default communication path and the at least one alternate communication path for each of the first teleworker computing subsystem 706, the second teleworker computing subsystem 708, and the office computing subsystem 710. In yet another further embodiment, the mesh VPN service profile specifies criteria for the VPN control computing platform 704 to select a desired communication path from the default communication path and the at least one alternate communication path for each of the first teleworker computing subsystem 706, the second teleworker computing subsystem 708, and the office computing subsystem 710 based on at least one of the current health characteristics, the current operating characteristics, and the type of service.

In still another further embodiment, the mesh VPN service profile specifies criteria for the first teleworker computing subsystem 706 to select a desired communication path from the default communication path and the at least one alternate communication path based on at least one of the current health characteristics, the current operating characteristics, and the type of service. In still yet another further embodiment, the mesh VPN service profile specifies criteria for the second teleworker computing subsystem 708 to select a desired communication path from the default communication path and the at least one alternate communication path based on at least one of the current health characteristics, the current operating characteristics, and the type of service. In a further embodiment, the mesh VPN service profile specifies criteria for the office computing subsystem 710 to select a desired communication path from the default communication path and the at least one alternate communication path based on at least one of the current health characteristics, the current operating characteristics, and the type of service.

In still yet another embodiment, the system 700 also includes at least one cloud-based workload 718. The at least one cloud-based workload 718 is in operative communication with the VPN control computing platform 704, at least one office computing subsystem (e.g., 714) and one or more VPN end nodes (e.g., 706, 708). The at least one cloud-based workload 718 is configured to provide one or more cloud-based service (e.g., Office 365, Salesforce, Dropbox, OneDrive) to office computing subsystems (e.g., 714) and VPN end nodes (e.g., 706, 708) with which it is directly connected via the mesh VPN and secondarily with office computing subsystems (e.g., 710, 716) and VPN end nodes (e.g., 712) via the VPN control computing platform 704.

Mesh VPN Service Profile

Figure 8:
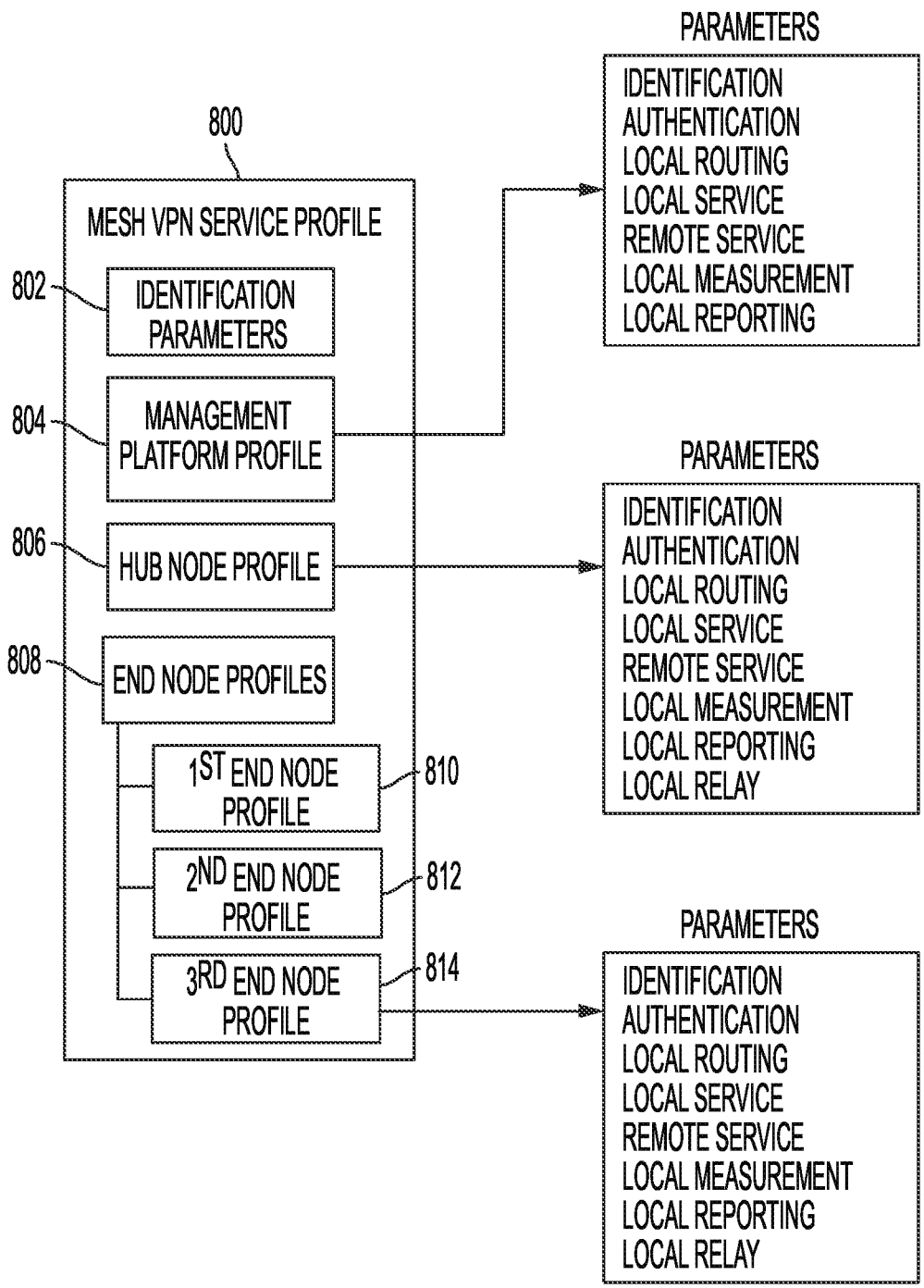
FIG. 8 is a block diagram of an exemplary embodiment of mesh VPN service profile.

With reference to FIG. 8, an exemplary embodiment of a mesh VPN service profile 800 includes identification parameters 802 for the VPN management computing platform, the VPN hub node, and the plurality of VPN end nodes. The mesh VPN service profile 800 may also include i) a management platform profile 804 associated with the VPN management computing platform 702, ii) a hub node profile 806 associated with the VPN control computing platform 704, and iii) a plurality of end node profiles 808 corresponding to the plurality of VPN end nodes. The plurality of end node profiles, for example, may include a first end node profile 810 associated with the first teleworker computing subsystem 706, a second end node profile 812 associated with the second teleworker computing subsystem 708, and a third end node profile 814 associated with the office computing subsystem 710.

The management platform profile 804 may include one or more of i) identification parameters, ii) authentication parameters, iii) local routing parameters, iv) local service parameters, v) remote service parameters, vi) local measurement parameters, and vii) local reporting parameters. The hub node profile 806 may include one or more of i) identification parameters, ii) authentication parameters, iii) local routing parameters, iv) local service parameters, v) remote service parameters, vi) local measurement parameters, vii) local reporting parameters, and viii) local relay parameters. Each end node profile (e.g., 810, 812, 814) may include one of more of i) identification parameters, ii) authentication parameters, iii) local routing parameters, iv) local service parameters, v) remote service parameters, vi) local measurement parameters, vii) local reporting parameters, and viii) local relay parameters.

VPN Management Computing Platform

Figure 9:
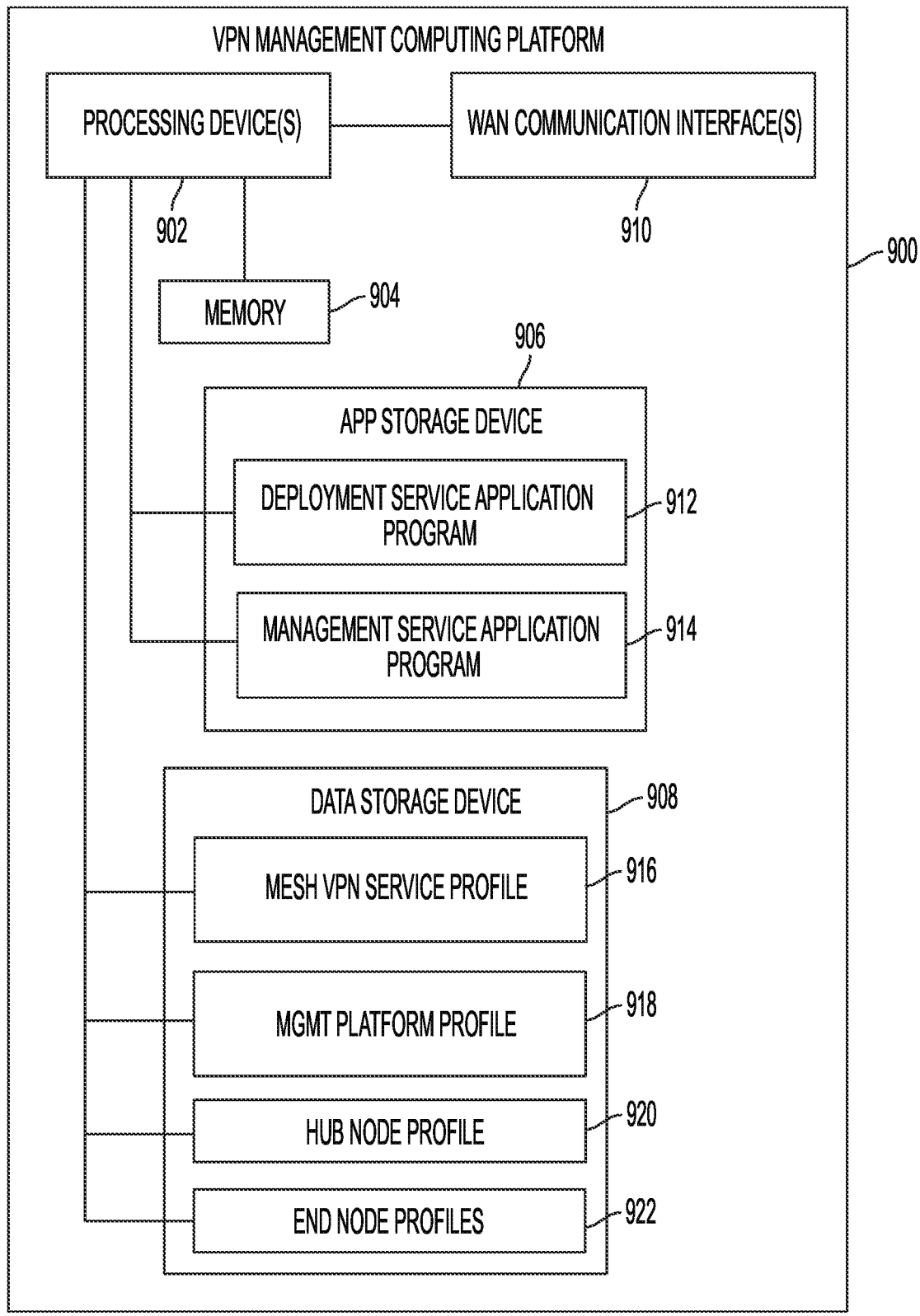
FIG. 9 is a block diagram of an exemplary embodiment of a VPN management computing platform.

With reference to FIG. 9, in another embodiment of the system 700, an exemplary embodiment of a VPN management computing platform 900 includes at least one processor 902 and associated memory 904, at least one application storage device 906, at least one data storage device 908, and at least one WAN communication interface 910. The at least one application storage device 906 configured to store a deployment service application program 912 and a management service application program 914. The at least one data storage device 908 configured to store the mesh VPN service profile 916, the management platform profile 918, the hub node profile 920, and the plurality of end node profiles 922. The at least one WAN communication interface 910 in operative communication with the at least one processor 902 and the WAN. The at least one WAN communication interface 910 is configured to enable the VPN management computing platform 900 to communicate with the VPN control computing platform 704, the first and second teleworker computing subsystems 706, 708, and the office computing subsystem 710 via the WAN.

The VPN management computing platform 900 is configured to provide the deployment service using the deployment service application program 912 in accordance with the mesh VPN service profile 916 and the management platform profile 918. The VPN management computing platform 900 is configured to provide the management service using the management service application program 914 in accordance with the mesh VPN service profile 916 and the management platform profile 918.

In another embodiment, the VPN management computing platform 900 is configured to construct and store the mesh VPN service profile 916, the management platform profile 918, the hub node profile 920, and the plurality of end node profiles 922 in the at least one data storage device 908. The VPN management computing 900 is configured to use the management service application program 914 to manage the mesh VPN service profile 916, the management platform profile 918, the hub node profile 920, and the plurality of end node profiles 922 in response to modifiable mesh VPN specifications from the organization (e.g., partner) and in response to at least one of a local measurement report, a local parameter update to the mesh VPN service profile, a local parameter update to the management platform profile 918, a remote measurement report associated with the hub node profile 920 from the VPN hub node, a remote measurement report associated with the plurality of end node profiles 922 from at least one VPN end node of the plurality of VPN end nodes, a remote parameter update associated with the hub node profile 920 from the VPN hub node, a remote parameter update associated with the plurality of end node profiles 922 from at least one VPN end node, an updated hub node profile 920 from the VPN hub node, and an updated end node profile 922 from one or more VPN end node.

VPN Control Computing Platform

Figure 10:
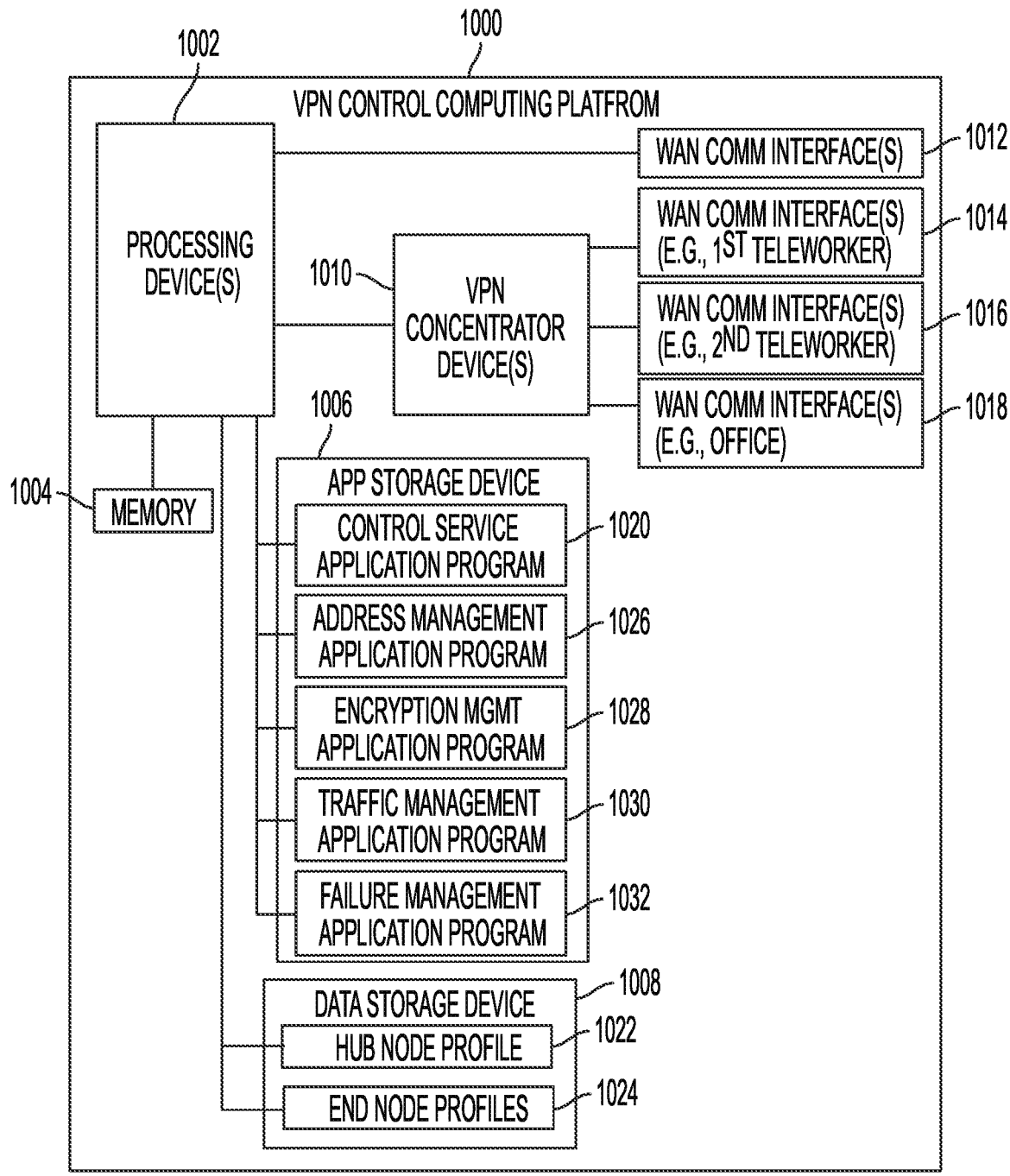
FIG. 10 is a block diagram of an exemplary embodiment of a VPN control computing platform.

With reference to FIG. 10, in yet another embodiment of the system 700, an exemplary embodiment of a VPN control computing platform 1000 includes at least one processor 1002 and associated memory 1004, at least one application storage device 1006, at least one data storage device 1008, at least one VPN concentrator 1010, at least one first WAN communication interface 1012, at least one second WAN communication interface 1014, at least one third WAN communication interface 1014, and at least one fourth WAN communication interface 1018. The at least one application storage device 1006 configured to store a control service application program 1020. The at least one data storage device 1008 configured to store the hub node profile 1022 and the plurality of end node profiles 1024. The at least one VPN concentrator in operative communication with the at least one processor 1002.

The at least one first WAN communication interface 1012 in operative communication with the at least one processor 1002 and the WAN. The at least one first WAN communication interface 1012 is configured to enable the VPN control computing platform 1000 to communicate with the VPN management computing platform 900 via the WAN. The at least one second WAN communication interface 1014 in operative communication with the at least one VPN concentrator 1010 and the WAN. The at least one second WAN communication interface 1014 is configured to enable the VPN control computing platform 1000 to communicate with the first teleworker computing subsystem 706 via the mesh VPN. The at least one third WAN communication interface 1016 in operative communication with the at least one VPN concentrator 1010 and the WAN. The at least one third WAN communication interface 1016 is configured to enable the VPN control computing platform 1000 to communicate with the second teleworker computing subsystem 708 via the mesh VPN. The at least one fourth WAN communication interface 1018 in operative communication with the at least one VPN concentrator 1010 and the WAN. The at least one fourth WAN communication interface 1018 is configured to enable the VPN control computing platform 1000 to communicate with the office computing subsystem 710 via the mesh VPN.

The VPN control computing platform 1000 is configured to provide the control service using the control service application program 1020 in accordance with the hub node profile 1022. In other embodiments, the VPN control computing platform 1000 is also configured to provide other services or to supplement the control service using any combination of an address management application program 1026, an encryption management application program 1028, a traffic management application program 1030, and a failure management application program 1032 which may be stored in the at least one application storage device 1006.

In another embodiment, the VPN control computing platform 1000 is configured to use the control service application program 1020 to manage the hub node profile 1022 and the plurality of end node profiles 1024 in response to at least one of a local measurement report, a local parameter update to the hub node profile 1022, a remote measurement report from the VPN management computing platform 900, a remote parameter update associated with the hub node profile 1022 from the VPN management computing platform 900, a remote parameter update associated with one or more of the plurality of end node profiles 1024 from the VPN management computing platform 900, an updated end node profile associated with one or more of the plurality of end node profiles 1024 from the VPN management computing platform 900, a remote parameter update associated with the plurality of end node profiles 1024 from the corresponding VPN end node, and an updated end node profile associated with the plurality of end node profiles 1024 from the corresponding VPN end node.

Teleworker Computing Subsystem (First Example)

Figure 11:
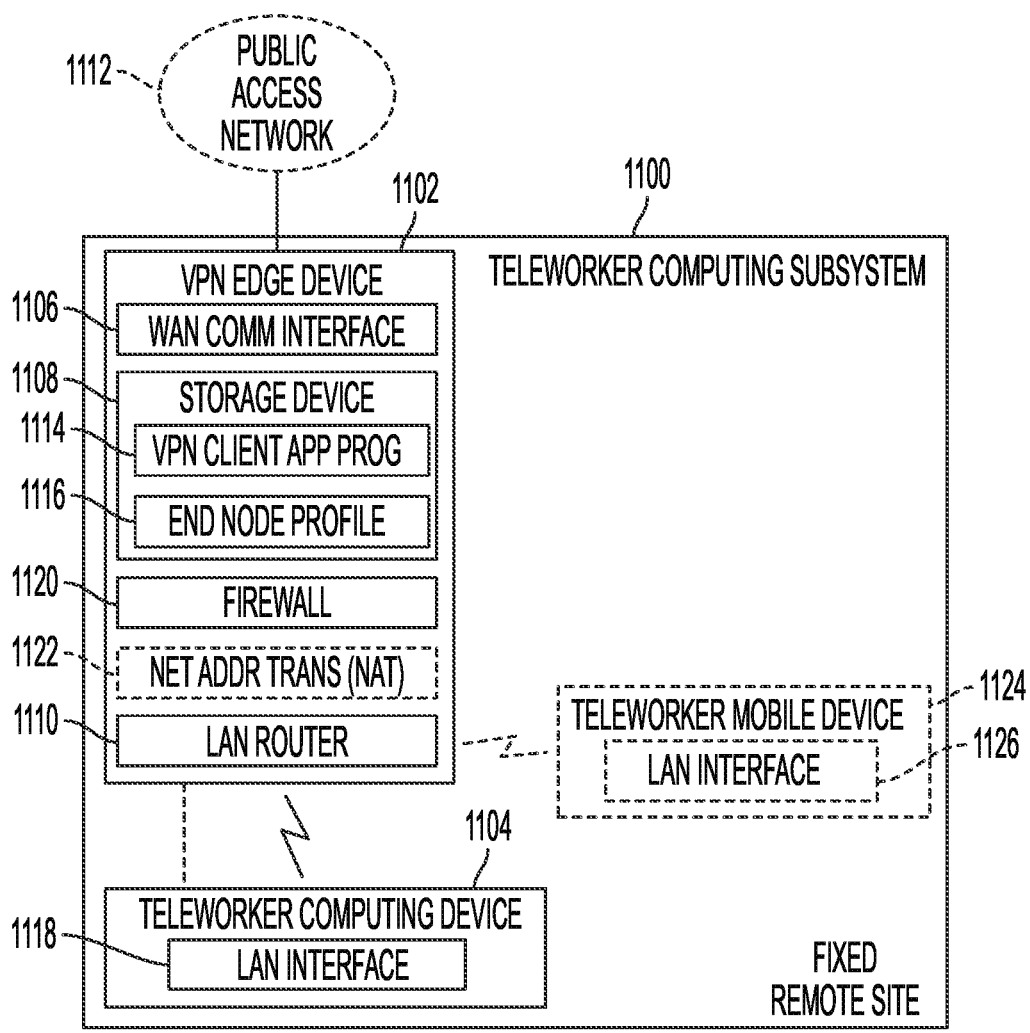
FIG. 11 is a block diagram of an exemplary embodiment of a teleworker computing subsystem.

With reference to FIG. 11, in still another embodiment of the system 700, a teleworker computing subsystem 1100 includes a VPN edge device 1102 at a fixed remote site and a teleworker computing device 1104. The VPN edge device 1102 including a WAN communication interface 1106, a storage device 1108, and a local area network (LAN) router 1110. The WAN communication interface 1106 in operative communication with the WAN via a public access network 1112. The WAN communication interface 1106 is configured to enable the VPN edge device 1102 to communicate with the VPN management computing platform 900 via the WAN. The WAN communication interface 1106 is configured to enable the VPN edge device 1102 to communicate with the VPN control computing platform 1000 and the office computing subsystem 710 via the mesh VPN through the public access network 1112. The storage device 1108 configured to store a VPN client application program 1114 and configured to store an end node profile 1116 of the plurality of end node profiles. The end node profile 1116 is associated with the VPN end node.

The teleworker computing device 1104 configured to enable a teleworker associated with the organization to perform work tasks assigned by the organization. The teleworker computing device 1104 including a LAN communication interface 1118 in operative communication with the LAN router 1110 via a wireless or wired LAN. The LAN communication interface 1118 is configured to enable the teleworker computing device 1104 to communicate with the office computing subsystem 710 via the mesh VPN through the VPN edge device 1102. The teleworker computing subsystem 1100 is configured to use the VPN client application program 1114 in accordance with the end node profile 1116 to communicate via the mesh VPN.

In other embodiments, the VPN edge device 1102 may also include a firewall 1120 and/or a network address translation (NAT) device 1122. In further embodiments, the teleworker computing subsystem 1100 may also include a teleworker mobile device 1124 configured to enable the teleworker associated with the organization to perform work tasks assigned by the organization. The teleworker mobile device 1124 including a LAN communication interface 1126 in operative communication with the LAN router 1110 via a wireless LAN.

In another embodiment, the teleworker computing subsystem 1100 is configured to use the VPN client application program 1114 to manage the end node profile 1116 in response to at least one of a local measurement report, a local parameter update to the end node profile 1116, a remote measurement report from at least one of the VPN management computing platform 900 and the VPN control computing platform 1000, a remote parameter update associated with the end node profile 1116 from at least one of the VPN management computing platform 900 and the VPN control computing platform 1000, and an updated end node profile 1116 from at least one of the VPN management computing platform 900 and the VPN control computing platform 1000.

Teleworker Computing Subsystem (Second Example)

Figure 12:
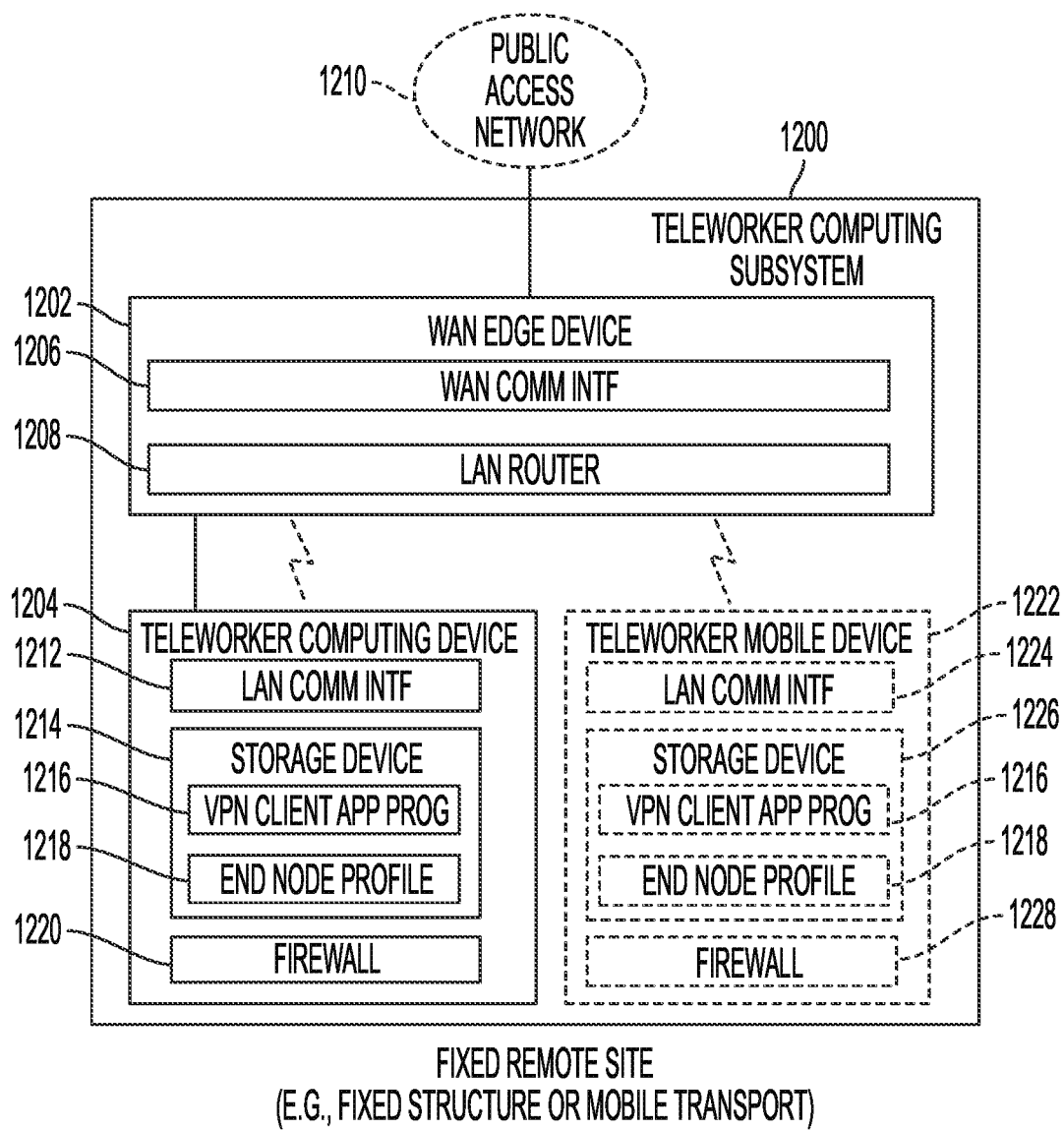
FIG. 12 is a block diagram of another exemplary embodiment of a teleworker computing subsystem.

With reference to FIG. 12, in still yet another embodiment of the system 700, a teleworker computing subsystem 1200 includes a WAN edge device 1202 and a teleworker computing device 1204. The WAN edge device 1202 including a WAN communication interface 1206 and a LAN router 1208. The WAN communication interface 1206 in operative communication with the WAN via a public access network 1210. The WAN communication interface 1206 is configured to enable the WAN edge device 1202 to communicate with the VPN management computing platform 900, the VPN control computing platform 1000, and the office computing subsystem 710 via the WAN.

The teleworker computing device 1204 configured to enable a teleworker associated with the organization to perform work tasks assigned by the organization. The teleworker computing device 1204 including a LAN communication interface 1212 and a storage device 1214. The LAN communication interface 1212 in operative communication with the LAN router 1208 via a wireless or wired LAN. The LAN communication interface 1212 is configured to enable the teleworker computing device 1204 to communicate with the office computing subsystem 710 via the mesh VPN through the WAN edge device 1202. The storage device 1214 configured to store a VPN client application program 1216 and configured to store an end node profile 1218 of the plurality of end node profiles. The end node profile 1218 is associated with the VPN end node. The teleworker computing device 1204 is configured to use the VPN client application program 1216 in accordance with the end node profile 1218 to communicate via the mesh VPN.

In other embodiments, the teleworker computing device 1204 may also include a firewall 1220. In further embodiments, the teleworker computing subsystem 1200 may also include a teleworker mobile device 1222 configured to enable the teleworker associated with the organization to perform work tasks assigned by the organization. The teleworker mobile device 1222 including a LAN communication interface 1224 in operative communication with the LAN router 1208 via a wireless LAN and a storage device 1226. The storage device 1226 also configured to store the VPN client application program 1216 and the end node profile 1218. In other embodiments, the teleworker mobile device 1222 may also include a firewall 1228.

In another embodiment, the teleworker computing subsystem 1200 is configured to use the VPN client application program 1216 to manage the end node profile 1218 in response to at least one of a local measurement report, a local parameter update to the end node profile 1218, a remote measurement report from at least one of the VPN management computing platform 900 and the VPN control computing platform 1000, a remote parameter update associated with the end node profile 1218 from at least one of the VPN management computing platform 900 and the VPN control computing platform 1000, and an updated end node profile 1218 from at least one of the VPN management computing platform 900 and the VPN control computing platform 1000.

Office Computing Subsystem

Figure 13:
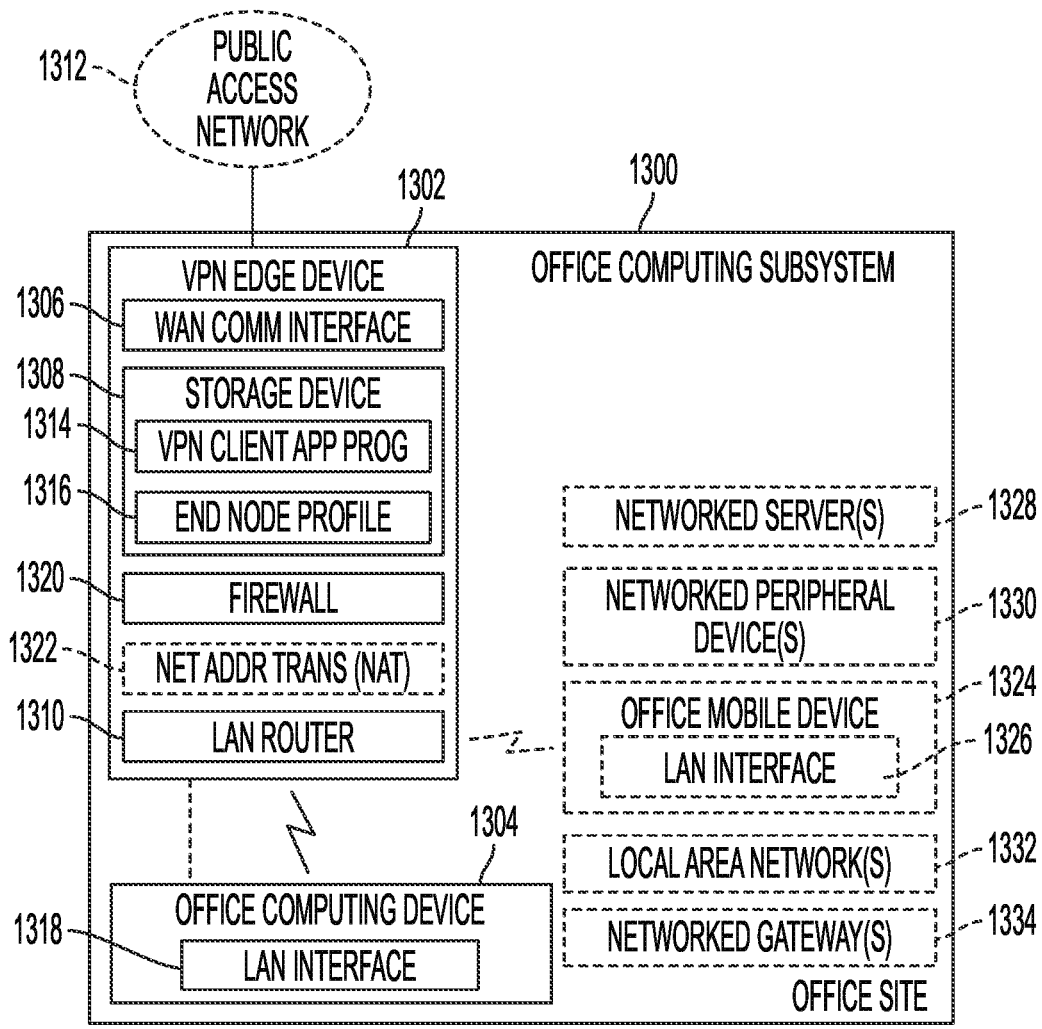
FIG. 13 is a block diagram of an exemplary embodiment of an office computing subsystem.

With reference to FIG. 13, in another embodiment of the system 700, an office computing subsystem 1300 includes a VPN edge device 1302 at an office site and an office computing device 1304. The VPN edge device 1302 including a WAN communication interface 1306, a storage device 1308, and a LAN router 1310. The WAN communication interface 1306 in operative communication with the WAN via a public access network 1312. The WAN communication interface 1306 is configured to enable the VPN edge device 1302 to communicate with the VPN management computing platform 900 via the WAN. The WAN communication interface 1306 is configured to enable the VPN edge device to communicate with the VPN control computing platform 1000 and multiple teleworker computing subsystems (e.g., 1100, 1200) via the mesh VPN through the public access network 1312. The storage device 1308 configured to store a VPN client application program 1314 and configured to store an end node profile 1316 of the plurality of end node profiles. The end node profile 1316 is associated with the third VPN end node.

The office computing device 1304 configured to enable teleworkers associated with the organization to access office resources in conjunction with performing work tasks assigned by the organization from remote locations using the multiple teleworker computing subsystems (e.g., 1100, 1200). The office computing device 1304 including a LAN communication interface 1318 in operative communication with the LAN router 1310 via a wireless or wired LAN. The LAN communication interface 1318 is configured to enable the office computing device 1304 to communicate with the multiple teleworker computing subsystems (e.g., 1100, 1200) via the mesh VPN through the VPN edge device 1302. The office computing subsystem 1300 is configured to use the VPN client application program 1314 in accordance with the end node profile 1316 to communicate via the mesh VPN.

In other embodiments, the VPN edge device 1302 may also include a firewall 1320 and/or a NAT device 1322. In further embodiments, the office computing subsystem 1300 may also include an office mobile device 1324 configured to enable teleworkers associated with the organization to access office resources in conjunction with performing work tasks assigned by the organization from remote locations using the multiple teleworker computing subsystems (e.g., 1100, 1200). The teleworker mobile device 1324 including a LAN communication interface 1326 in operative communication with the LAN router 1310 via a wireless LAN. In other embodiments, the office computing subsystem 1300 may include any combination of office resources at the office site that are accessible to teleworkers via the mesh VPN. For example, such office resources may include networked servers 1328, networked peripheral devices 1330, additional LANs 1332, and networked gateways 1334.

In another embodiment, the office computing subsystem 1300 is configured to use the VPN client application program 1314 to manage the end node profile 1316 in response to at least one of a local measurement report, a local parameter update to the end node profile 1316, a remote measurement report from at least one of the VPN management computing platform 900 and the VPN control computing platform 1000, a remote parameter update associated with the end node profile 1316 from at least one of the VPN management computing platform 900 and the VPN control computing platform 1000, and an updated end node profile 1316 from at least one of the VPN management computing platform 900 and the VPN control computing platform 1000.

In yet another embodiment, the office computing subsystem 1330 also includes a spoke device (not shown) in operative communication with the mesh VPN via the public access network 1312. The spoke device may provide VPN edge devices 1302, office computing devices 1304, and office mobile devices 1324 with access to the mesh VPN. The spoke device may also provide the mesh VPN with access to on-premises workloads and resources, such as networked servers 1328, networked peripheral devices 1330, local area networks 1332, and networked gateways 1334.

Teleworker Computing Subsystem (Third Example)

Figure 14:
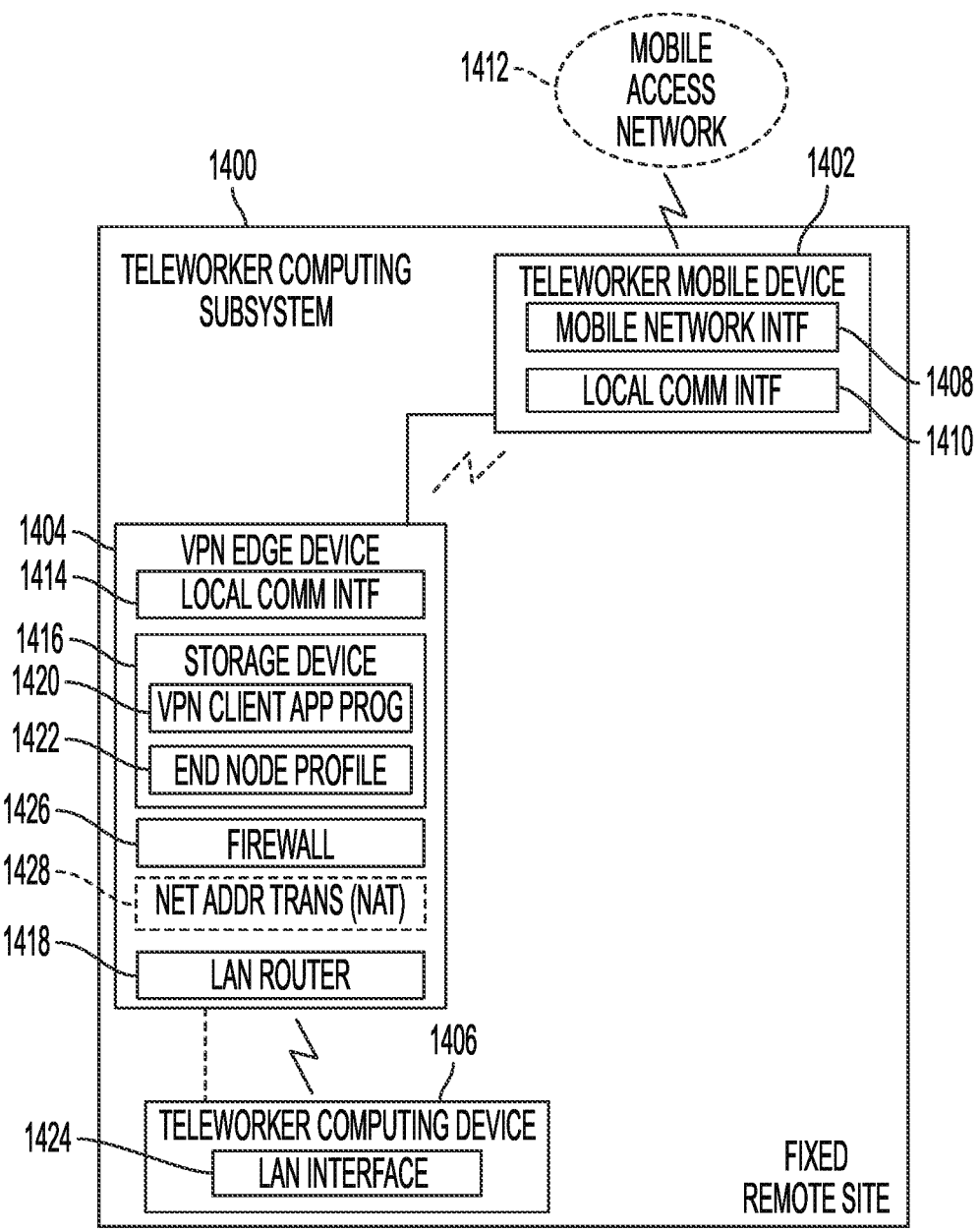
FIG. 14 is a block diagram of yet another exemplary embodiment of a teleworker computing subsystem.

With reference to FIG. 14, another embodiment of the system 700 also includes a teleworker computing subsystem 1400 in operative communication with the VPN management computing platform 900 and the VPN control computing platform 1000. The teleworker computing subsystem 1400 is configured to implement a VPN end node of the plurality of VPN end nodes and configured to use the mesh VPN in accordance with the mesh VPN service profile 800. As shown in FIG. 14, an exemplary embodiment of the teleworker computing subsystem 1400 includes a teleworker mobile device 1402, a VPN edge device 1404, and a teleworker computing device 1406. The teleworker mobile device 1402 includes a mobile network interface 1408 and a first local communication interface 1410. The mobile network interface 1408 in operative communication with a mobile access network 1412 of the WAN. The mobile network interface 1408 is configured to enable the teleworker mobile device 1402 to communicate with the VPN management computing platform 900, the VPN control computing platform 1000, and the office computing subsystem 1300 via the WAN through the mobile access network 1412.

The VPN edge device 1404 includes a second local communication interface 1414, a storage device 1416, and a LAN router 1418. The second local communication interface 1414 in operative communication with the first local communication interface 1410 via a wired cable or a wireless link. The second local communication interface 1414 is configured to enable the VPN edge device 1404 to communicate with the VPN management computing platform 900 via the WAN through the teleworker mobile device 1402. The second communication interface 1414 is configured to enable the VPN edge device 1404 to communicate with the VPN control computing platform 1000 and the office computing subsystem 1300 via the mesh VPN through the teleworker mobile device 1402. The storage device 1416 configured to store a VPN client application program 1420 and configured to store an end node profile 1422 of the plurality of end node profiles. The end node profile 1422 is associated with the VPN end node.

The teleworker computing device 1406 configured to enable a teleworker associated with the organization to perform work tasks assigned by the organization. The teleworker computing device 1406 including a LAN communication interface 1424 in operative communication with the LAN router 1418 via a wireless or wired LAN. The LAN communication interface 1424 is configured to enable the teleworker computing device 1406 to communicate with the office computing subsystem 1300 via the mesh VPN through the VPN edge device 1404 and the teleworker mobile device 1402.

The teleworker computing subsystem 1400 is configured to use the VPN client application program 1420 in accordance with the end node profile 1422 to communicate with the office computing subsystem 1300 via the mesh VPN. In other embodiments, the VPN edge device 1404 may also include a firewall 1426 and/or a NAT device 1428.

Teleworker Computing Subsystem (Fourth Example)

Figure 15:
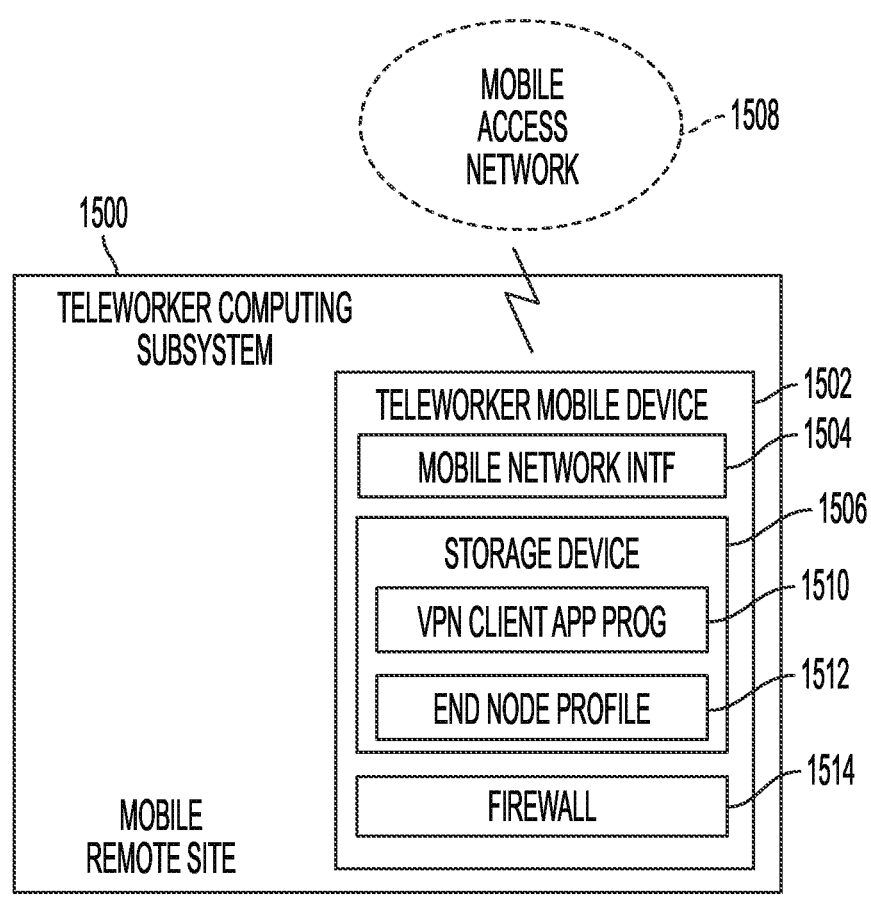
FIG. 15 is a block diagram of still another exemplary embodiment of a teleworker computing subsystem.

With reference to FIG. 15, another embodiment of the system 700 also includes a teleworker computing subsystem 1500 in operative communication with the VPN management computing platform 900 and the VPN control computing platform 1000. The teleworker computing subsystem 1500 is configured to implement a VPN end node of the plurality of VPN end nodes and configured to use the mesh VPN in accordance with the mesh VPN service profile 800. As shown in FIG. 15, the teleworker computing subsystem 1500 includes a teleworker mobile device 1502 configured to enable a teleworker associated with the organization to perform work tasks assigned by the organization. The teleworker mobile device 1502 includes a mobile network interface 1504 and a storage device 1506.

The mobile network interface 1504 in operative communication with a mobile access network 1508 of the WAN. The mobile network interface 1504 is configured to enable the teleworker mobile device 1502 to communicate with the VPN management computing platform via the WAN through the mobile access network 1508. The mobile network interface 1504 is configured to enable the teleworker mobile device to communicate with the VPN control computing platform and the office computing subsystem via the mesh VPN through the mobile access network 1508. The storage device 1506 configured to store a VPN client application program 1510 and configured to store an end node profile 1512 of the plurality of end node profiles. The end node profile 1512 is associated with the VPN end node.

The teleworker computing subsystem 1500 is configured to use the VPN client application program 1510 in accordance with the end node profile 1512 to communicate with the office computing subsystem 1300 via the mesh VPN. In other embodiments, the teleworker mobile device 1502 may also include a firewall 1514.

Office Computing Subsystem (Second Example)

Figure 16:
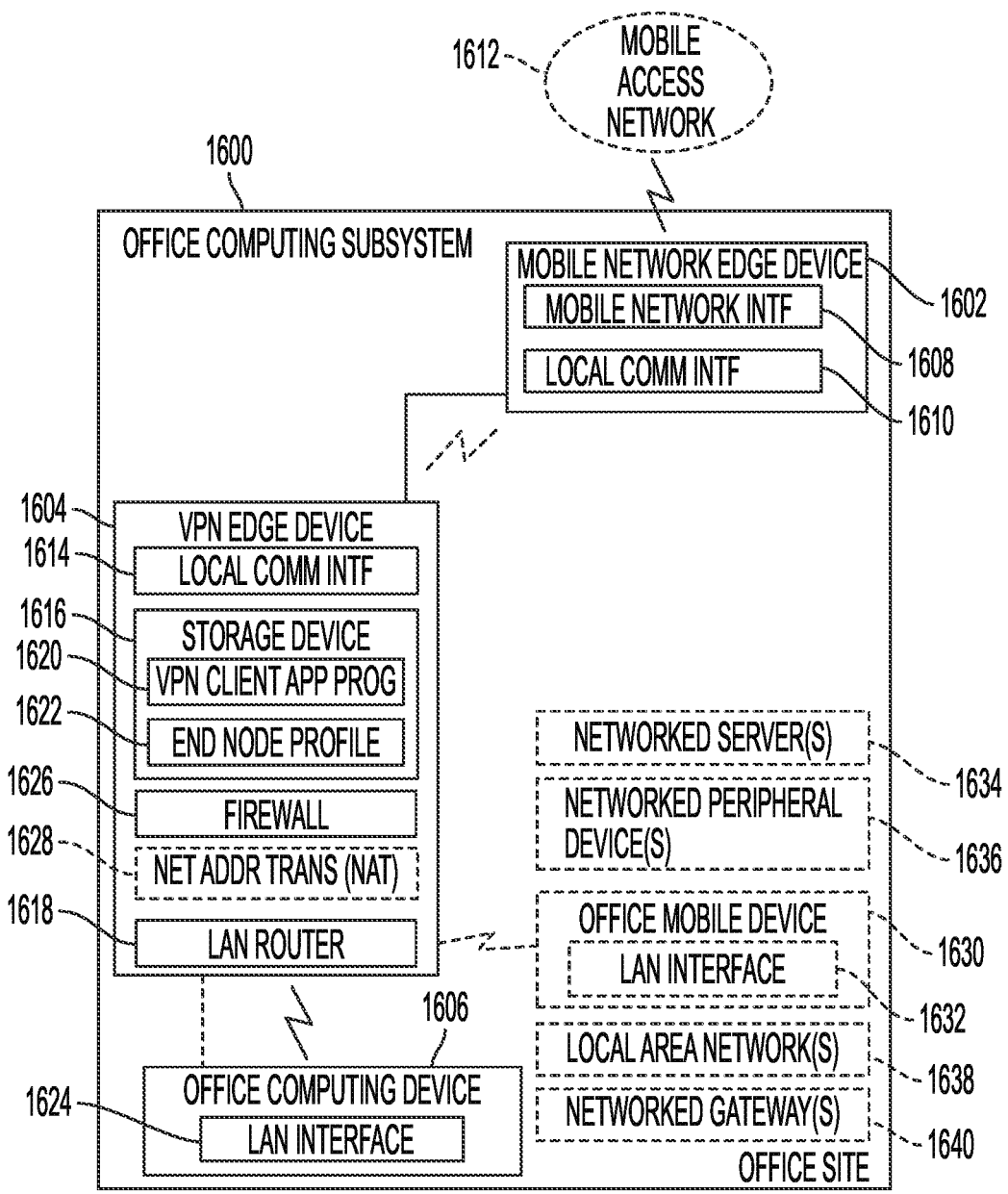
FIG. 16 is a block diagram of another exemplary embodiment of an office computing subsystem.

With reference to FIG. 16, another embodiment of the system 700 also includes an office computing subsystem 1600 in operative communication with the VPN management computing platform 900 and the VPN control computing platform 1000. The office computing subsystem 1600 is configured to implement a VPN end node of the plurality of VPN end nodes and configured to use the mesh VPN in accordance with the mesh VPN service profile 800. The office computing subsystem 1600 including a mobile network edge device 1602, a VPN edge device 1604, and an office computing device 1606.

The mobile network edge device 1602 including a mobile network interface 1608 and a first local communication interface 1610. The mobile network interface 1608 in operative communication with a mobile access network 1612 of the WAN. The mobile network interface 1608 is configured to enable the mobile network edge device 1602 to communicate with the VPN management computing platform 900, the VPN control computing platform 1000, multiple teleworker computing subsystems (e.g., 1100, 1200), and the office computing subsystem 1300 via the WAN through the mobile access network 1612.

The VPN edge device 1604 including a second local communication interface 1614, a storage device 1616, and a LAN router 1618. The second local communication interface 1614 in operative communication with the first local communication interface 1610. The second local communication interface 1614 is configured to enable the VPN edge device 1604 to communicate with the VPN management computing platform 900 via the WAN through the mobile network edge device 1602. The second communication interface is configured to enable the VPN edge device 1604 to communicate with the VPN control computing platform 1000, multiple teleworker computing subsystem (e.g., 1100, 1200), and the office computing subsystem 1300 via the mesh VPN through the mobile network edge device 1602.

The storage device 1616 configured to store a VPN client application program 1620 and configured to store an end node profile 1622 of the plurality of end node profiles. The end node profile 1622 is associated with the VPN end node.

The office computing device 1606 configured to enable teleworkers associated with the organization to access office resources in conjunction with performing work tasks assigned by the organization from remote locations using the multiple teleworker computing subsystems (e.g., 1100, 1200). The office computing device 1606 including a LAN communication interface 1624 in operative communication with the LAN router 1618 via a wireless or wired LAN. The LAN communication interface 1624 is configured to enable the office computing device 1606 to communicate with the multiple teleworker computing subsystems (e.g., 1100, 1200) via the mesh VPN through the VPN edge device 1604 and the mobile network edge device 1602. The office computing subsystem 1600 is configured to use the VPN client application program 1620 in accordance with the end node profile 1622 to communicate with the multiple teleworker computing subsystems (e.g., 1100, 1200) via the mesh VPN.

In other embodiments, the VPN edge device 1604 may also include a firewall 1626 and/or a NAT device 1628. In further embodiments, the office computing subsystem 1600 may also include an office mobile device 1630 configured to enable teleworkers associated with the organization to access office resources in conjunction with performing work tasks assigned by the organization from remote locations using the multiple teleworker computing subsystems (e.g., 1100, 1200). The teleworker mobile device 1630 including a LAN communication interface 1632 in operative communication with the LAN router 1618 via a wireless LAN. In other embodiments, the office computing subsystem 1600 may include any combination of office resources at the office site that are accessible to teleworkers via the mesh VPN. For example, such office resources may include networked servers 1634, networked peripheral devices 1636, additional LANs 1638, and networked gateways 1640.

Process for Managing and Controlling a Mesh VPN

Figure 17:
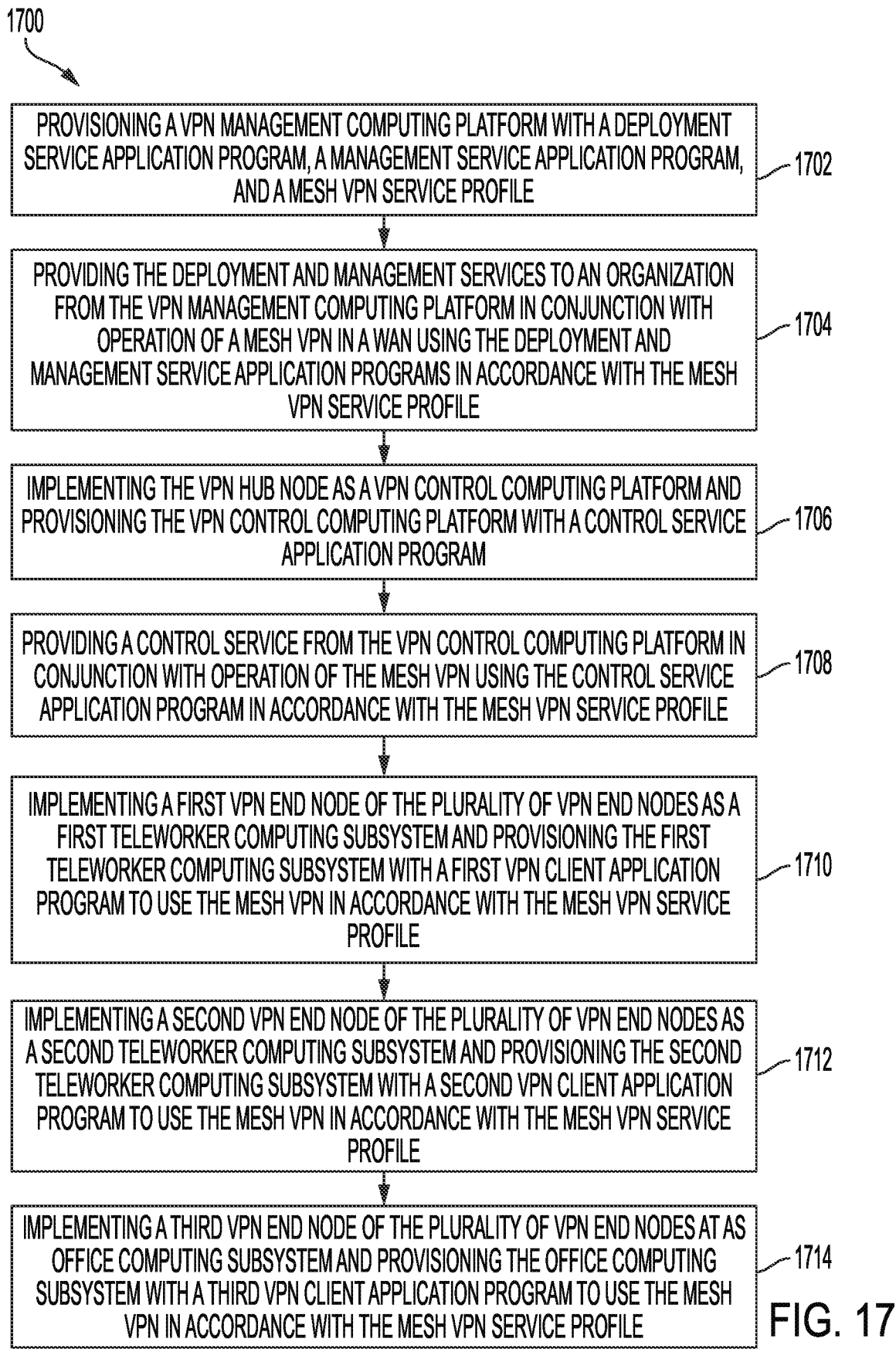
FIG. 17 is a flow chart of an exemplary embodiment for a process for managing and controlling a mesh VPN.

With reference to FIG. 17, an exemplary embodiment of a process 1700 for managing and controlling a mesh VPN begins at 1702 where a VPN management computing platform is provisioned with a deployment service application program, a management service application program, and a mesh VPN service profile. At 1704, the deployment and management services are provided to an organization from the VPN management computing platform in conjunction with operation of a mesh VPN in a WAN using the deployment and management service application programs in accordance with the mesh VPN service profile. The mesh VPN (see, e.g., FIG. 7) includes a VPN hub node (e.g., 704) and a plurality of VPN end nodes (e.g., 706, 708, 710, 712). Each of the plurality of VPN end nodes is configured to communicate with the VPN hub node via at least one spoke communication path (e.g., 720) to form a star VPN topology. Each of the plurality of VPN end nodes is configured to communicate with at least one other VPN end node via peer-to-peer communication paths (e.g., 722) between the plurality of VPN end nodes that form at least a partial mesh VPN topology.

At 1706, the VPN hub node is implemented as a VPN control computing platform. The VPN control computing platform is provisioned with a control service application program. At 1708, a control service is provided from the VPN control computing platform in conjunction with operation of the mesh VPN using the control service application program in accordance with the mesh VPN service profile.

At 1710, a first VPN end node of the plurality of VPN end nodes is implemented as a first teleworker computing subsystem. The first teleworker computing subsystem is provisioned with a first VPN client application program to use the mesh VPN in accordance with the mesh VPN service profile. At 1712, a second VPN end node of the plurality of VPN end nodes is implemented as a second teleworker computing subsystem. The second teleworker computing subsystem is provisioned with a second VPN client application program to use the mesh VPN in accordance with the mesh VPN service profile. At 1714, a third VPN end node of the plurality of VPN end nodes is implemented as an office computing subsystem. The office computing subsystem is provisioned with a third VPN client application program to use the mesh VPN in accordance with the mesh VPN service profile.

In another embodiment, the process 1700 also includes using a tunneling protocol at the VPN control computing platform, the first and second teleworker computing subsystems, and the office computing subsystem to encapsulate and encrypt data traffic for routing from an originating node of the mesh VPN to a destination node of the mesh VPN via virtual tunnels that utilize at least one of the peer-to-peer and spoke communication paths. In a further embodiment, the process 1700 also includes using the virtual tunnels that utilize the spoke communication paths at the VPN control computing platform to encapsulate and encrypt control traffic exchanged with the first teleworker computing subsystem, the second teleworker computing subsystem, and the office computing subsystem. In this embodiment, the control traffic is used at the VPN control computing platform in conjunction with controlling operation of the mesh VPN.

In yet another embodiment, the process 1700 also includes using a tunneling protocol at the VPN control computing platform to encapsulate and encrypt control traffic exchanged with the first teleworker computing subsystem, the second teleworker computing subsystem, and the office computing subsystem via virtual tunnels that utilize a second spoke communication path between the VPN control computing platform and the corresponding VPN end nodes. In this embodiment, the control traffic is used at the VPN control computing platform in conjunction with controlling operation of the mesh VPN.

In still another embodiment, the process 1700 also includes using the WAN at the VPN control computing platform for control traffic exchanged with the first teleworker computing subsystem, the second teleworker computing subsystem, and the office computing subsystem. In this embodiment, the control traffic is used at the VPN control computing platform in conjunction with controlling operation of the mesh VPN.

In still yet another embodiment of the process 1700, the mesh VPN service profile (see, e.g., FIG. 8, 800) includes identification parameters (e.g., 802) for the VPN management computing platform, the VPN hub node, and the plurality of VPN end nodes. In another embodiment of the process 1700, the mesh VPN service profile (e.g., 800) includes i) a management platform profile (e.g., 804) associated with the VPN management computing platform, ii) a hub node profile (e.g., 806) associated with the VPN control computing platform, and iii) a plurality of end node profiles (e.g., 808) corresponding to the plurality of VPN end nodes. The plurality of end node profiles includes a first end node profile (e.g., 810) associated with the first teleworker computing subsystem, a second end node profile (e.g., 812) associated with the second teleworker computing subsystem, and a third end node profile (e.g., 814) associated with the office computing subsystem.

In yet another embodiment of the process 1700, the management platform profile (e.g., see FIG. 8, 804) includes one or more of i) identification parameters, ii) authentication parameters, iii) local routing parameters, iv) local service parameters, v) remote service parameters, vi) local measurement parameters, and vii) local reporting parameters.

In one embodiment, the management platform profile includes identification parameters for the VPN management computing platform, the VPN hub node, and the plurality of VPN end nodes. In another embodiment, the management platform profile includes authentication parameters associated with the VPN management computing platform accessing the VPN hub node, accessing the plurality of VPN end nodes, authorizing access of the VPN hub node to the VPN management computing platform, and authorizing access of the plurality of VPN end nodes to the VPN management computing platform. In yet another embodiment, the management platform profile includes local routing parameters for routing communications between the VPN management computing platform and the VPN hub node and local routing parameters for routing communications between the VPN management computing platform and the plurality of VPN end nodes.

In still another embodiment, the management platform profile includes local service parameters identifying one or more local service hosted by the VPN management computing platform that is available to the plurality of VPN end nodes. The local service parameters indicate which VPN end nodes are authorized to use the corresponding local service. In still yet another embodiment, the management platform profile includes remote service parameters identifying one or more local service hosted by the VPN hub node that is available to the plurality of VPN end nodes and remote service parameters identifying one or more local service hosted by at least one VPN end node that is available to other VPN end nodes. The remote service parameters indicate which VPN end nodes are authorized to use the corresponding local service.

In another embodiment, the management platform profile includes local measurement parameters identifying health and operating characteristics to be measured by the VPN management computing platform, temporal aspects associated with such measurements, and threshold values associated with acceptable, degraded, and failed health and operating characteristics. In yet another embodiment, the management platform profile includes local reporting parameters associated with sending at least one of a local measurement report regarding measured health and operating characteristics to at least one of the VPN hub node and the plurality of VPN end nodes or a portion thereof, parameter updates for the hub node profile to the VPN hub node, parameter updates for the plurality of end node profiles or a portion thereof to at least one of the VPN hub node and the plurality of VPN end nodes or a portion thereof, an updated hub node profile to the VPN hub node, and updated end node profiles for the plurality of VPN end nodes or a portion thereof to at least one of the VPN hub node and the plurality of VPN end nodes or a portion thereof.

In still another embodiment of the process 1700, the hub node profile (e.g., see FIG. 8, 806) includes one or more of i) identification parameters, ii) authentication parameters, iii) local routing parameters, iv) local service parameters, v) remote service parameters, vi) local measurement parameters, vii) local reporting parameters, and viii) local relay parameters.

In one embodiment, the hub node profile includes identification parameters for the VPN management computing platform, the VPN hub node, and the plurality of VPN end nodes. In another embodiment, the hub node profile includes authentication parameters associated with the VPN hub node accessing the VPN management computing platform, accessing the plurality of VPN end nodes, authorizing access of the VPN management computing platform to the VPN hub node, and authorizing access of the plurality of VPN end nodes to the VPN hub node. In yet another embodiment, the hub node profile includes local routing parameters for routing communications between the VPN hub node and the VPN management computing platform and local routing parameters for routing communications between the VPN hub node and the plurality of VPN end nodes.

In still another embodiment, the hub node profile includes local service parameters identifying one or more local service hosted by the VPN hub node that is available to the plurality of VPN end nodes. The local service parameters indicate which VPN end nodes are authorized to use the corresponding local service. In still yet another embodiment, the hub node profile includes remote service parameters identifying one or more local service hosted by at least one VPN end node that is available to other VPN end nodes. The remote service parameters indicate which VPN end nodes are authorized to use the corresponding local service.

In another embodiment, the hub node profile includes local measurement parameters identifying health and operating characteristics to be measured by the VPN hub node, temporal aspects associated with such measurements, and threshold values associated with acceptable, degraded, and failed health and operating characteristics. In yet another embodiment, the hub node profile includes local reporting parameters associated with sending at least one of a local measurement report regarding measured health and operating characteristics to at least one of the VPN management computing platform and the plurality of VPN end nodes or a portion thereof, parameter updates for the hub node profile to the VPN management computing platform, parameter updates for the plurality of end node profiles or a portion thereof to at least one of the VPN management computing platform and the plurality of VPN end nodes or a portion thereof, an updated hub node profile to the VPN management computing platform, and updated end node profiles for the plurality of VPN end nodes or a portion thereof to at least one of the VPN management computing platform and the plurality of VPN end nodes or a portion thereof.

In still another embodiment, the hub node profile includes local relay parameters for the VPN hub node relaying communications from an originating VPN end node to a destination VPN end node via VPN tunnels using the spoke communication paths, including identification of the originating VPN end node, the destination VPN end node, and the corresponding spoke communication paths.

In still yet another embodiment of the process 1700, each end node profile (e.g., see FIG. 8, 808) includes one of more of i) identification parameters, ii) authentication parameters, iii) local routing parameters, iv) local service parameters, v) remote service parameters, vi) local measurement parameters, vii) local reporting parameters, and viii) local relay parameters.

In one embodiment, each end node profile includes identification parameters for the VPN management computing platform, the VPN hub node, and the plurality of VPN end nodes or a portion thereof. In another embodiment, each end node profile includes authentication parameters associated with the corresponding VPN end node accessing the VPN management computing platform, accessing the VPN host node, accessing other VPN end nodes or a portion thereof, authorizing access of the VPN management computing platform to the corresponding VPN end node, authorizing access of the VPN hub node to the corresponding VPN end node, and authorizing access of the other VPN end nodes or a portion thereof to the corresponding VPN end node. In yet another embodiment, each end node profile includes local routing parameters for routing communications between the corresponding VPN end node and the VPN management computing platform, routing parameters for routing communications between the corresponding VPN end node and the VPN hub node, and routing parameters for routing communications between the corresponding VPN end node and other VPN end nodes or a portion thereof.

In still another embodiment, each end node profile includes local service parameters identifying one or more local service hosted by the corresponding VPN end node that is available to other VPN end nodes. The local service parameters indicate which VPN end nodes are authorized to use the corresponding local service. In still yet another embodiment, each end node profile includes remote service parameters identifying one or more local service hosted by the VPN hub node and remote service parameters identifying one or more local service hosted by at least one other VPN end node. The remote service parameters indicate whether the corresponding VPN end node is authorized to use the corresponding local service.

In another embodiment, each end node profile includes local measurement parameters identifying health and operating characteristics to be measured by the corresponding VPN end node, temporal aspects associated with such measurements, and threshold values associated with acceptable, degraded, and failed health and operating characteristics. In yet another embodiment, each end node profile includes local reporting parameters associated with sending at least one of a local measurement report regarding measured health and operating characteristics, parameter updates to the corresponding end node profile, and an updated end node profile for the corresponding VPN end node to at least one of the VPN management computing platform and the VPN hub node.

In still another embodiment, each end node profile includes local relay parameters for the corresponding VPN end node relaying communications from an originating VPN end or hub node to a destination VPN hub or end node via VPN tunnels using at least one of the peer-to-peer communication paths and the spoke communication paths, including identification of the originating VPN end or hub node, the destination VPN hub or end node, and the corresponding peer-to-peer and spoke communication paths.

VPN Management Computing Platform Operation

Figure 18:
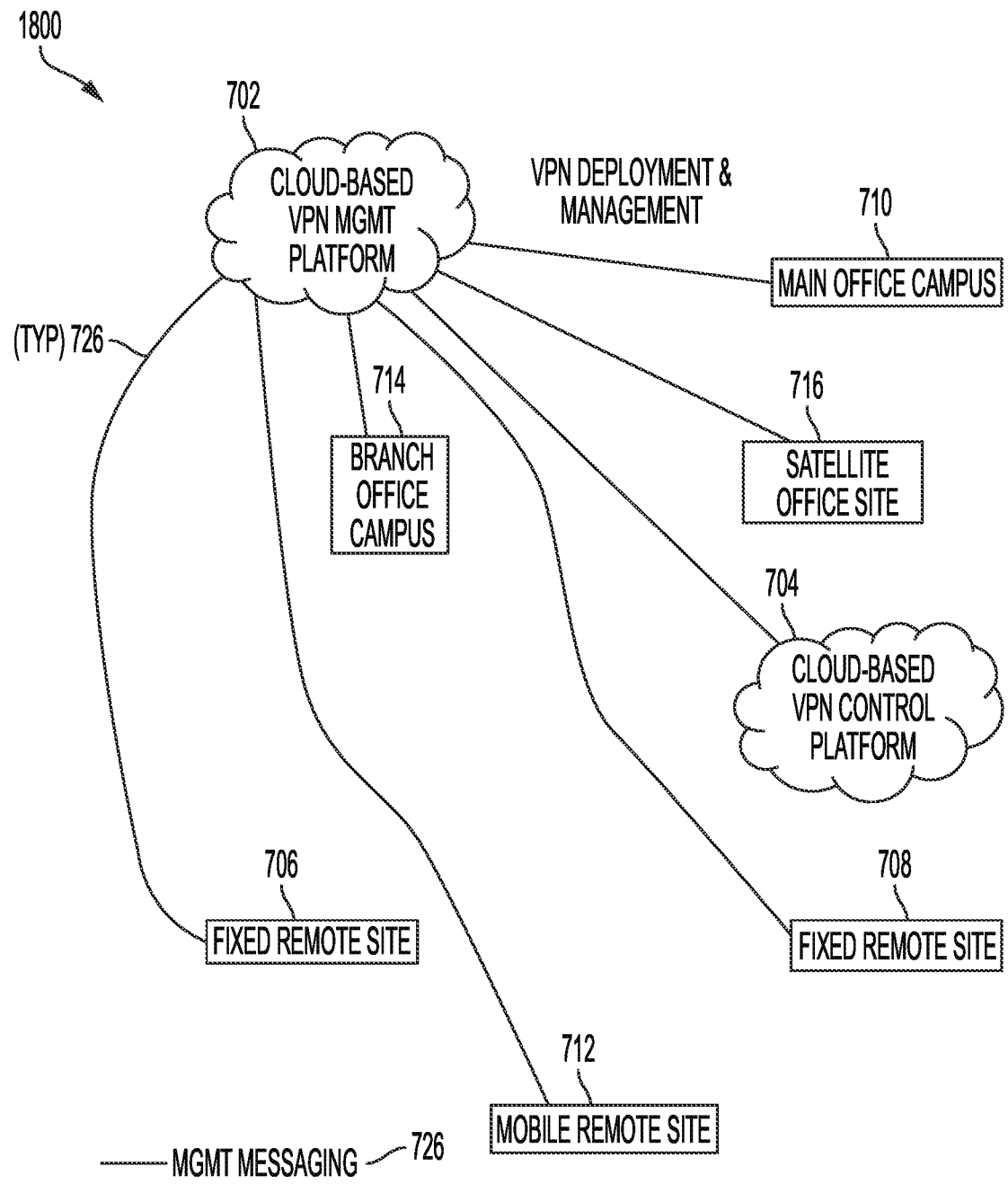
FIG. 18 is a functional block diagram relating to deployment and management services for yet another exemplary embodiment of a system for managing and controlling a mesh VPN.

With reference to FIG. 18, in another embodiment of the process 1700, the deployment and management services 1800 are provided to the organization by the VPN management computing platform 702 in accordance with the mesh VPN service profile (e.g., 800) and the management platform profile (e.g., 804). The deployment and management services 1800 are carried out using management messaging 726 between the VPN management computing platform 702 and the VPN control computing platform 704, the first teleworker computing subsystem 706 (e.g., fixed remote site), the second teleworker computing subsystem 708 (e.g., fixed remote site), and the office computing subsystem 710 (e.g., main office campus). In other embodiments, the deployment and management services 1800 may also be carried out using management messaging between the VPN management computing platform 702 and the third teleworker computing subsystem 712 (e.g., mobile remote site), the second office computing subsystem 714 (e.g., branch office campus), the third office computing subsystem 716 (e.g., satellite office site), additional teleworker computing subsystems, and additional office computing subsystems in any suitable combination.

With reference again to FIGS. 7, 8, and 17, in yet another embodiment, the process 1700 also includes constructing and storing the mesh VPN service profile 800, the management platform profile 804, the hub node profile 806, and the plurality of end node profiles 808 at the VPN management computing platform 702. Next, the management service application program is used to manage the mesh VPN service profile 800, the management platform profile 804, the hub node profile 806, and the plurality of end node profiles 808 at the VPN management computing platform 702 in response to modifiable mesh VPN specifications from the organization. The VPN management computing platform 702 also uses the management service application program to manage the profiles in response to at least one of: i) a local measurement report, ii) a local parameter update to the mesh VPN service profile 800, iii) a local parameter update to the management platform profile 804, iv) a remote measurement report associated with the hub node profile 806 from the VPN hub node 704, v) a remote measurement report associated with the plurality of end node profiles 808 from at least one VPN end node (e.g., 706, 708, 710, 712) of the plurality of VPN end nodes, vi) a remote parameter update associated with the hub node profile 806 from the VPN hub node 704, vii) a remote parameter update associated with the plurality of end node profiles 808 from at least one VPN end node (e.g., 706, 708, 710, 712), viii) an updated hub node profile 806 from the VPN hub node 704, and ix) an updated end node profile 808 from one or more VPN end node (e.g., 706, 708, 710, 712).

Figure 19:
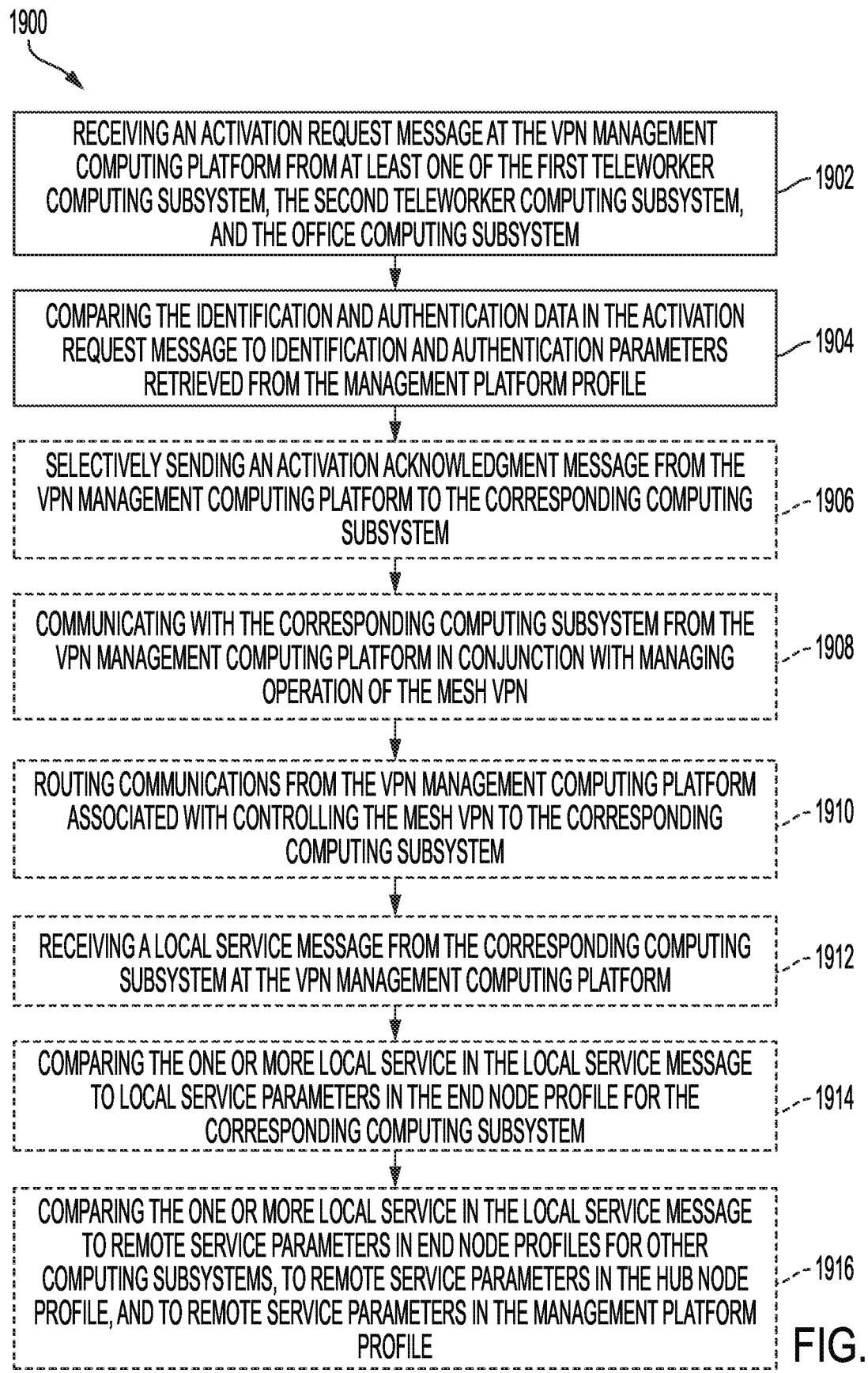
FIG. 19 is a flow chart of an exemplary embodiment for another process for managing and controlling a mesh VPN.

With reference to FIG. 19, an exemplary embodiment of a process 1900 for managing and controlling a mesh VPN from the perspective of the VPN management computing platform is provided. At 1902, an activation request message is received at the VPN management computing platform from at least one of the first teleworker computing subsystem, the second teleworker computing subsystem, and the office computing subsystem in response to activation of the VPN client application program by the corresponding computing subsystem. The activation request message includes identification and authentication data associated with the corresponding computing subsystem. At 1904, the identification and authentication data in the activation request message is compared to identification and authentication parameters retrieved from the management platform profile to confirm the corresponding computing subsystem is authorized to access the VPN control computing platform and authorized to use the mesh VPN.

In another embodiment, the process 1900 also includes selectively sending an activation acknowledgment message from the VPN management computing platform to the corresponding computing subsystem in response to the activation request message (1906). The activation acknowledgment message indicates the mesh VPN is available and the corresponding computing subsystem is authorized to use the mesh VPN. The activation acknowledgment message is routed to the corresponding computing subsystem based on local routing parameters stored in the management platform profile. At 1908, the VPN management computing platform communicates with the corresponding computing subsystem in conjunction with managing operation of the mesh VPN. At 1910, communications are routed from the VPN management computing platform associated with controlling the mesh VPN to the corresponding computing subsystem based on local routing parameters stored in the management platform profile.

In a further embodiment, the process 1900 continues from 1910 to 1912 where a local service message is received from the corresponding computing subsystem at the VPN management computing platform in response to the activation acknowledgment message. The local service message identifies one or more local service hosted by the corresponding computing subsystem. At 1914, the one or more local service in the local service message is compared to local service parameters in the end node profile for the corresponding computing subsystem by the VPN management computing platform. The local service parameters in the corresponding end node profile are updated to identify the one or more local service in the local service message. At 1916, the one or more local service in the local service message is compared to remote service parameters in end node profiles for other computing subsystems, to remote service parameters in the hub node profile, and to remote service parameters in the management platform profile. The remote service parameters in the corresponding profiles are updated to identify the one or more local service in the local service message.

In yet another embodiment, the process 1900 also includes selectively sending an access denied message from the VPN management computing platform to the corresponding computing subsystem in response to the activation request message. The access denied message indicates at least one of the mesh VPN is not available and the corresponding computing subsystem is not authorized to use the mesh VPN.

Another exemplary embodiment of a process 1900 for managing and controlling a mesh VPN from the perspective of the VPN management computing platform includes measuring health and operating characteristics at the VPN management computing platform in accordance with local measurement parameters retrieved from the management platform profile. The local measurement parameters identify health and operating characteristics to be measured by the VPN management computing platform. Next, the local measurements of the health and operating characteristics are compared to local measurement parameters retrieved from the management platform profile to identify acceptable characteristics, degraded characteristics, and failed characteristics associated with the management platform profile. The local measurement parameters from the management platform profile include threshold values associated with acceptable, degraded, and failed health and operating characteristics. Next, a local parameter update to the management platform profile is determined based at least in part on the local measurements for degraded and failed characteristics associated with the management platform profile. Next, the management platform profile stored at the VPN management computing platform is updated based on the local parameter update for the management platform profile to form an updated management platform profile.

In a further embodiment, the process also includes sending a ping request message from the VPN management computing platform to the VPN control computing platform in conjunction with measuring the health and operating characteristics. Next, a ping reply message is received at the VPN management computing platform from the VPN control computing platform at the VPN management computing platform in conjunction with measuring the health and operating characteristics.

In another further embodiment, the process also includes sending a ping request message from the VPN management computing platform to each VPN end node in conjunction with measuring the health and operating characteristics. Next, a ping reply message is received at the VPN management computing platform from each VPN end node to which the ping request message was sent in conjunction with measuring the health and operating characteristics.

In yet another further embodiment, the process also includes sending a local measurement report from the VPN management computing platform to the VPN control computing platform in accordance with local reporting parameters stored in the management platform profile.

In still another further embodiment, the process also includes comparing the local measurements of the health and operating characteristics to local measurement parameters retrieved from the hub node profile to identify acceptable characteristics, degraded characteristics, and failed characteristics associated with the hub node profile. The local measurement parameters from the hub node profile include threshold values associated with acceptable, degraded, and failed health and operating characteristics. Next, a local parameter update to the hub node profile is determined based at least in part on the local measurements for degraded and failed characteristics associated with the hub node profile. Next, the hub node profile stored at the VPN management computing platform is updated based on the local parameter update for the corresponding hub node profile to form a corresponding updated hub node profile. In an even further embodiment, the process also includes sending the local parameter update for the hub node profile from the VPN management computing platform to the VPN control computing platform in accordance with local reporting parameters stored in the management platform profile. In another even further embodiment, the process also includes sending the updated hub node profile from the VPN management computing platform to the VPN control computing platform in accordance with local reporting parameters stored in the management platform profile.

In still yet another further embodiment, the process also includes comparing the local measurements of the health and operating characteristics to local measurement parameters retrieved from the plurality of end node profiles to identify acceptable characteristics, degraded characteristics, and failed characteristics associated with the end node profiles. The local measurement parameters from the end node profiles include threshold values associated with acceptable, degraded, and failed health and operating characteristics for the corresponding end node profile. Next, a local parameter update to each end node profile is determined based at least in part on the local measurements for degraded and failed characteristics associated with the corresponding end node profile. Next, each end node profile stored at the VPN management computing platform is updated based on the local parameter update for the corresponding end node profile to form a corresponding updated end node profile. In an even further embodiment, the process also includes sending the local parameter update for each end node profile from the VPN management computing platform to the corresponding VPN end node for which the local parameter update was determined. The local parameter updates are sent in accordance with local reporting parameters stored in the management platform profile. In another even further embodiment, the process also includes sending the updated end node profile from the VPN management computing platform to the corresponding VPN end node associated with the updated end node profile. The updated end node profiles are sent in accordance with local reporting parameters stored in the management platform profile.

In another exemplary embodiment, the process 1900 includes receiving a remote measurement report at the VPN management computing platform from the VPN control computing platform. Next, a local parameter update to the hub node profile is determined based at least in part on degraded and failed characteristics associated with the VPN control computing platform in the remote measurement report. Next, the hub node profile stored at the VPN management computing platform is updated based on the local parameter update to form an updated hub node profile.

In yet another exemplary embodiment, the process 1900 includes receiving a remote measurement report at the VPN management computing platform from each VPN end node. Next, a local parameter update for the end node profile associated with the corresponding VPN end node is determined based at least in part on degraded and failed characteristics in the remote measurement report from the corresponding VPN end node. Next, the corresponding end node profile stored at the VPN management computing platform is updated based on the local parameter update for the corresponding VPN end node to form an updated end node profile for the corresponding VPN end node.

In still another exemplary embodiment, the process 1900 includes receiving a remote parameter update to the hub node profile at the VPN management computing platform from the VPN control computing platform. Next, the hub node profile stored at the VPN management computing platform is updated based on the remote parameter update to form an updated hub node profile.

In still yet another exemplary embodiment, the process 1900 includes receiving a remote parameter update at the VPN management computing platform from each VPN end node for the end node profile associated with the corresponding VPN end node. Next, the corresponding end node profile stored at the VPN management computing platform is updated based on the remote parameter update from the corresponding VPN end node to form an updated end node profile for the corresponding VPN end node.

In another exemplary embodiment, the process 1900 includes receiving an updated hub node profile at the VPN management computing platform from the VPN control computing platform. Next, the hub node profile stored at the VPN management computing platform is replaced with the updated hub node profile.

In yet another exemplary embodiment, the process 1900 includes receiving an updated end node profile at the VPN management computing platform from each VPN end node for the end node profile associated with the corresponding VPN end node. Next, the corresponding end node profile stored at the VPN management computing platform is replaced with the updated end node profile from the corresponding VPN end node.

In still another exemplary embodiment, the process 1900 includes receiving a ping request message at the VPN management computing platform from the VPN control computing platform in conjunction with the VPN control computing platform measuring health and operating characteristics. Next, a ping reply message is sent from the VPN management computing platform to the VPN control computing platform in response to the ping request message.

In still yet another exemplary embodiment, the process 1900 includes receiving a ping request message at the VPN management computing platform from each VPN end node using the mesh VPN in conjunction with the corresponding VPN end node measuring health and operating characteristics. Next, a ping reply message is sent from the VPN management computing platform to each VPN end node from which the ping request message was received in response to the ping request message.

In another exemplary embodiment, the process 1900 includes sending a relay request message from the VPN management computing platform to at least one of the first teleworker computing subsystem, the second teleworker computing subsystem, the office computing subsystem, and the VPN control computing platform. The relay request message includes identification and authentication data associated with the VPN management computing platform and a request for a relay service to internally connect a first VPN tunnel to a second VPN tunnel. In an even further embodiment, the process also includes receiving a service acknowledgment message from a recipient VPN node in response to the relay request message. The service acknowledgment message indicates the relay service is available at the recipient VPN node and the VPN management computing platform is authorized to request the relay service. In another even further embodiment, the process also includes receiving a service denied message from a recipient VPN node in response to the relay request message. The service denied message indicates at least one of the relay service is not available at the recipient VPN node and the VPN management computing platform is not authorized to request the relay service.

VPN Control Computing Platform Operation

Figure 20:
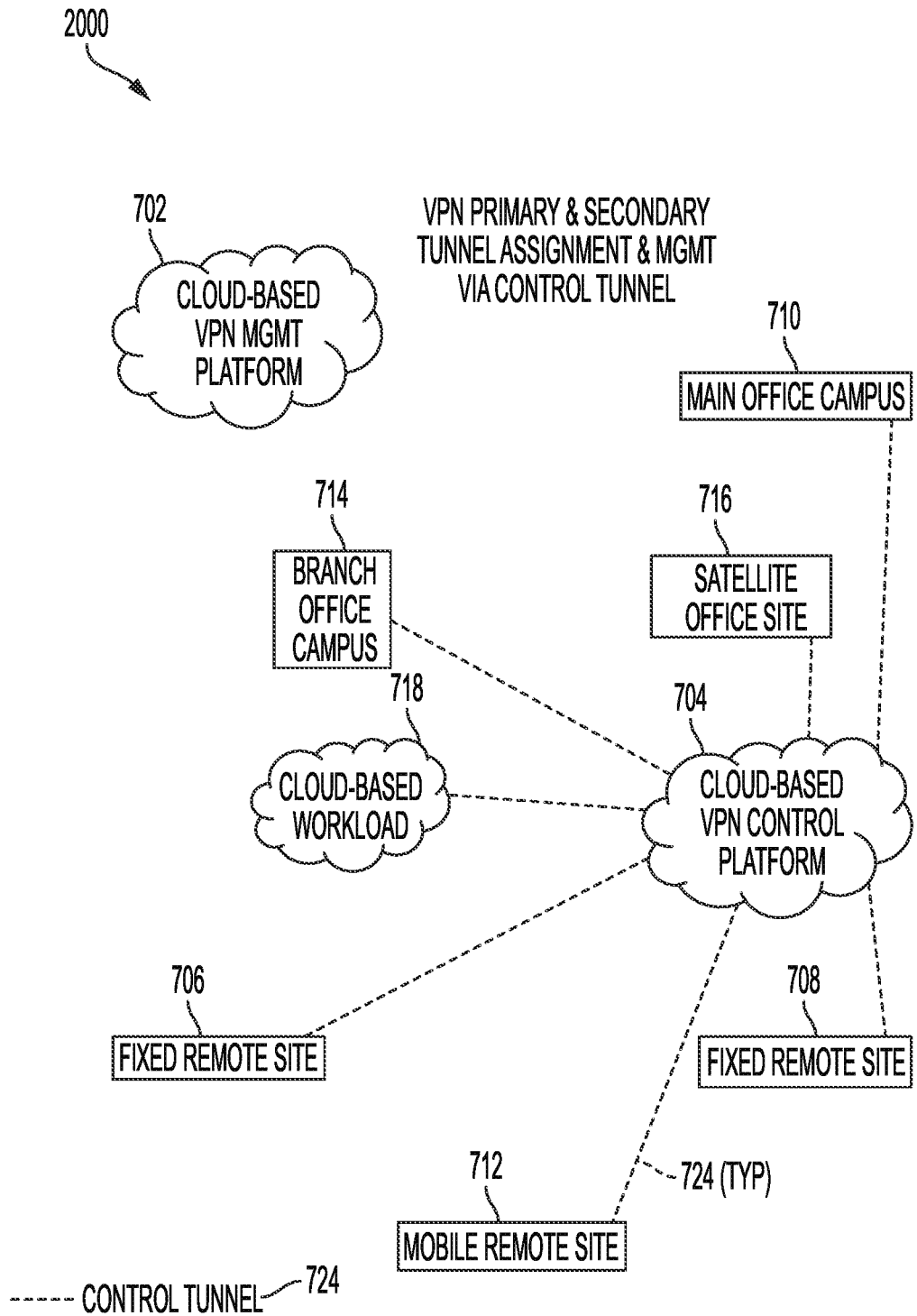
FIG. 20 is a functional block diagram relating to a control service for the exemplary embodiment of the system of FIG. 18.

With reference to FIG. 20, in yet another embodiment of the process 1700, the control service 2000 is provided from the VPN control computing platform 704 in conjunction with operation of the mesh VPN in accordance with the mesh VPN service profile (e.g., 800) and the hub node profile (e.g., 806) (e.g., 806). The control service 2000 are carried out using control messaging between the VPN control computing platform 704 and the first teleworker computing subsystem 706 (e.g., fixed remote site), the second teleworker computing subsystem 708 (e.g., fixed remote site), and the office computing subsystem 710 (e.g., main office campus). Control message traffic may utilize control tunnels 724 between the VPN control computing platform 704 and the corresponding computing subsystem. Alternatively, the control message traffic may be routed via the WAN. Another option is for the control message traffic to share the data tunnel between the VPN control computing platform 704 and the corresponding computing subsystem. In other embodiments, the control service 2000 may also be carried out using control messaging between the VPN management computing platform 702 and the third teleworker computing subsystem 712 (e.g., mobile remote site), the second office computing subsystem 714 (e.g., branch office campus), the third office computing subsystem 716 (e.g., satellite office site), additional teleworker computing subsystems, and additional office computing subsystems in any suitable combination.

With reference again to FIGS. 7, 8, and 17, in still another embodiment, the process 1700 also includes storing the hub node profile 806 and the plurality of end node profiles 808 at the VPN control computing platform 704. Next, the control service application program is used to manage the hub node profile 806 and the plurality of end node profiles 808 at the VPN control computing platform 704 in response to at least one of: i) a local measurement report, ii) a local parameter update to the hub node profile 806, iii) a remote measurement report from the VPN management computing platform 702, iv) a remote parameter update associated with the hub node profile 806 from the VPN management computing platform 702, v) a remote parameter update associated with one or more of the plurality of end node profiles 808 from the VPN management computing platform 702, vi) an updated end node profile associated with one or more of the plurality of end node profiles 808 from the VPN management computing platform 702, vii) a remote parameter update associated with the plurality of end node profiles 808 from the corresponding VPN end node (e.g., 706, 708, 710, 712), and viii) an updated end node profile associated with the plurality of end node profiles 808 from the corresponding VPN end node (e.g., 706, 708, 710, 712).

Figure 21:
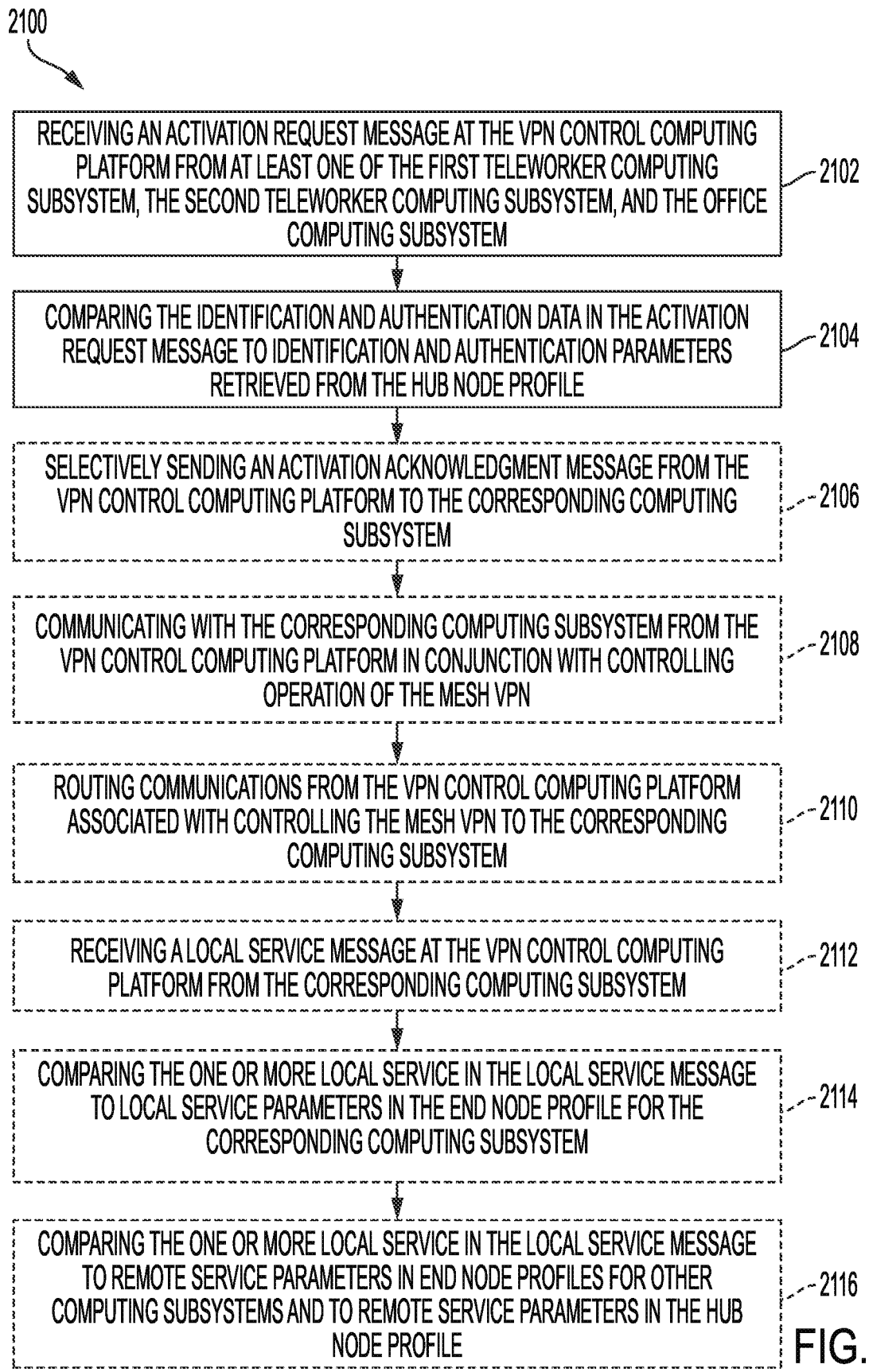
FIG. 21 is a flow chart of an exemplary embodiment for yet another process for managing and controlling a mesh VPN.

With reference to FIG. 21, an exemplary embodiment of a process 2100 for managing and controlling a mesh VPN from the perspective of the VPN control computing platform is provided. At 2102, an activation request message is received at the VPN control computing platform from at least one of the first teleworker computing subsystem, the second teleworker computing subsystem, and the office computing subsystem in response to activation of the VPN client application program by the corresponding computing subsystem. The activation request message includes identification and authentication data associated with the corresponding computing subsystem. At 2104, the identification and authentication data in the activation request message is compared to identification and authentication parameters retrieved from the hub node profile to confirm the corresponding computing subsystem is authorized to access the VPN control computing platform and authorized to use the mesh VPN.

In another embodiment, the process 2100 also includes selectively sending an activation acknowledgment message from the VPN control computing platform to the corresponding computing subsystem in response to the activation request message (2106). The activation acknowledgment message indicates the mesh VPN is available and the corresponding computing subsystem is authorized to use the mesh VPN. The activation acknowledgment message is routed to the corresponding computing subsystem based on local routing parameters stored in the hub node profile. At 2108, the VPN management computing platform communicates with the corresponding computing subsystem in conjunction with controlling operation of the mesh VPN. At 2110, communications from the VPN control computing platform associated with controlling the mesh VPN are routed to the corresponding computing subsystem based on local routing parameters stored in the hub node profile.

In a further embodiment, the process 2100 continues from 2110 to 2112 where a local service message is received at the VPN control computing platform from the corresponding computing subsystem in response to the activation acknowledgment message. The local service message identifies one or more local service hosted by the corresponding computing subsystem. At 2114, the one or more local service in the local service message is compared to local service parameters in the end node profile for the corresponding computing subsystem by the VPN control computing platform. The local service parameters in the corresponding end node profile are updated to identify the one or more local service in the local service message. At 2116, the one or more local service in the local service message is compared to remote service parameters in end node profiles for other computing subsystems and to remote service parameters in the hub node profile. The remote service parameters in the corresponding profiles are updated to identify the one or more local service in the local service message.

In yet another embodiment, the process 2100 also includes selectively sending an access denied message to the corresponding computing subsystem in response to the activation request message. The access denied message indicates at least one of the mesh VPN is not available and the corresponding computing subsystem is not authorized to use the mesh VPN.

Another exemplary embodiment of a process 2100 for management and controlling a mesh VPN from the perspective of the VPN control computing platform includes measuring health and operating characteristics at the VPN control computing platform in accordance with local measurement parameters retrieved from the hub node profile. The local measurement parameters identify health and operating characteristics to be measured by the VPN control computing platform. Next, the local measurements of the health and operating characteristics are compared to local measurement parameters retrieved from the hub node profile to identify acceptable characteristics, degraded characteristics, and failed characteristics. The local measurement parameters from the hub node profile include threshold values associated with acceptable, degraded, and failed health and operating characteristics. Next, a local parameter update to the hub node profile is determined based at least in part on the local measurements for degraded and failed characteristics associated with the hub node profile. Next, the hub node profile stored at the VPN control computing platform is updated based on the local parameter update for the hub node profile to form an updated hub node profile.

In a further embodiment, the process also includes sending a ping request message from the VPN control computing platform to the VPN management computing platform in conjunction with measuring the health and operating characteristics. Next, a ping reply message is received at the VPN control computing platform from the VPN management computing platform in conjunction with measuring the health and operating characteristics.

In another further embodiment, the process also includes sending a ping request message from the VPN control computing platform to each VPN end node using the mesh VPN in conjunction with measuring the health and operating characteristics. The ping request message is sent to each VPN end node via a corresponding VPN tunnel between the VPN control computing platform and the corresponding VPN end node. Next, a ping reply message is received at the VPN control computing platform from each VPN end node to which the ping request message was sent in conjunction with measuring the health and operating characteristics. The ping reply message is received from each VPN end node via the corresponding VPN tunnel over which the ping request message was sent.

In yet another further embodiment, the process also includes sending a local measurement report from the VPN control computing platform to the VPN management computing platform in accordance with local reporting parameters stored in the hub node profile.

In still another further embodiment, the process also includes sending the local parameter update for the hub node profile from the VPN control computing platform to the VPN management computing platform in accordance with local reporting parameters stored in the hub node profile.

In still yet another further embodiment, the process also includes sending the updated hub node profile from the VPN control computing platform to the VPN management computing platform in accordance with local reporting parameters stored in the hub node profile.

In another further embodiment, the process also includes comparing the local measurements of the health and operating characteristics to local measurement parameters retrieved from the plurality of end node profiles to identify acceptable characteristics, degraded characteristics, and failed characteristics associated with the end node profiles. The local measurement parameters from the end node profiles include threshold values associated with acceptable, degraded, and failed health and operating characteristics for the corresponding end node profile. Next, a local parameter update to each end node profile is determined based at least in part on the local measurements for degraded and failed characteristics associated with the corresponding end node profile. Next, each end node profile stored at the VPN control computing platform is updated based on the local parameter update for the corresponding end node profile to form a corresponding updated end node profile. In an even further embodiment, the process also includes sending the local parameter update for each end node profile from the VPN control computing platform to the VPN management computing platform in accordance with local reporting parameters stored in the hub node profile. In another even further embodiment, the process also includes sending the local parameter update for each end node profile from the VPN control computing platform to the corresponding VPN end node for which the local parameter update was determined. The local parameter updates are sent in accordance with local reporting parameters stored in the hub node profile. In yet another even further embodiment, the process also includes sending each updated end node profile from the VPN control computing platform to the VPN management computing platform in accordance with local reporting parameters stored in the hub node profile. In another even further embodiment, the process also includes sending the updated end node profile from the VPN control computing platform to the corresponding VPN end node associated with the updated end node profile. The updated end node profiles are sent in accordance with local reporting parameters stored in the hub node profile.

In another exemplary embodiment, the process 2100 includes receiving a remote measurement report at the VPN control computing platform from the VPN management computing platform. Next, a local parameter update to the hub node profile is determined based at least in part on degraded and failed characteristics associated with the VPN control computing platform in the remote measurement report. Next, the hub node profile stored at the VPN control computing platform is updated based on the local parameter update to form an updated hub node profile.

In yet another exemplary embodiment, the process 2100 includes receiving a remote measurement report at the VPN control computing platform from each VPN end node. Next, a local parameter update for the end node profile associated with the corresponding VPN end node is determined based at least in part on degraded and failed characteristics in the remote measurement report from the corresponding VPN end node. Next, the corresponding end node profile stored at the VPN control computing platform is updated based on the local parameter update for the corresponding VPN end node to form an updated end node profile for the corresponding VPN end node.

In still another exemplary embodiment, the process 2100 includes receiving a remote parameter update to the hub node profile at the VPN control computing platform from the VPN management computing platform. Next, the hub node profile stored at the VPN control computing platform is updated based on the remote parameter update to form an updated hub node profile.

In still yet another exemplary embodiment, the process 2100 includes receiving a remote parameter update at the VPN control computing platform from each VPN end node for the end node profile associated with the corresponding VPN end node. Next, the corresponding end node profile stored at the VPN control computing platform is updated based on the remote parameter update from the corresponding VPN end node to form an updated end node profile for the corresponding VPN end node.

In another exemplary embodiment, the process 2100 includes receiving an updated hub node profile at the VPN control computing platform from the VPN management computing platform. Next, the hub node profile stored at the VPN control computing platform is replaced with the updated hub node profile.

In yet another exemplary embodiment, the process 2100 includes receiving an updated end node profile at the VPN control computing platform from each VPN end node for the end node profile associated with the corresponding VPN end node. Next, the corresponding end node profile stored at the VPN control computing platform is replaced with the updated end node profile from the corresponding VPN end node.

In still another exemplary embodiment, the process 2100 includes receiving a ping request message at the VPN control computing platform from the VPN management computing platform in conjunction with the VPN management computing platform measuring health and operating characteristics. Next, a ping reply message is sent from the VPN control computing platform to the VPN management computing platform in response to the ping request message.

In still yet another exemplary embodiment, the process 2100 includes receiving a ping request message at the VPN control computing platform from each VPN end node using the mesh VPN in conjunction with the corresponding VPN end node measuring health and operating characteristics. The ping request message is received from each VPN end node via a VPN tunnel between the VPN control computing platform and the corresponding VPN end node. Next, a ping reply message is sent from the VPN control computing platform to each VPN end node from which the ping request message was received in response to the ping request message. The ping reply message is sent to the corresponding VPN end node via the VPN tunnel over which the ping request message was received.

Figure 22:
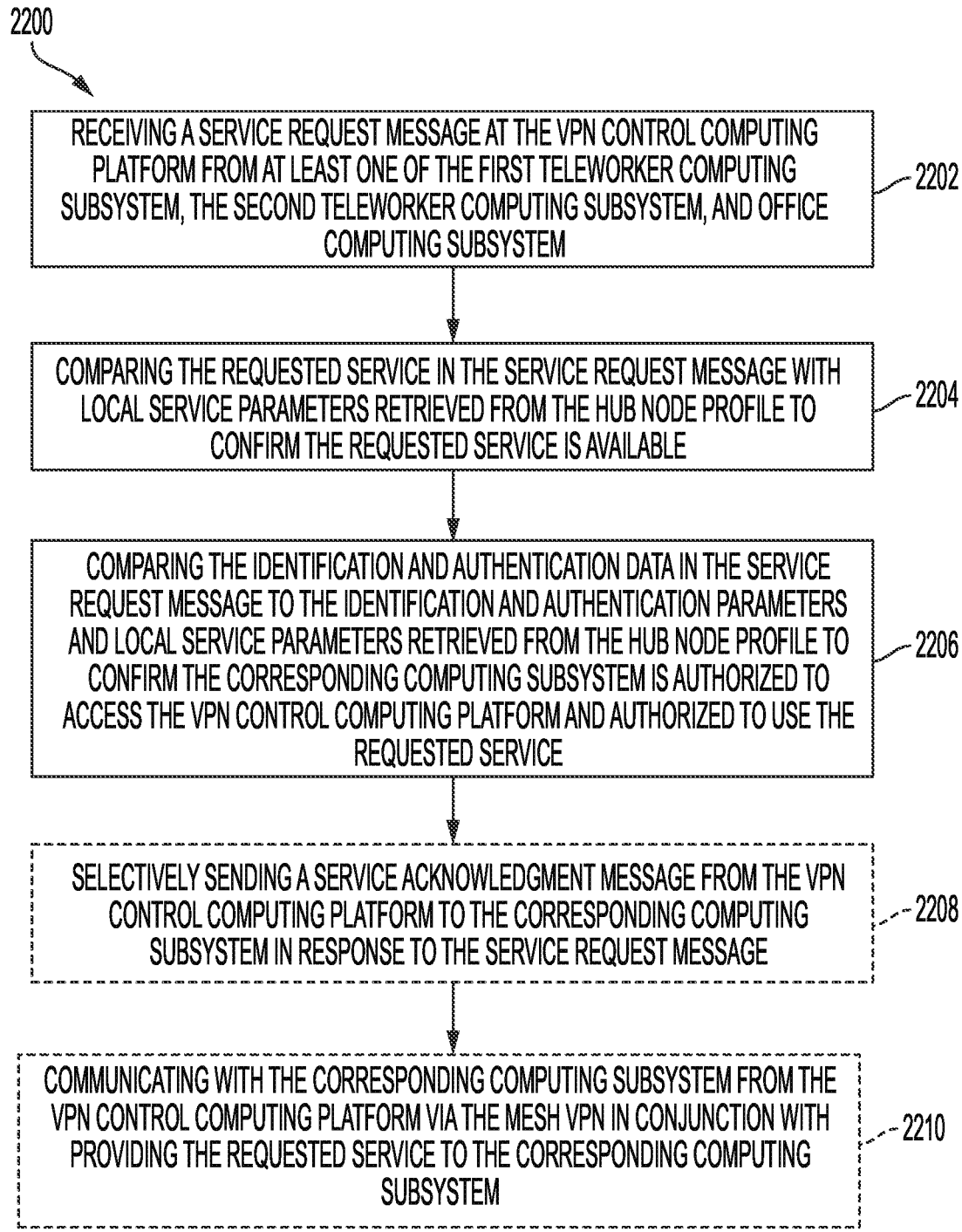
FIG. 22 is a flow chart of an exemplary embodiment for still another process for managing and controlling a mesh VPN.

With reference to FIG. 22, another exemplary embodiment of a process 2200 for managing and controlling a mesh VPN from the perspective of the VPN control computing platform is provided. At 2202, a service request message is received at the VPN control computing platform from at least one of the first teleworker computing subsystem, the second teleworker computing subsystem, and office computing subsystem. The service request message includes identification and authentication data associated with the corresponding computing subsystem and a requested service. At 2204, the requested service in the service request message is compared with local service parameters retrieved from the hub node profile to confirm the requested service is available. At 2206, the identification and authentication data in the service request message is compared to the identification and authentication parameters and local service parameters retrieved from the hub node profile to confirm the corresponding computing subsystem is authorized to access the VPN control computing platform and authorized to use the requested service.

In another embodiment, the process 2100 also includes selectively sending a service acknowledgment message from the VPN control computing platform to the corresponding computing subsystem in response to the service request message (2208). The service acknowledgment message indicates the requested service is available and the corresponding computing subsystem is authorized to use the requested service. At 2210, the VPN control computing platform communicates with the corresponding computing subsystem via the mesh VPN in conjunction with providing the requested service to the corresponding computing subsystem. Communications from the VPN control computing platform associated with the requested service are routed based on local routing parameters stored in the hub node profile.

In yet another embodiment, the process also includes selectively sending a service denied message from the VPN control computing platform to the corresponding computing subsystem in response to the service request message. The service denied message indicates at least one of the requested service is not available and the corresponding computing subsystem is not authorized to use the requested service.

Figure 23:
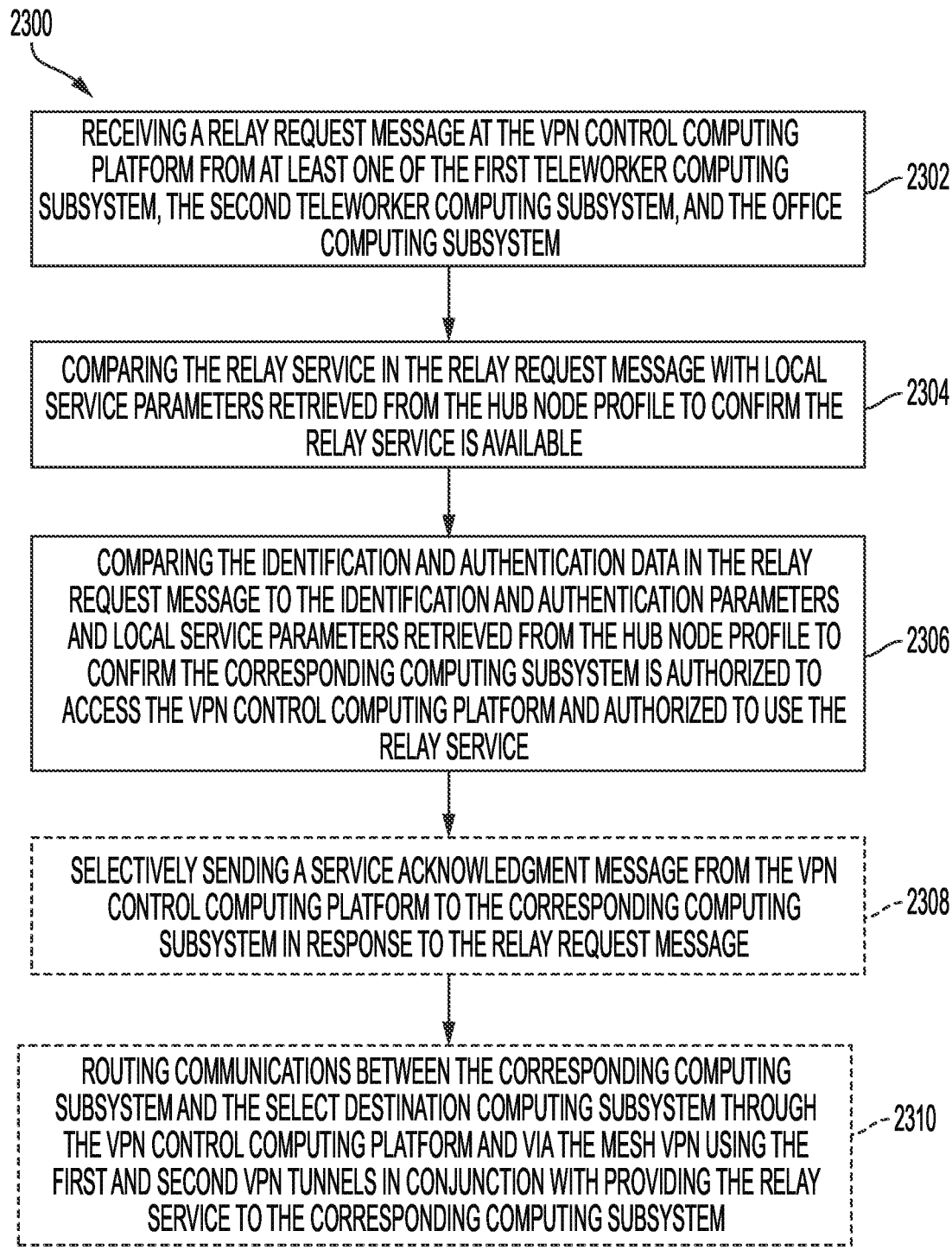
FIG. 23 is a flow chart of an exemplary embodiment for still yet another process for managing and controlling a mesh VPN.

With reference to FIG. 23, yet another exemplary embodiment of a process 2300 for managing and controlling a mesh VPN from the perspective of the VPN control computing platform is provided. At 2302, a relay request message is received at the VPN control computing platform from at least one of the first teleworker computing subsystem, the second teleworker computing subsystem, and the office computing subsystem. The relay request message includes identification and authentication data associated with the corresponding computing subsystem and a request for a relay service to internally connect a first VPN tunnel between the corresponding computing subsystem and the VPN control computing platform to a second VPN tunnel between the VPN control computing platform and a select destination computing subsystem. The select destination computing subsystem is another VPN end node. At 2304, the relay service in the relay request message is compared with local service parameters retrieved from the hub node profile to confirm the relay service is available. At 2306, the identification and authentication data in the relay request message is compared to the identification and authentication parameters and local service parameters retrieved from the hub node profile to confirm the corresponding computing subsystem is authorized to access the VPN control computing platform and authorized to use the relay service.

In a further embodiment, the process 2300 also includes selectively sending a service acknowledgment message from the VPN control computing platform to the corresponding computing subsystem in response to the relay request message (2308). The service acknowledgment message indicates the relay service is available and the corresponding computing subsystem is authorized to use the relay service. At 2310, communications are routed between the corresponding computing subsystem and the select destination computing subsystem through the VPN control computing platform and via the mesh VPN using the first and second VPN tunnels in conjunction with providing the relay service to the corresponding computing subsystem. Communications from the VPN control computing platform associated with the relay service are routed based on the local service parameters and local relay parameters stored in the hub node profile.

In another further embodiment, the process 2300 also includes selectively sending a service denied message from the VPN control computing platform to the corresponding computing subsystem in response to the relay request message. The service denied message indicates at least one of the relay service is not available and the corresponding computing subsystem is not authorized to use the relay service. The service denied message is routed based on local routing parameters stored in the hub node profile.

In yet another exemplary embodiment, the process 2300 includes sending a relay request message from the VPN control computing platform to at least one of the first teleworker computing subsystem, the second teleworker computing subsystem, and the office computing subsystem. The relay request message includes identification and authentication data associated with the VPN control computing platform and a request for a relay service to internally connect a first VPN tunnel between the VPN control computing platform and the corresponding computing subsystem to a second VPN tunnel between the corresponding computing subsystem and a select destination computing subsystem. The select destination computing subsystem is another VPN end node.

In a further embodiment, the process 2300 also includes receiving a service acknowledgment message at the VPN control computing platform from the corresponding computing subsystem in response to the relay request message. The service acknowledgment message indicates the relay service is available and the VPN control computing platform is authorized to use the relay service. Next, the VPN control computing platform communicates with the corresponding computing subsystem using the first VPN tunnel in conjunction with the corresponding computing subsystem providing the relay service to the VPN control computing platform. Communications from the VPN control computing platform associated with the relay service are routed based on the local service parameters and local relay parameters stored in the hub node profile.

In another further embodiment, the process 2300 also includes receiving a service denied message at the VPN control computing platform from the corresponding computing subsystem in response to the relay request message. The service denied message indicates at least one of the relay service is not available and the VPN control computing platform is not authorized to use the relay service.

Teleworker Computing Subsystem Operation (First Example)

With reference to FIGS. 7, 8, 11, and 17, in still yet another embodiment of the process 1700, the VPN client application program 1114 enables the teleworker computing subsystem 1100 to communicate via the mesh VPN in accordance with the mesh VPN service profile 800 and the end node profile 1116. In another embodiment, the process 1700 also includes storing the end node profile 1116 at the teleworker computing subsystem 1100. Next, the VPN client application program 1114 is used to manage the end node profile 1116 at the teleworker computing subsystem 1100 in response to at least one of: i) a local measurement report, ii) a local parameter update to the end node profile 1116, iii) a remote measurement report from at least one of the VPN management computing platform 702 and the VPN control computing platform 704, iv) a remote parameter update associated with the end node profile 1116 from at least one of the VPN management computing platform 702 and the VPN control computing platform 704, and an v) updated end node profile 1116 from at least one of the VPN management computing platform 702 and the VPN control computing platform 704.

Figure 24:
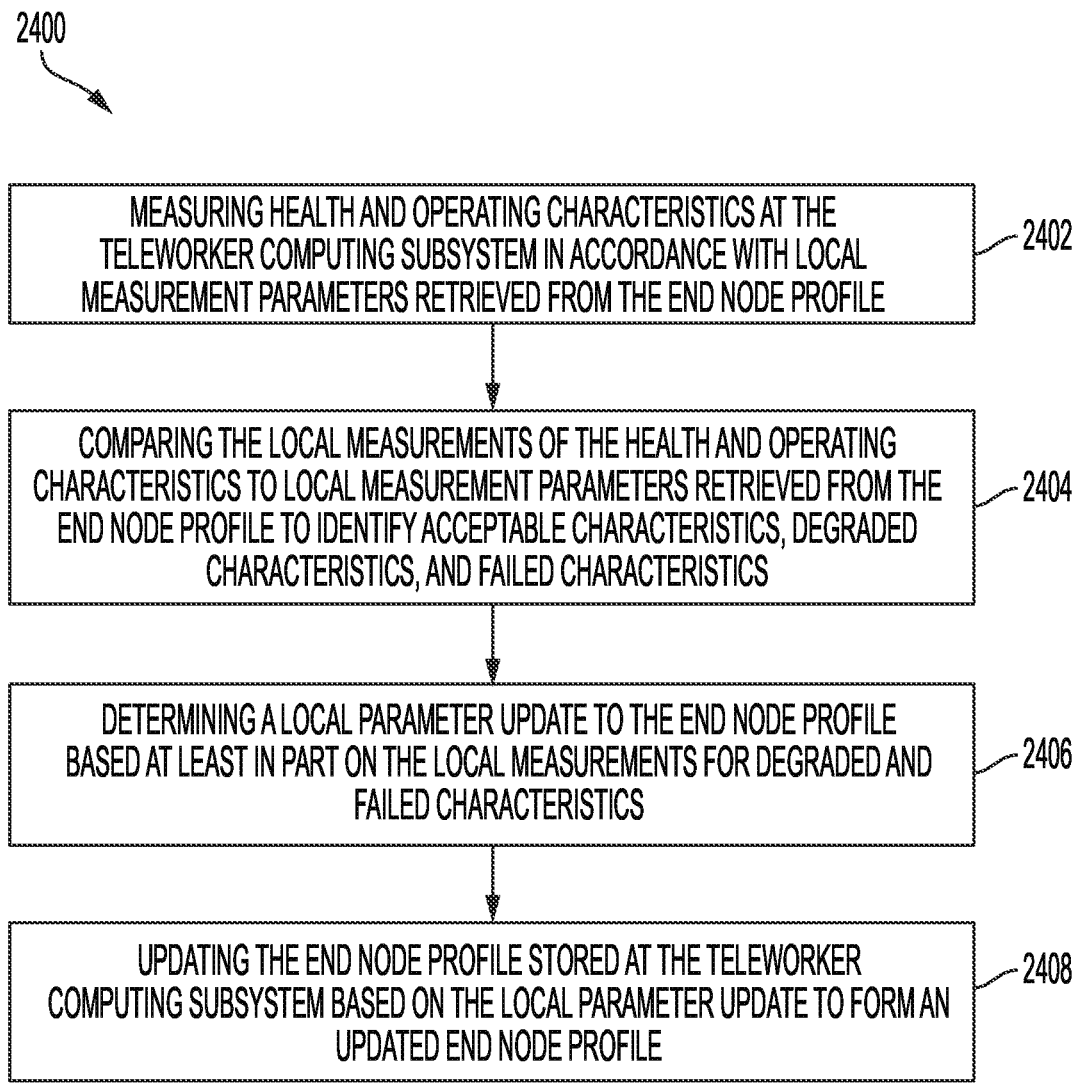
FIG. 24 is a flow chart of an exemplary embodiment for another process for managing and controlling a mesh VPN.

With reference to FIG. 24, an exemplary embodiment of a process 2400 for managing and controlling a mesh VPN from the perspective of the teleworker computing subsystem is provided. At 2402, health and operating characteristics are measured at the teleworker computing subsystem in accordance with local measurement parameters retrieved from the end node profile. The local measurement parameters identify health and operating characteristics to be measured by the teleworker computing subsystem. At 2404, the local measurements of the health and operating characteristics are compared to local measurement parameters retrieved from the end node profile to identify acceptable characteristics, degraded characteristics, and failed characteristics. The local measurement parameters include threshold values associated with acceptable, degraded, and failed health and operating characteristics. At 2406, a local parameter update to the end node profile is determined based at least in part on the local measurements for degraded and failed characteristics. At 2408, the end node profile stored at the teleworker computing subsystem is updated based on the local parameter update to form an updated end node profile.

In a further embodiment, the process 2400 also includes sending a ping request message from the teleworker computing subsystem to the VPN control computing platform via a VPN tunnel in conjunction with measuring the health and operating characteristics. Next, a ping reply message is received at the teleworker computing subsystem from the VPN control computing platform via the VPN tunnel in conjunction with measuring the health and operating characteristics.

In another further embodiment, the process 2400 also includes sending a ping request message from the teleworker computing subsystem to the VPN management computing platform in conjunction with measuring the health and operating characteristics. Next, a ping reply message is received at the teleworker computing subsystem from the VPN management computing platform in conjunction with measuring the health and operating characteristics.

In yet another further embodiment, the process 2400 also includes sending a ping request message from the teleworker computing subsystem to each VPN end node with which the teleworker computing subsystem is authorized to communicate in conjunction with measuring the health and operating characteristics. The ping request message is sent to the VPN end node via a corresponding VPN tunnel between the teleworker computing subsystem and the corresponding VPN end node. Next, a ping reply message is received from each VPN end node to which the ping request message was sent in conjunction with measuring the health and operating characteristics. The ping reply message is received from each VPN end node via the corresponding VPN tunnel over which the ping request message was sent.

In still another further embodiment, the process 2400 also includes sending a local measurement report from the teleworker computing subsystem to at least one of the VPN control computing platform and the VPN management computing platform in accordance with local reporting parameters stored in the end node profile. In still yet another further embodiment, the process 2400 also includes sending the local parameter update from the teleworker computing subsystem to at least one of the VPN control computing platform and the VPN management computing platform in accordance with local reporting parameters stored in the end node profile. In another further embodiment, the process 2400 also includes sending the updated end node profile from the teleworker computing subsystem to at least one of the VPN control computing platform and the VPN management computing platform in accordance with local reporting parameters stored in the end node profile.

Another exemplary embodiment of a process 2400 for managing and controlling a mesh VPN from the perspective of the teleworker computing subsystem includes sending an activation request message from the teleworker computing subsystem to the VPN control computing platform in response to activation of the VPN client application program. The activation request message includes identification and authentication parameters retrieved from the end node profile. The activation request message is routed based on local routing parameters stored in the end node profile. Next, a local service message is sent from the teleworker computing subsystem to the VPN control computing platform in response to an activation acknowledgment message from the VPN control computing platform. The activation acknowledgment message indicates authentication was successful and the office computing subsystem is active on the mesh VPN. The local service message includes local service parameters retrieved from the end node profile and identifies one or more local service hosted by the teleworker computing subsystem.

In another exemplary embodiment, the process 2400 includes receiving a remote measurement report at the teleworker computing subsystem from at least one of the VPN control computing platform and the VPN management computing platform. Next, a local parameter update to the end node profile is determined based at least in part on degraded and failed characteristics associated with the teleworker computing subsystem in the remote measurement report. Next, the end node profile stored at the teleworker computing subsystem is updated based on the local parameter update to form an updated end node profile.

In yet another exemplary embodiment, the process 2400 includes receiving a remote parameter update to the end node profile at the teleworker computing subsystem from at least one of the VPN control computing platform and the VPN management computing platform. Next, the end node profile stored at the teleworker computing subsystem is updated based on the remote parameter update to form an updated end node profile.

In still another exemplary embodiment, the process 2400 includes receiving an updated end node profile at the teleworker computing subsystem from at least one of the VPN control computing platform and the VPN management computing platform. Next, the end node profile stored at the teleworker computing subsystem is replaced with the updated end node profile.

In still yet another exemplary embodiment, the process 2400 includes receiving a ping request message at the teleworker computing subsystem from the VPN control computing platform via a VPN tunnel in conjunction with the VPN control computing platform measuring health and operating characteristics. Next, a ping reply message is sent from the teleworker computing subsystem to the VPN control computing platform via the VPN tunnel in response to the ping request message.

In another exemplary embodiment, the process 2400 includes receiving a ping request message at the teleworker computing subsystem from the VPN management computing platform in conjunction with the VPN management computing platform measuring health and operating characteristics. Next, a ping reply message is sent from the teleworker computing subsystem to the VPN management computing platform in response to the ping request message.

In yet another exemplary embodiment, the process 2400 includes receiving a ping request message at the teleworker computing subsystem from each VPN end node with which the office computing subsystem is authorized to communicate in conjunction with the corresponding VPN end node measuring health and operating characteristics. The ping request message is received from each VPN end node via a VPN tunnel between the teleworker computing subsystem and the corresponding VPN end node. Next, a ping reply message is sent from the teleworker computing subsystem to each VPN end node from which the ping request message was received in response to the ping request message. The ping reply message is sent to the corresponding VPN end node via the VPN tunnel over which the ping request message was received.

Figure 25:
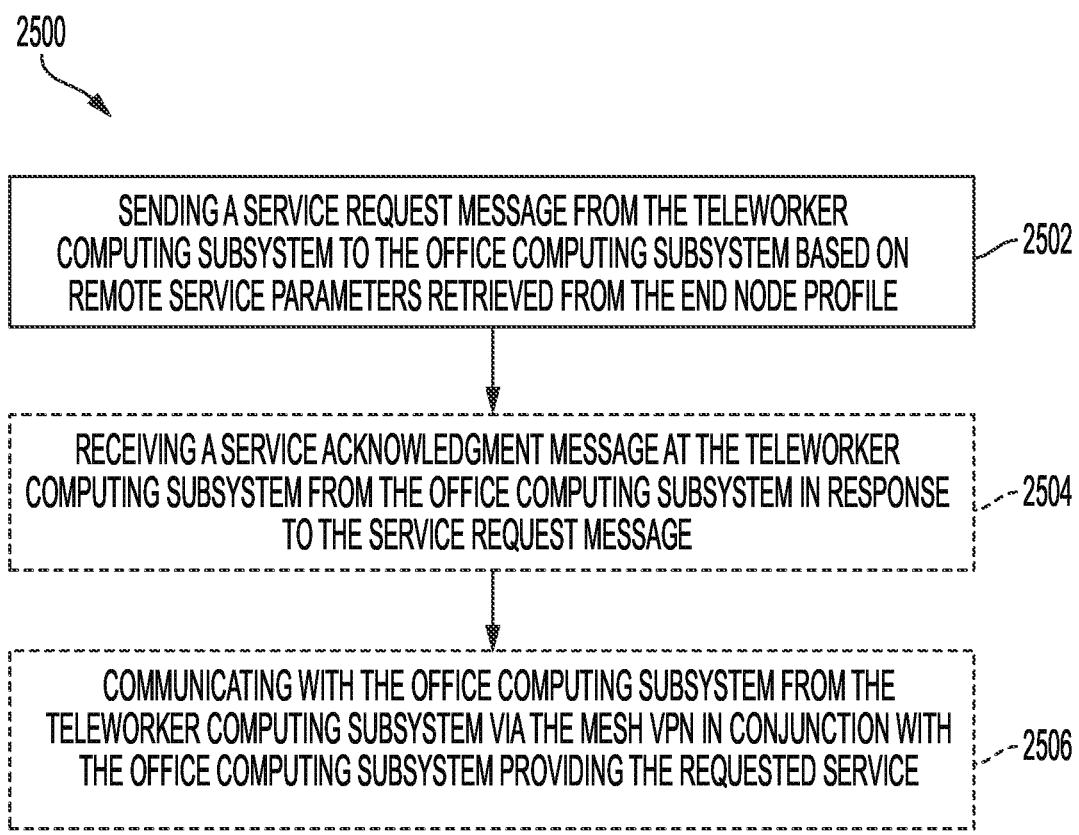
FIG. 25 is a flow chart of an exemplary embodiment for yet another process for managing and controlling a mesh VPN.

With reference to FIG. 25, another exemplary embodiment of a process 2500 for managing and controlling a mesh VPN from the perspective of the teleworker computing subsystem is provided. At 2502, a service request message is sent from the teleworker computing subsystem to the office computing subsystem based on remote service parameters retrieved from the end node profile. The service request message includes identification and authentication data associated with the teleworker computing subsystem based on identification and authentication parameters stored in the end node profile. The service request message includes a requested service based on remote service parameters stored in the end node profile identifying remote services hosted by the office computing subsystem.

In another embodiment, the process 2500 also includes receiving a service acknowledgment message at the teleworker computing subsystem from the office computing subsystem in response to the service request message (2504). The service acknowledgment message indicates the requested service is available and the teleworker computing subsystem is authorized to use the requested service. At 2506, the teleworker computing subsystem communicates with the office computing subsystem via the mesh VPN in conjunction with the office computing subsystem providing the requested service. Communications from the teleworker computing subsystem associated with the requested service are routed based on local routing parameters stored in the end node profile.

In yet another embodiment, the process 2500 also includes receiving a service denied message at the teleworker computing subsystem from the office computing subsystem in response to the service request message. The service denied message indicates at least one of the requested service is not available and the teleworker computing subsystem is not authorized to use the requested service.

Another exemplary embodiment of a process 2500 for managing and controlling a mesh VPN from the perspective of the teleworker computing subsystem includes sending a service request message from the teleworker computing subsystem to the VPN control computing platform based on remote service parameters retrieved from the end node profile. The service request message includes identification and authentication data associated with the teleworker computing subsystem based on identification and authentication parameters stored in the end node profile. The service request message includes a requested service based on remote service parameters stored in the end node profile identifying remote services hosted by the VPN control computing platform. In a further embodiment, the process also includes receiving a service acknowledgment message at the teleworker computing subsystem from the VPN control computing platform in response to the service request message. The service acknowledgment message indicates the requested service is available and the teleworker computing subsystem is authorized to use the requested service. Next, the teleworker computing subsystem communicates with the VPN control computing platform via the mesh VPN in conjunction with the VPN control computing platform providing the requested service. Communications from the teleworker computing subsystem associated with the requested service are routed based on local routing parameters stored in the end node profile. In another further embodiment, the process also includes receiving a service denied message at the teleworker computing subsystem from the VPN control computing platform in response to the service request message. The service denied message indicates at least one of the requested service is not available and the teleworker computing subsystem is not authorized to use the requested service.

In another exemplary embodiment, the process 2500 includes sending a service request message from the teleworker computing subsystem to another teleworker computing subsystem based on remote service parameters retrieved from the end node profile. The service request message includes identification and authentication data associated with the teleworker computing subsystem based on identification and authentication parameters stored in the end node profile. The service request message includes a requested service based on remote service parameters stored in the end node profile identifying remote services hosted by the other teleworker computing subsystem. In a further embodiment, the process also includes receiving a service acknowledgment message at the teleworker computing subsystem from the other teleworker computing subsystem in response to the service request message. The service acknowledgment message indicates the requested service is available and the teleworker computing subsystem is authorized to use the requested service. Next, the teleworker computing subsystem communicates with the other teleworker computing subsystem via the mesh VPN in conjunction with the other teleworker computing subsystem providing the requested service. Communications from the teleworker computing subsystem associated with the requested service are routed based on local routing parameters stored in the end node profile. In another further embodiment, the process also includes receiving a service denied message at the teleworker computing subsystem from the other teleworker computing subsystem in response to the service request message. The service denied message indicates at least one of the requested service is not available and the teleworker computing subsystem is not authorized to use the requested service.

In yet another exemplary embodiment, the process 2500 includes receiving a service request message at the teleworker computing subsystem from at least one of another teleworker computing subsystem and the office computing subsystem. The service request message includes identification and authentication data associated with the corresponding computing subsystem and a requested service. Next, the requested service in the service request message is compared with local service parameters retrieved from the end node profile to confirm the requested service is available. Next, the identification and authentication data in the service request message is compared to the identification and authentication parameters and local service parameters retrieved from the end node profile to confirm the corresponding computing subsystem is authorized to access the teleworker computing subsystem and authorized to use the requested service. In a further embodiment, the process also includes selectively sending a service acknowledgment message from the teleworker computing subsystem to the corresponding computing subsystem in response to the service request message. The service acknowledgment message indicates the requested service is available and the corresponding computing subsystem is authorized to use the requested service. Next, the teleworker computing subsystem communicates with the corresponding computing subsystem via the mesh VPN in conjunction with providing the requested service to the corresponding computing subsystem. Communications from the teleworker computing subsystem associated with the requested service are routed based on local routing parameters stored in the end node profile. In another further embodiment, the process also includes selectively sending a service denied message from the teleworker computing subsystem to the corresponding computing subsystem via the VPN tunnel in response to the service request message. The service denied message indicates at least one of the requested service is not available and the corresponding computing subsystem is not authorized to use the requested service.

Figure 26:
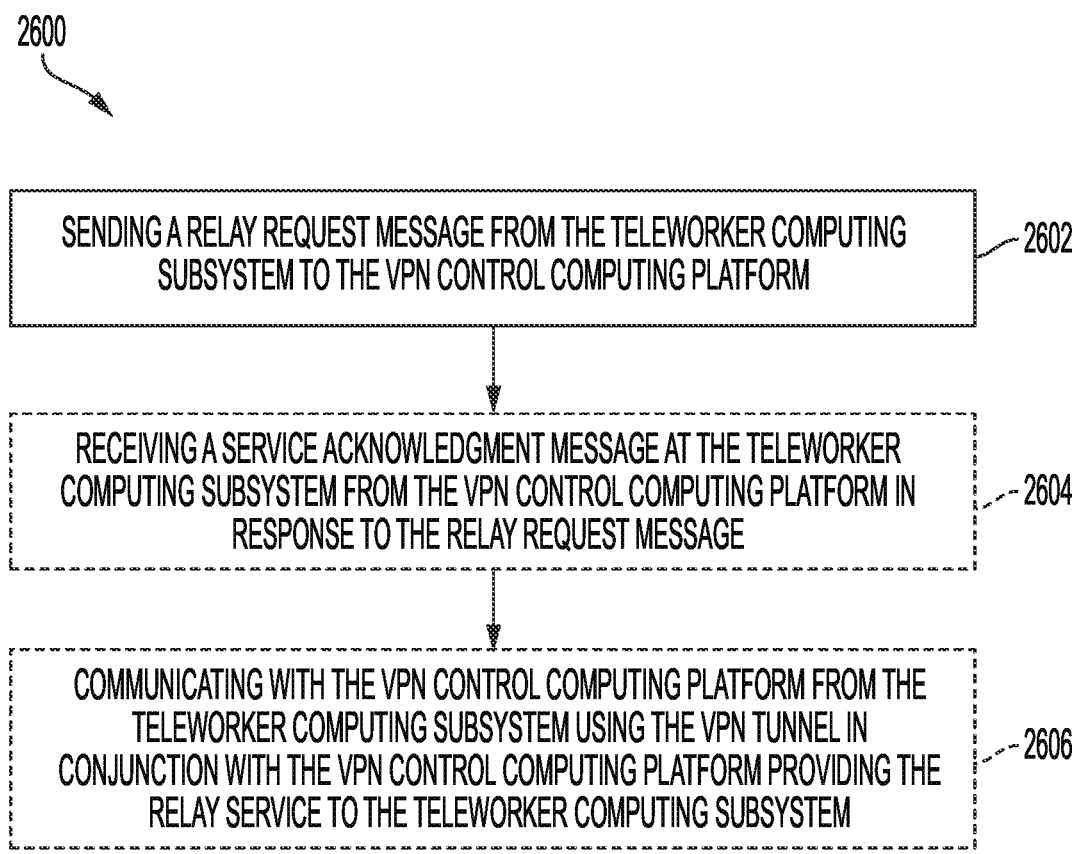
FIG. 26 is a flow chart of an exemplary embodiment for still another process for managing and controlling a mesh VPN.

With reference to FIG. 26, yet another exemplary embodiment of a process 2600 for managing and controlling a mesh VPN from the perspective of the teleworker computing subsystem is provided. At 2602, sending a relay request message from the teleworker computing subsystem to the VPN control computing platform. The relay request message includes identification and authentication data associated with the teleworker computing subsystem and a request for a relay service to internally connect a VPN tunnel between the teleworker computing subsystem and the VPN control computing platform to another VPN tunnel between the VPN control computing platform and a select destination computing subsystem. The select destination computing subsystem is another VPN end node.

In a further embodiment, the process 2600 also includes receiving a service acknowledgment message at the teleworker computing subsystem from the VPN control computing platform in response to the relay request message (2604). The service acknowledgment message indicates the relay service is available and the teleworker computing subsystem is authorized to use the relay service. At 2606, the teleworker computing subsystem communicates with the VPN control computing platform using the VPN tunnel in conjunction with the VPN control computing platform providing the relay service to the teleworker computing subsystem. Communications from the teleworker computing subsystem associated with the relay service are routed based on the local service parameters and local relay parameters stored in the end node profile.

In another further embodiment, the process 2600 also includes receiving a service denied message from the VPN control computing platform in response to the relay request message. The service denied message indicates at least one of the relay service is not available and the teleworker computing subsystem is not authorized to use the relay service.

Another exemplary embodiment of a process 2600 for managing and controlling a mesh VPN from the perspective of the teleworker computing subsystem includes receiving a relay request message at the teleworker computing subsystem from the VPN control computing platform. The relay request message includes identification and authentication data associated with the VPN control computing platform and a request for a relay service to internally connect a VPN tunnel between the VPN control computing platform and the teleworker computing subsystem to another VPN tunnel between the teleworker computing subsystem and a select destination computing subsystem. The select destination computing subsystem is another VPN end node. Next, the relay service in the relay request message is compared with local service parameters retrieved from the end node profile to confirm the relay service is available. Next, the identification and authentication data in the relay request message is compared to the identification and authentication parameters and local service parameters retrieved from the end node profile to confirm the VPN control computing platform is authorized to access the teleworker computing subsystem and authorized to use the relay service.

In a further embodiment, the process 2600 also includes selectively sending a service acknowledgment message from the teleworker computing subsystem to the VPN control computing platform in response to the relay request message. The service acknowledgment message indicates the relay service is available and the VPN control computing platform is authorized to use the relay service. Next, communications are routed between the VPN control computing platform and the select destination computing subsystem through the teleworker computing subsystem and via the mesh VPN using the two VPN tunnels in conjunction with providing the relay service to the VPN control computing platform. Communications from the teleworker computing subsystem associated with the relay service are routed based on the local service parameters and local relay parameters stored in the end node profile.

In another further embodiment, the process 2600 also includes selectively sending a service denied message from the first teleworker computing subsystem to the VPN control computing platform in response to the relay request message. The service denied message indicates at least one of the relay service is not available and the VPN control computing platform is not authorized to use the relay service. The service denied message is routed based on local routing parameters stored in the end node profile.

Teleworker Computing Subsystem Operation (Second Example)

With reference to FIGS. 7, 8, 12, and 17, in another embodiment of the process 1700, the VPN client application program 1216 enables the teleworker computing subsystem 1200 to communicate via the mesh VPN in accordance with the mesh VPN service profile 800 and the end node profile 1218. In another embodiment, the process 1700 also includes storing the end node profile 1218 at the teleworker computing subsystem 1200. Next, the VPN client application program 1216 is used to manage the end node profile 1218 at the teleworker computing subsystem 1200 in response to at least one of: i) a local measurement report, ii) a local parameter update to the end node profile 1218, iii) a remote measurement report from at least one of the VPN management computing platform 702 and the VPN control computing platform 704, iv) a remote parameter update associated with the end node profile 1218 from at least one of the VPN management computing platform 702 and the VPN control computing platform 704, and v) an updated end node profile 1218 from at least one of the VPN management computing platform 702 and the VPN control computing platform 704.

Office Computing Subsystem Operation

With reference to FIGS. 7, 8, 13, and 17, in another embodiment of the process 1700, the VPN client application program 1314 enables the office computing subsystem 1300 to communicate via the mesh VPN in accordance with the mesh VPN service profile 800 and the end node profile 1316. In another embodiment, the process 1700 also includes storing the end node profile 1316 at the office computing subsystem 1300. Next, the VPN client application program 1314 is used to manage the end node profile 1316 at the office computing subsystem 1300 in response to at least one of: i) a local measurement report, ii) a local parameter update to the end node profile 1316, iii) a remote measurement report from at least one of the VPN management computing platform 702 and the VPN control computing platform 704, iv) a remote parameter update associated with the end node profile 1316 from at least one of the VPN management computing platform 702 and the VPN control computing platform 704, and v) an updated end node profile 1316 from at least one of the VPN management computing platform 702 and the VPN control computing platform 704.

Figure 27:
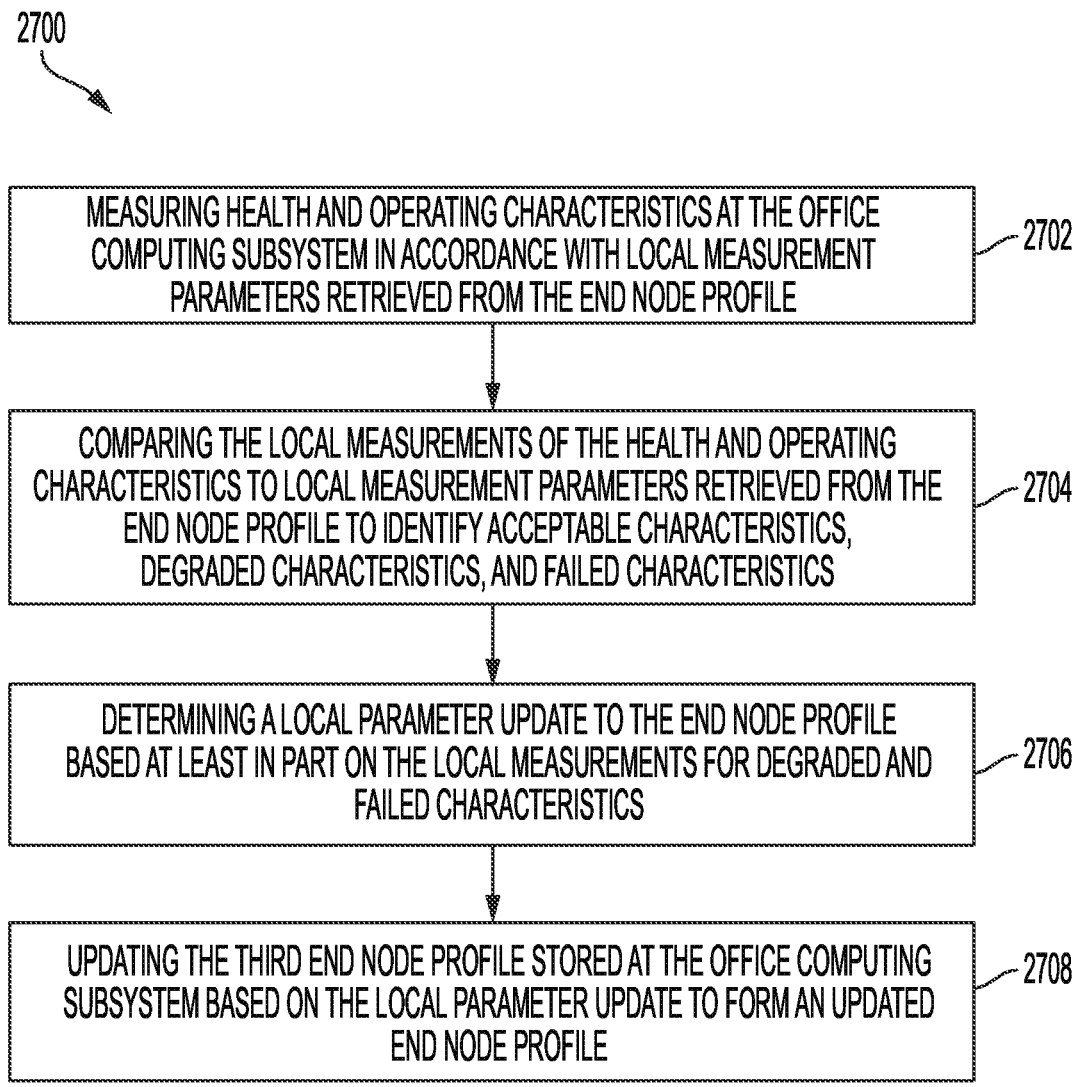
FIG. 27 is a flow chart of an exemplary embodiment for still yet another process for managing and controlling a mesh VPN.

With reference to FIG. 27, an exemplary embodiment of a process 2700 for managing and controlling a mesh VPN from the perspective of the office computing subsystem is provided. At 2702, health and operating characteristics is measured at the office computing subsystem in accordance with local measurement parameters retrieved from the end node profile. The local measurement parameters identify health and operating characteristics to be measured by the office computing subsystem. At 2704, the local measurements of the health and operating characteristics are compared to local measurement parameters retrieved from the end node profile to identify acceptable characteristics, degraded characteristics, and failed characteristics. The local measurement parameters include threshold values associated with acceptable, degraded, and failed health and operating characteristics. At 2706, a local parameter update to the end node profile is determined based at least in part on the local measurements for degraded and failed characteristics. At 2708, the end node profile stored at the office computing subsystem is updated based on the local parameter update to form an updated end node profile.

In a further embodiment, the process 2700 also includes sending a ping request message from the office computing subsystem to the VPN control computing platform via a VPN tunnel in conjunction with measuring the health and operating characteristics. Next, a ping reply message is received at the office computing subsystem from the VPN control computing platform via the VPN tunnel in conjunction with measuring the health and operating characteristics.

In another further embodiment, the process 2700 also includes sending a ping request message from the office computing subsystem to the VPN management computing platform in conjunction with measuring the health and operating characteristics. Next, a ping reply message is received at the office computing subsystem from the VPN management computing platform in conjunction with measuring the health and operating characteristics.

In yet another further embodiment, the process 2700 also includes sending a ping request message from the office computing subsystem to each VPN end node with which the office computing subsystem is authorized to communicate in conjunction with measuring the health and operating characteristics. The ping request message is sent to the VPN end node via a corresponding VPN tunnel between the office computing subsystem and the corresponding VPN end node. Next, a ping reply message is received at the office computing subsystem from each VPN end node to which the ping request message was sent in conjunction with measuring the health and operating characteristics. The ping reply message is received from each VPN end node via the corresponding VPN tunnel over which the ping request message was sent.

In still another further embodiment, the process 2700 also includes sending a local measurement report from the office computing subsystem to at least one of the VPN control computing platform and the VPN management computing platform in accordance with local reporting parameters stored in the end node profile.

In still yet another further embodiment, the process 2700 also includes sending the local parameter update from the office computing subsystem to at least one of the VPN control computing platform and the VPN management computing platform in accordance with local reporting parameters stored in the end node profile.

In another further embodiment, the process 2700 also includes sending the updated end node profile from the office computing subsystem to at least one of the VPN control computing platform and the VPN management computing platform in accordance with local reporting parameters stored in the end node profile.

Another exemplary embodiment of a process 2700 for managing and controlling a mesh VPN from the perspective of the office computing subsystem includes sending an activation request message from the office computing subsystem to the VPN control computing platform in response to activation of the VPN client application program. The activation request message includes identification and authentication parameters retrieved from the end node profile. The activation request message is routed based on local routing parameters stored in the end node profile. Next, a local service message is sent from the office computing subsystem to the VPN control computing platform in response to an activation acknowledgment message from the VPN control computing platform. The activation acknowledgment message indicates authentication was successful and the office computing subsystem is active on the mesh VPN. The local service message includes local service parameters retrieved from the end node profile and identifies one or more local service hosted by the office computing subsystem.

In another exemplary embodiment, the process 2700 includes receiving a remote measurement report at the office computing subsystem from at least one of the VPN control computing platform and the VPN management computing platform. Next, a local parameter update to the end node profile is determined based at least in part on degraded and failed characteristics associated with the office computing subsystem in the remote measurement report. Next, the end node profile stored at the office computing subsystem is updated based on the local parameter update to form an updated end node profile.

In yet another exemplary embodiment, the process 2700 includes receiving a remote parameter update to the end node profile at the office computing subsystem from at least one of the VPN control computing platform and the VPN management computing platform. Next, the end node profile stored at the office computing subsystem is updated based on the remote parameter update to form an updated end node profile.

In still another exemplary embodiment, the process 2700 includes receiving an updated end node profile at the office computing subsystem from at least one of the VPN control computing platform and the VPN management computing platform. Next, the end node profile stored at the office computing subsystem is replaced with the updated end node profile.

In still yet another exemplary embodiment, the process 2700 includes receiving a ping request message at the office computing subsystem at the VPN control computing platform via a VPN tunnel in conjunction with the VPN control computing platform measuring health and operating characteristics. Next, a ping reply message is sent from the office computing subsystem to the VPN control computing platform via the VPN tunnel in response to the ping request message.

In another exemplary embodiment, the process 2700 includes receiving a ping request message at the office computing subsystem from the VPN management computing platform in conjunction with the VPN management computing platform measuring health and operating characteristics. Next, a ping reply message is sent from the office computing subsystem to the VPN management computing platform in response to the ping request message.

In yet another exemplary embodiment, the process 2700 includes receiving a ping request message at the office computing subsystem from each VPN end node with which the office computing subsystem is authorized to communicate in conjunction with the corresponding VPN end node measuring health and operating characteristics. The ping request message is received from each VPN end node via a VPN tunnel between the office computing subsystem and the corresponding VPN end node. Next, a ping reply message is sent from the office computing subsystem to each VPN end node from which the ping request message was received in response to the ping request message. The ping reply message is sent to the corresponding VPN end node via the VPN tunnel over which the ping request message was received.

Figure 28:
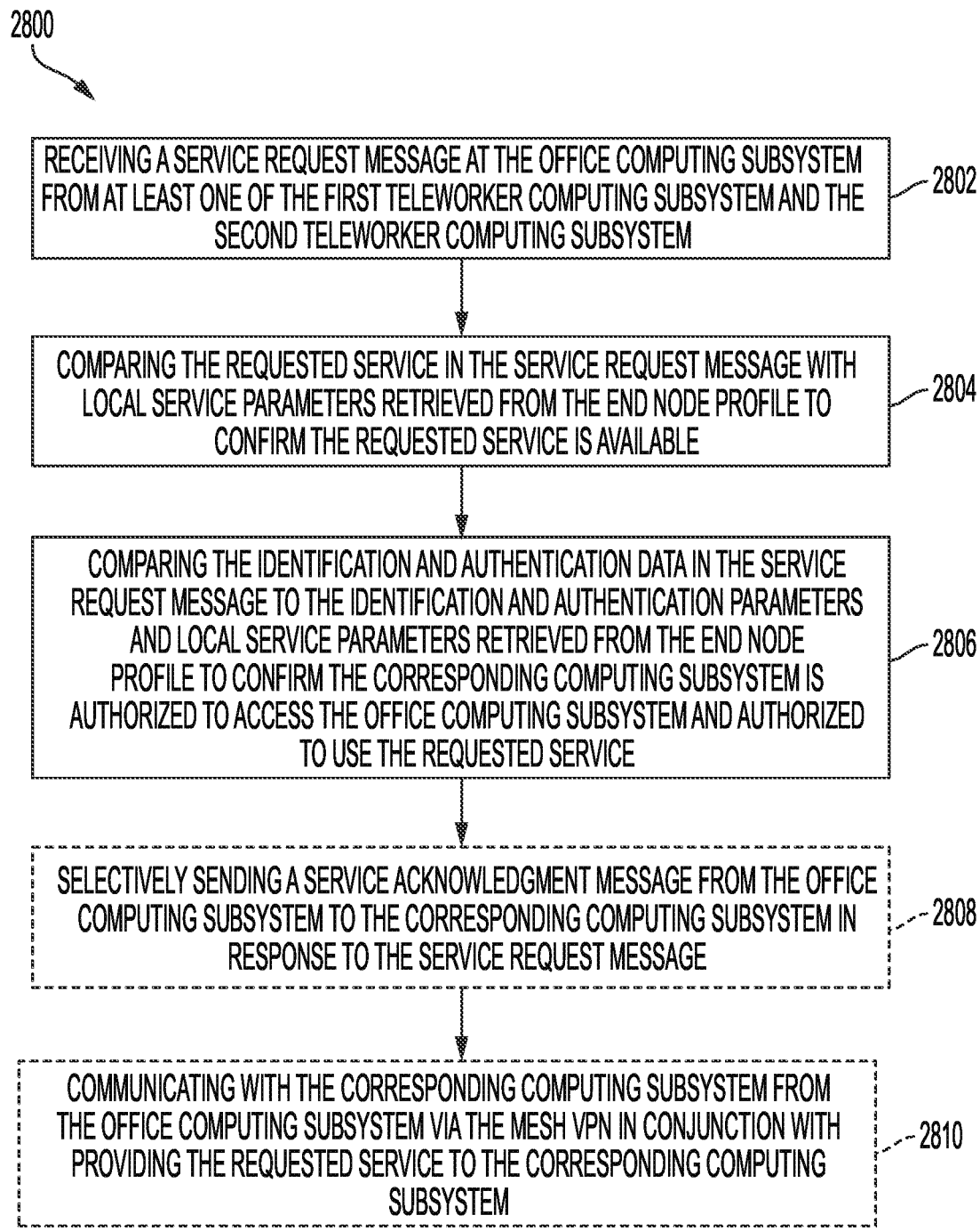
FIG. 28 is a flow chart of an exemplary embodiment for another process for managing and controlling a mesh VPN.

With reference to FIG. 28, another exemplary embodiment of a process 2800 for managing and controlling a mesh VPN from the perspective of the office computing subsystem is provided. At 2802, a service request message is received at the office computing subsystem from at least one of the first teleworker computing subsystem and the second teleworker computing subsystem. The service request message includes identification and authentication data associated with the corresponding computing subsystem and a requested service. At 2804, the requested service in the service request message is compared with local service parameters retrieved from the end node profile to confirm the requested service is available. At 2806, the identification and authentication data in the service request message is compared to the identification and authentication parameters and local service parameters retrieved from the end node profile to confirm the corresponding computing subsystem is authorized to access the office computing subsystem and authorized to use the requested service.

In another embodiment, the process 2800 also includes selectively sending a service acknowledgment message from the office computing subsystem to the corresponding computing subsystem in response to the service request message (2808). The service acknowledgment message indicates the requested service is available and the corresponding computing subsystem is authorized to use the requested service. At 2810, the office computing subsystem communicates with the corresponding computing subsystem via the mesh VPN in conjunction with providing the requested service to the corresponding computing subsystem. Communications from the office computing subsystem associated with the requested service are routed based on local routing parameters stored in the end node profile.

In yet another embodiment, the process 2800 also includes selectively sending a service denied message from the office computing subsystem to the corresponding computing subsystem via in response to the service request message. The service denied message indicates at least one of the requested service is not available and the corresponding computing subsystem is not authorized to use the requested service.

Another exemplary embodiment of a process 2800 for managing and controlling a mesh VPN from the perspective of the office computing subsystem includes sending a service request message from the office computing subsystem to the VPN control computing platform based on remote service parameters retrieved from the end node profile. The service request message includes identification and authentication data associated with the office computing subsystem based on identification and authentication parameters stored in the end node profile. The service request message includes a requested service based on remote service parameters stored in the end node profile identifying remote services hosted by the VPN control computing platform. In a further embodiment, the process also includes receiving a service acknowledgment message at the office computing subsystem from the VPN control computing platform in response to the service request message. The service acknowledgment message indicates the requested service is available and the office computing subsystem is authorized to use the requested service. Next, the office computing subsystem communicates with the VPN control computing platform via the mesh VPN in conjunction with the VPN control computing platform providing the requested service.

Communications from the office computing subsystem associated with the requested service are routed based on local routing parameters stored in the end node profile. In another further embodiment, the process also includes receiving a service denied message at the office computing subsystem from the VPN control computing platform in response to the service request message. The service denied message indicates at least one of the requested service is not available and the office computing subsystem is not authorized to use the requested service.

In another exemplary embodiment, the process 2800 includes sending a service request message from the office computing subsystem to the first teleworker computing subsystem based on remote service parameters retrieved from the end node profile. The service request message includes identification and authentication data associated with the office computing subsystem based on identification and authentication parameters stored in the end node profile. The service request message includes a requested service based on remote service parameters stored in the end node profile identifying remote services hosted by the first teleworker computing subsystem. In a further embodiment, the process also includes receiving a service acknowledgment message at the office computing subsystem from the first teleworker computing subsystem in response to the service request message. The service acknowledgment message indicates the requested service is available and the office computing subsystem is authorized to use the requested service. Next, the office computing subsystem communicates with the first teleworker computing subsystem via the mesh VPN in conjunction with the first teleworker computing subsystem providing the requested service. Communications from the office computing subsystem associated with the requested service are routed based on local routing parameters stored in the end node profile. In another further embodiment, the process also includes receiving a service denied message at the office computing subsystem from the first teleworker computing subsystem in response to the service request message. The service denied message indicates at least one of the requested service is not available and the office computing subsystem is not authorized to use the requested service.

Figure 29:
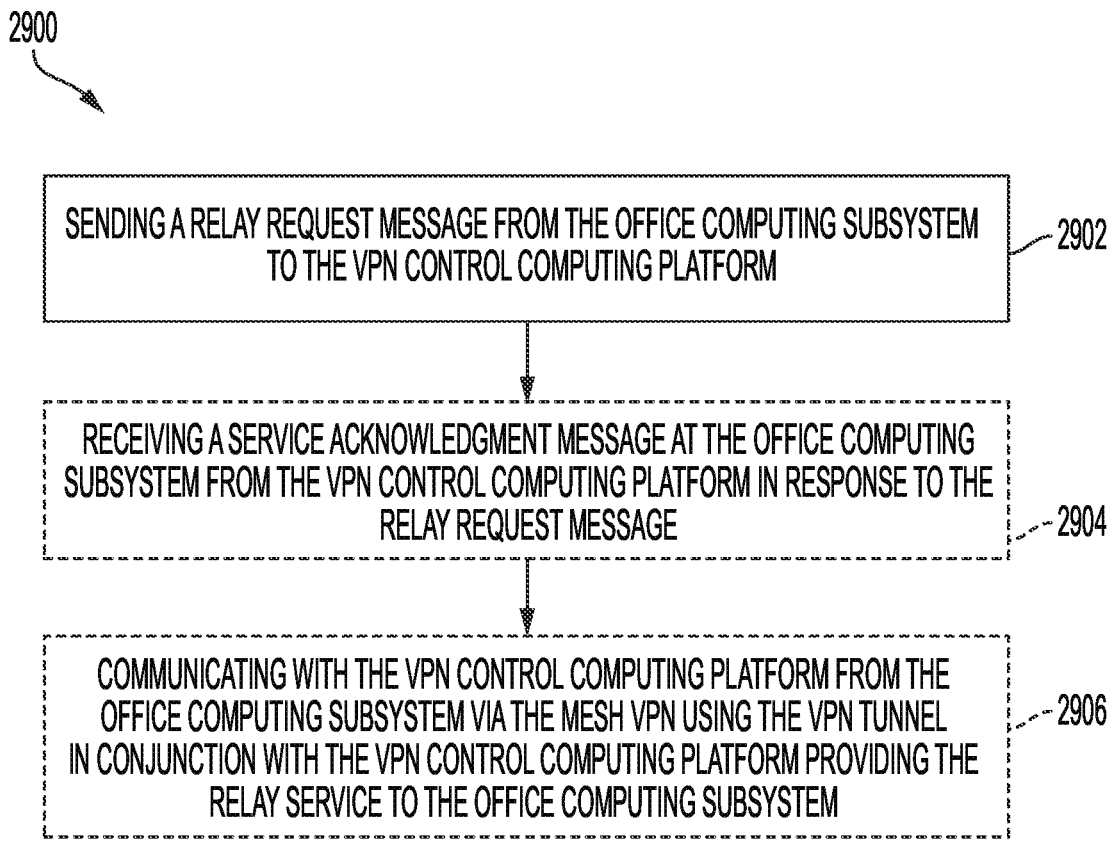
FIG. 29 is a flow chart of an exemplary embodiment for yet another process for managing and controlling a mesh VPN.

With reference to FIG. 29, yet another exemplary embodiment of a process 2900 for managing and controlling a mesh VPN from the perspective of the office computing subsystem is provided. At 2902, a relay request message is sent from the office computing subsystem to the VPN control computing platform. The relay request message includes identification and authentication data associated with the office computing subsystem and a request for a relay service to internally connect a VPN tunnel between the office computing subsystem and the VPN control computing platform to another VPN tunnel from the VPN control computing platform to a select destination computing subsystem in the mesh VPN. The select destination computing subsystem is another VPN end node.

In a further embodiment, the process 2900 also includes receiving a service acknowledgment message at the office computing subsystem from the VPN control computing platform in response to the relay request message (2904). The service acknowledgment message indicates the relay service is available and the office computing subsystem is authorized to use the relay service. At 2906, the office computing subsystem communicates with the VPN control computing platform via the mesh VPN using the VPN tunnel in conjunction with the VPN control computing platform providing the relay service to the office computing subsystem. Communications from the office computing subsystem associated with the relay service are routed based on the local service parameters and local relay parameters stored in the third end node profile.

In another further embodiment, the process 2900 also includes receiving a service denied message at the office computing subsystem from the VPN control computing platform in response to the relay request message. The service denied message indicates at least one of the relay service is not available and the office computing subsystem is not authorized to use the relay service.

Another exemplary embodiment of a process 2900 for managing and controlling a mesh VPN from the perspective of the office computing subsystem includes receiving a relay request message at the office computing subsystem from the VPN control computing platform. The relay request message includes identification and authentication data associated with the VPN control computing platform and a request for a relay service to internally connect a VPN tunnel between the VPN control computing platform and the office computing subsystem to another VPN tunnel from the office computing subsystem to a select destination computing subsystem in the mesh VPN. The select destination computing subsystem is another VPN end node. Next, the relay service in the relay request message is compared with local service parameters retrieved from the third end node profile to confirm the relay service is available. Next, the identification and authentication data in the relay request message is compared to the identification and authentication parameters and local service parameters retrieved from the third end node profile to confirm the VPN control computing platform is authorized to access the office computing subsystem and authorized to use the relay service.

In a further embodiment, the process also includes selectively sending a service acknowledgment message from the office computing subsystem to the VPN control computing platform in response to the relay request message. The service acknowledgment message indicates the relay service is available and the VPN control computing platform is authorized to use the relay service. Next, communications are routed between the VPN control computing platform and the select destination computing subsystem through the office computing subsystem and via the mesh VPN using the two VPN tunnels in conjunction with providing the relay service to the VPN control computing platform. Communications from the office computing subsystem associated with the relay service are routed based on the local service parameters and local relay parameters stored in the third end node profile.

In another further embodiment, the process also includes selectively sending a service denied message from the office computing subsystem to the VPN control computing platform in response to the relay request message. The service denied message indicates at least one of the relay service is not available and the VPN control computing platform is not authorized to use the relay service. The service denied message is routed based on local routing parameters stored in the third end node profile.

Figure 30:
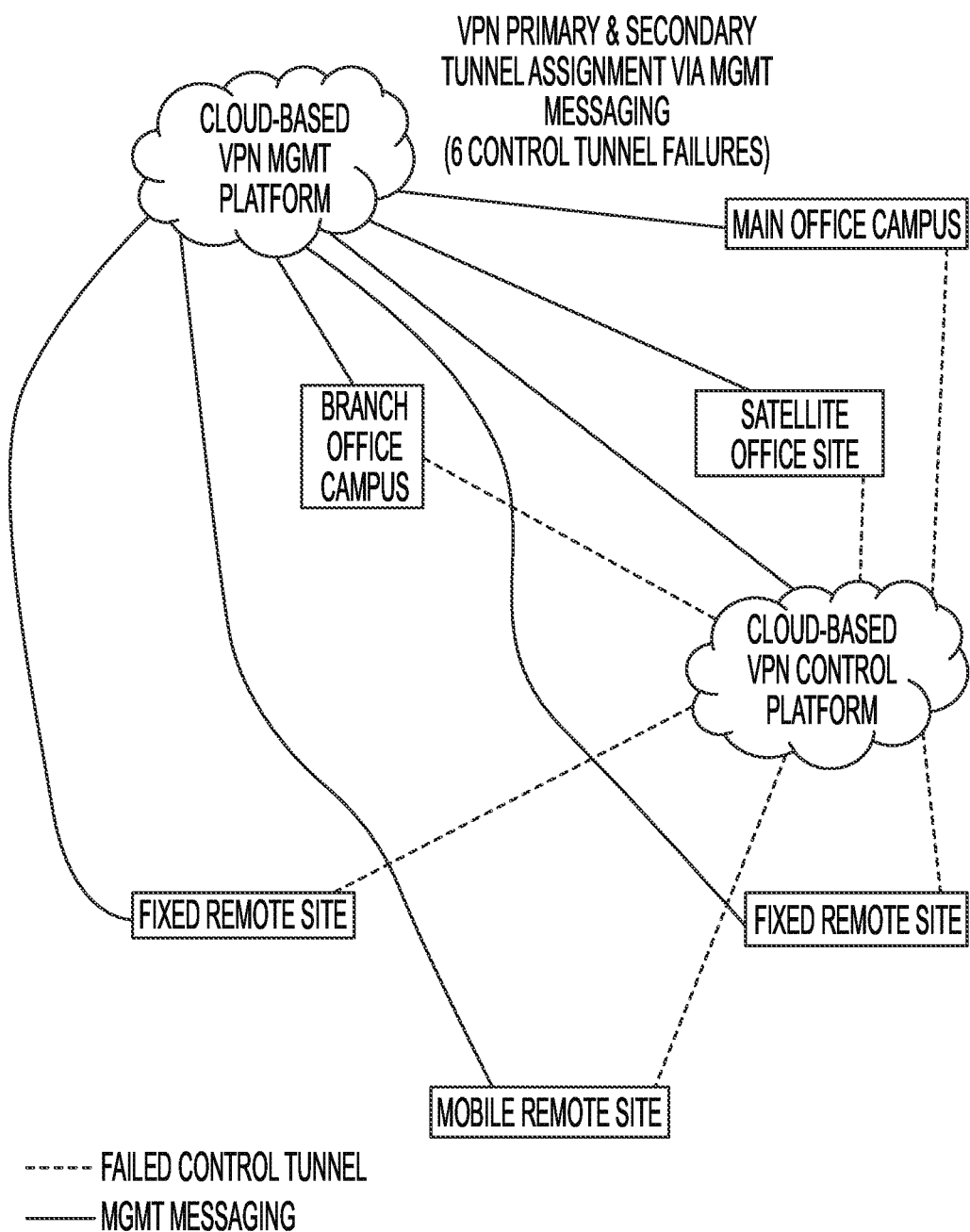
FIG. 30 is a functional block diagram relating to a control tunnel failure scenario for an exemplary embodiment of a system for managing and controlling a mesh VPN.

With reference to FIG. 30, a control tunnel failure scenario in a system for managing and controlling a mesh VPN shows all control tunnels failed between the VPN control computing platform and the VPN end nodes. In this scenario, the VPN management computing platform is equipped to take over the control service previously provided by the VPN control computing platform.

Figure 31:
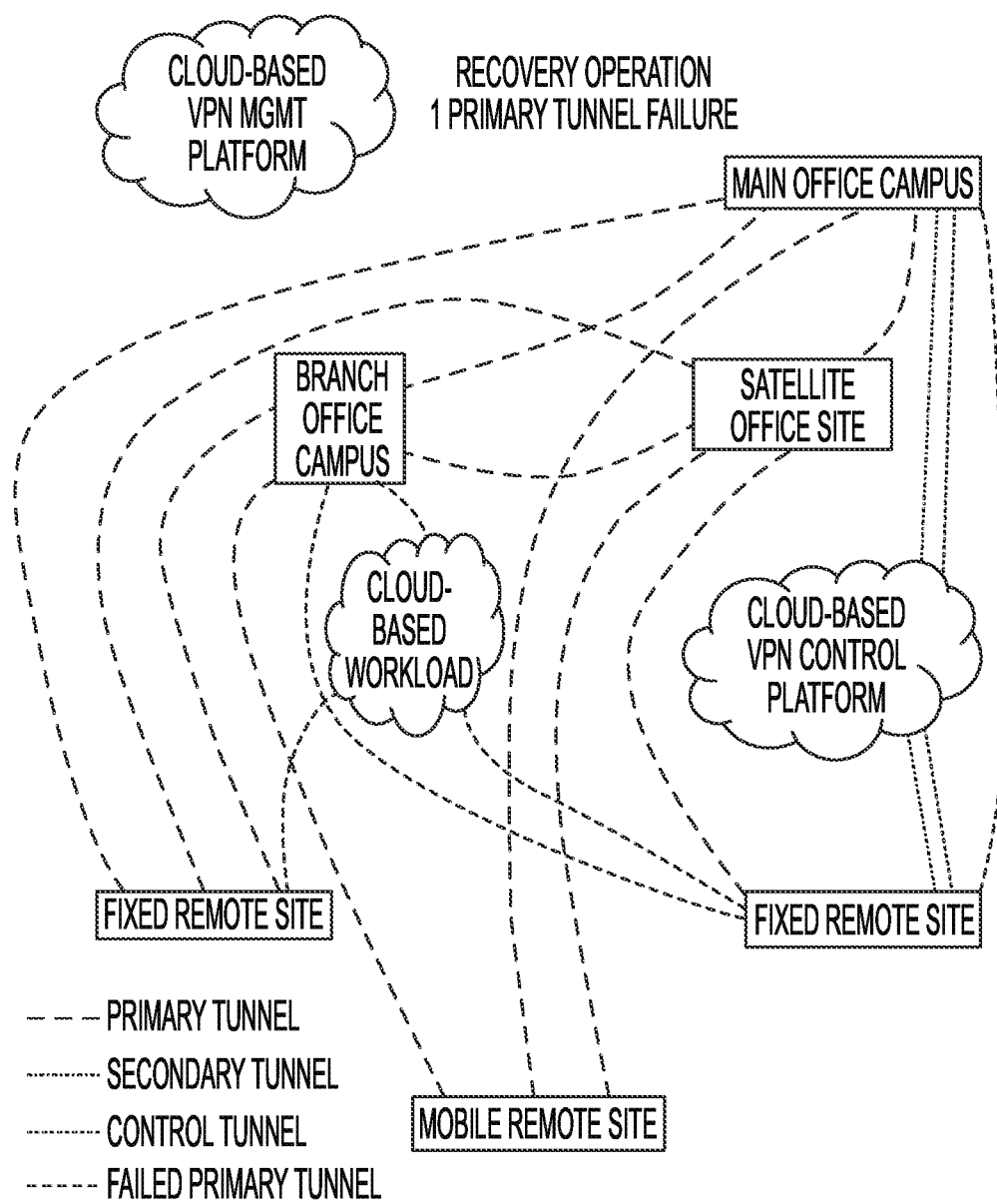
FIG. 31 is a functional block diagram relating to a primary tunnel failure scenario for an exemplary embodiment of a system for managing and controlling a mesh VPN.

With reference to FIG. 31, a primary tunnel failure scenario in a system for managing and controlling a mesh VPN shows a primary tunnel between the second teleworker computing subsystem (e.g., fixed remote site) and the office computing subsystem (e.g., main office campus). In this scenario, the VPN control computing platform and the corresponding VPN end nodes are equipped to re-route the data traffic from the second teleworker computing subsystem to the office computing subsystem through the hub node using the corresponding secondary tunnels.

Figure 32:
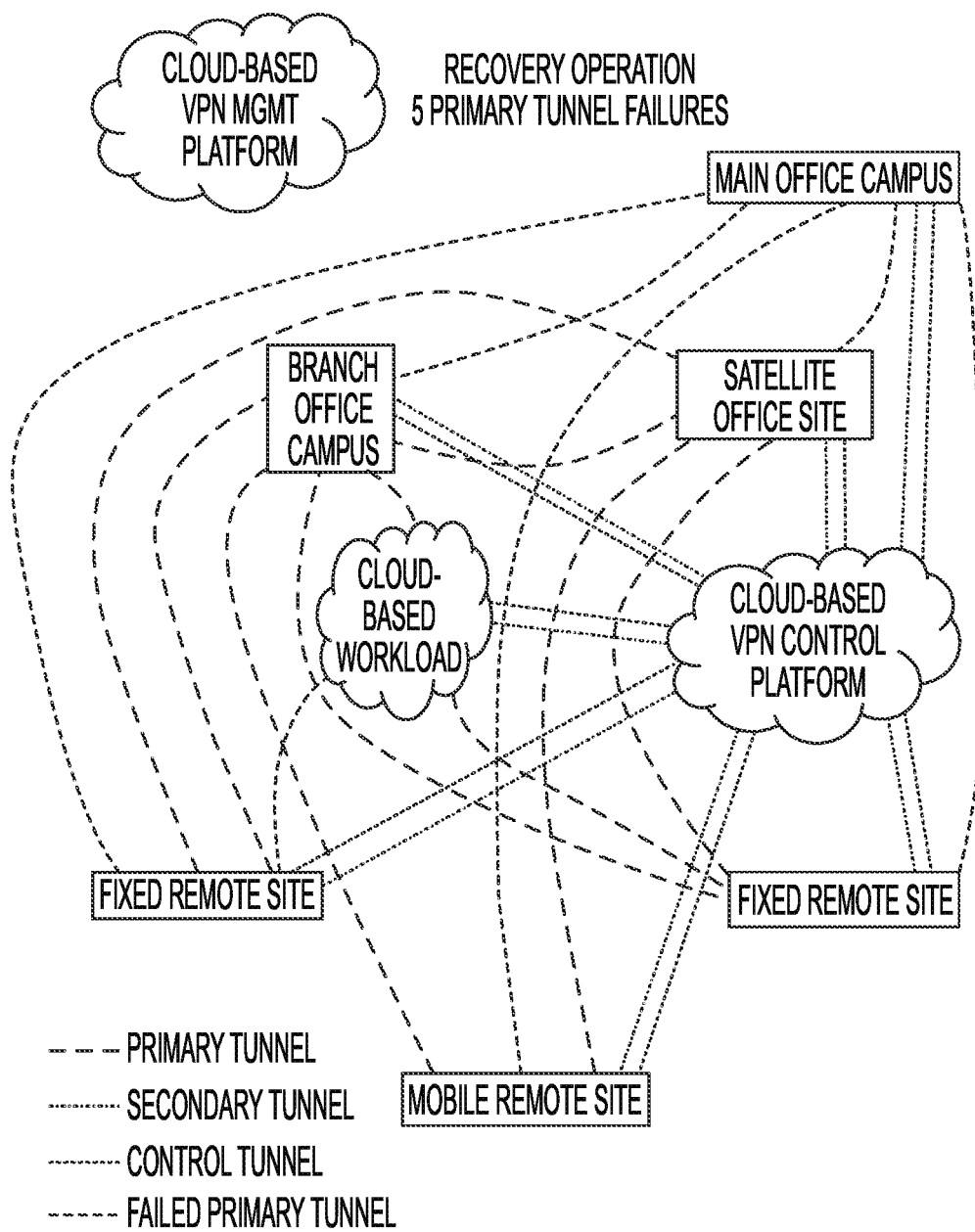
FIG. 32 is a functional block diagram relating to another primary tunnel failure scenario for an exemplary embodiment of a system for managing and controlling a mesh VPN.

With reference to FIG. 32, a primary tunnel failure scenario in a system for managing and controlling a mesh VPN shows all primary tunnels associated with the office computing subsystem (e.g., main office campus) failed. In this scenario, the VPN control computing platform and the VPN end nodes are equipped to re-route data traffic between the corresponding VPN end nodes and the office computing subsystem through the hub node using corresponding secondary tunnels.

Figure 33:
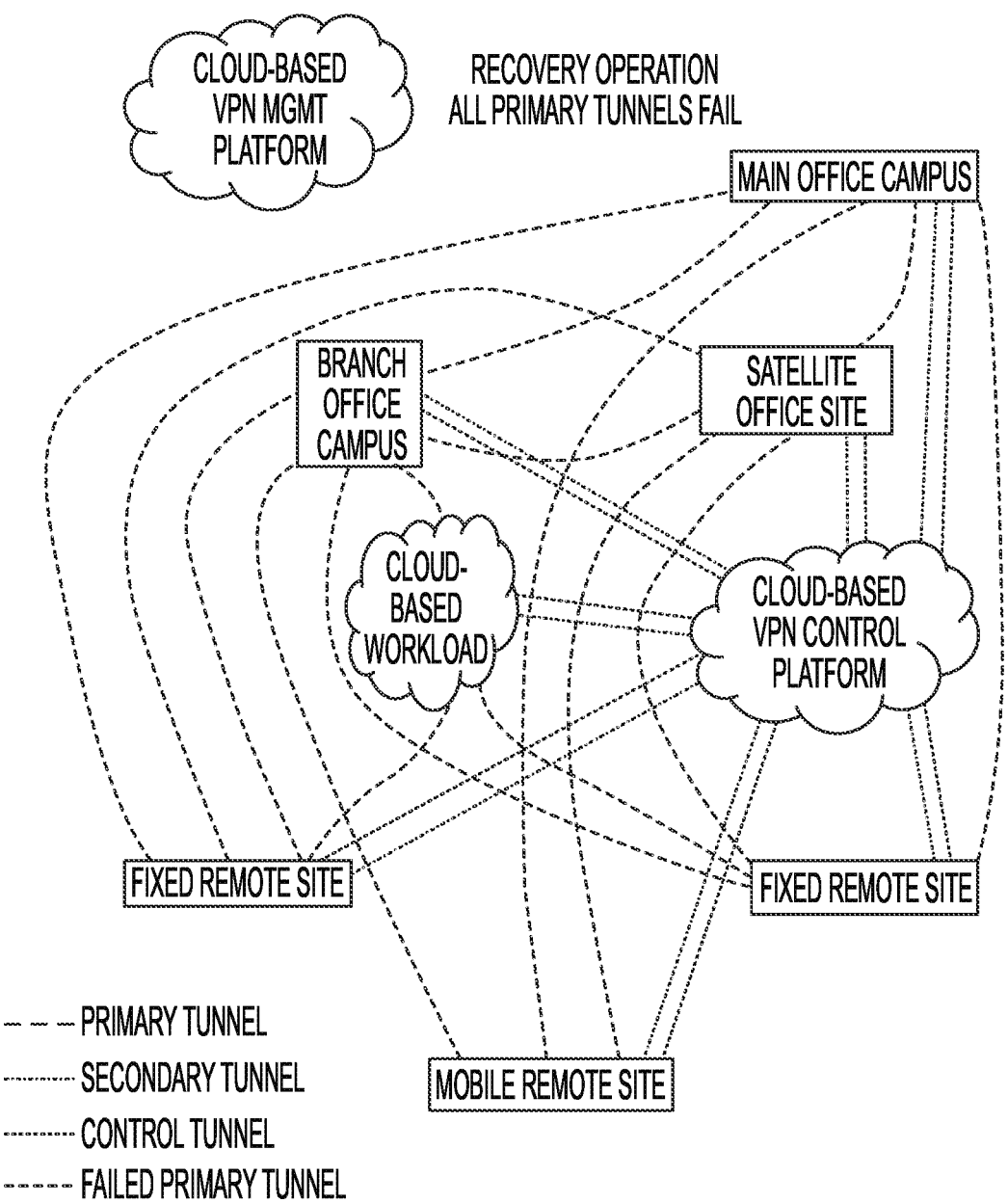
FIG. 33 is a functional block diagram relating to yet another primary tunnel failure scenario for an exemplary embodiment of a system for managing and controlling a mesh VPN.

With reference to FIG. 33, a primary tunnel failure scenario in a system for managing and controlling a mesh VPN shows all primary tunnels between VPN end nodes failed. In this scenario, the VPN control computing platform and the VPN end nodes are equipped to re-route data traffic from an originating VPN end node to a destination VPN end node through the hub node using corresponding secondary tunnels.

Figure 34:
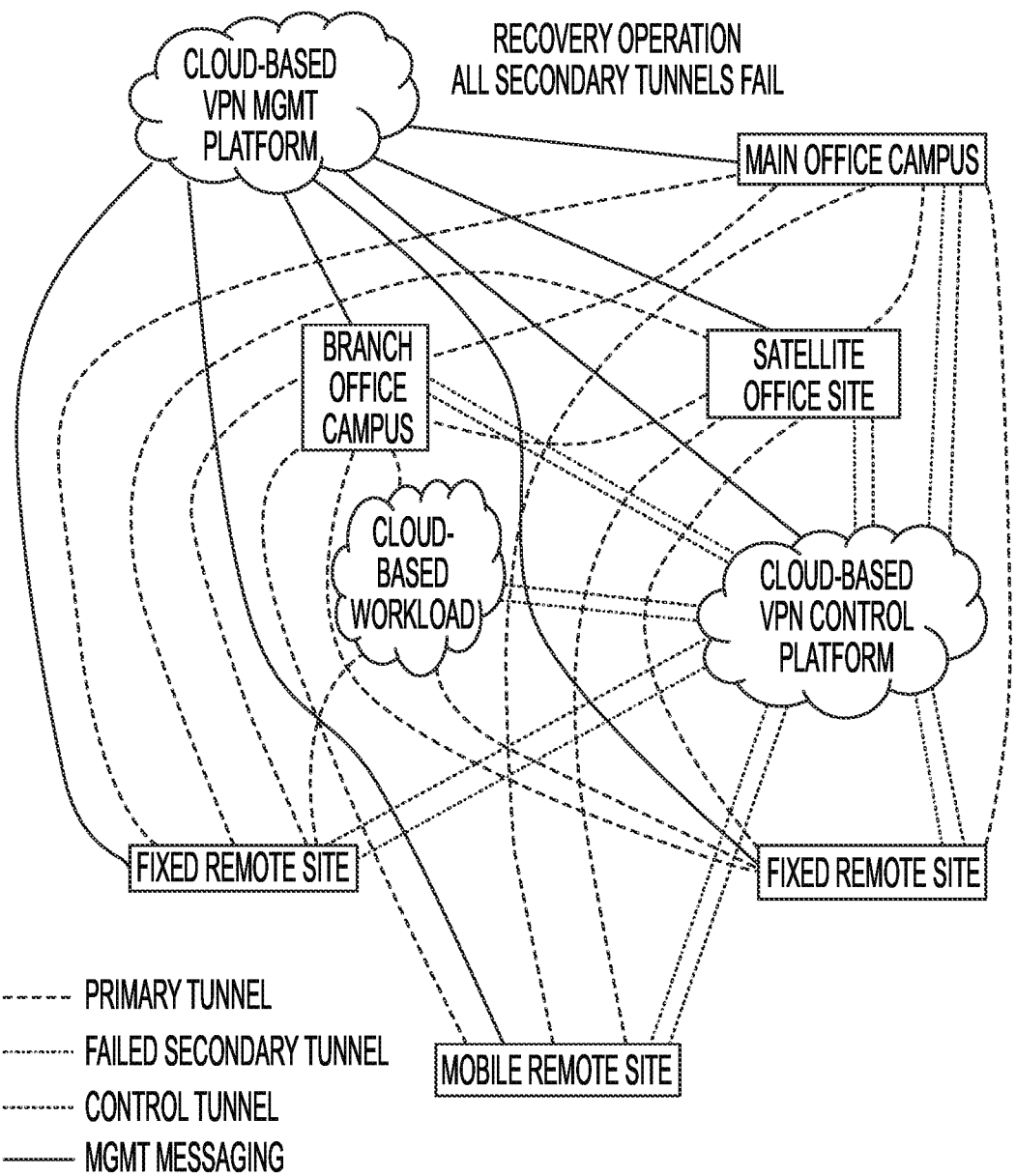
FIG. 34 is a functional block diagram relating to a secondary tunnel failure scenario for an exemplary embodiment of a system for managing and controlling a mesh VPN.

With reference to FIG. 34, a secondary tunnel failure scenario in a system for managing and controlling a mesh VPN shows all secondary tunnels failed. In this scenario, the VPN control computing platform and the VPN end nodes are equipped to continue or re-route data traffic between originating VPN end nodes and destination VPN end node using corresponding primary tunnels.

Some portions of the detailed description herein are presented in terms of algorithms and symbolic representations of operations on data bits performed by conventional computer components, including a central processing unit (CPU) (e.g., processor), memory storage devices for the CPU, and connected display devices. These algorithmic descriptions and representations are the means used by those skilled in the data processing arts to convey the substance of their work most effectively to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiments are not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A system for managing and controlling a mesh virtual private network (VPN), comprising:
    a VPN management computing platform configured to provide a deployment service and a management service to an organization in conjunction with operation of a mesh VPN in a wide area network (WAN) in accordance with a mesh VPN service profile, wherein the mesh VPN includes a VPN hub node and a plurality of VPN end nodes, wherein each of the plurality of VPN end nodes is configured to communicate with the VPN hub node via at least one spoke communication path to form a star VPN topology, wherein each of the plurality of VPN end nodes is configured to communicate with at least one other VPN end node via peer-to-peer communication paths between the plurality of VPN end nodes that form at least a partial mesh VPN topology;
    a VPN control computing platform in operative communication with the VPN management computing platform, wherein the VPN control computing platform is configured to implement the VPN hub node and configured to provide a control service for operation of the mesh VPN in accordance with the mesh VPN service profile;
    a first teleworker computing subsystem in operative communication with the VPN management computing platform and the VPN control computing platform, wherein the first teleworker computing subsystem is configured to implement a first VPN end node of the plurality of VPN end nodes and configured to use the mesh VPN in accordance with the mesh VPN service profile;
    a second teleworker computing subsystem in operative communication with the VPN management computing platform and the VPN control computing platform, wherein the second teleworker computing subsystem is configured to implement a second VPN end node of the plurality of VPN end nodes and configured to use the mesh VPN in accordance with the mesh VPN service profile; and
    an office computing subsystem in operative communication with the VPN management computing platform and the VPN control computing platform, wherein the office computing subsystem is configured to implement a third VPN end node of the plurality of VPN end nodes and configured to use the mesh VPN in accordance with the mesh VPN service profile.

2. The system of claim 1 wherein the VPN control computing platform is cloud-based.

3. The system of claim 1 wherein the peer-to-peer communication paths and the spoke communication paths form a hybrid VPN topology in which each VPN end node of the plurality of VPN end nodes has a direct peer-to-peer communication path and at least one indirect communication path to communicate with other VPN end nodes with which the corresponding VPN end node is authorized to communicate, wherein the at least one indirect communication path associated with each combination of two VPN end nodes enables selection of a preferred communication path for a given communication based on any combination of a default communication path, current health characteristics relating to the default communication path and the at least one alternate communication paths, current operating characteristics relating to the default communication path and the at least one alternate communication paths, and a type of service associated with the corresponding communication.

4. The method of claim 1 wherein the mesh VPN service profile includes i) a management platform profile associated with the VPN management computing platform, ii) a hub node profile associated with the VPN control computing platform, and iii) a plurality of end node profiles corresponding to the plurality of VPN end nodes, wherein the plurality of end node profiles includes a first end node profile associated with the first teleworker computing subsystem, a second end node profile associated with the second teleworker computing subsystem, and a third end node profile associated with the office computing subsystem.

5. The system of claim 4, the VPN management computing platform comprising:
    at least one processor and associated memory;
    at least one application storage device configured to store a deployment service application program and a management service application program;
    at least one data storage device configured to store the mesh VPN service profile, the management platform profile, the hub node profile, and the plurality of end node profiles; and
    at least one WAN communication interface in operative communication with the at least one processor and the WAN, wherein the at least one WAN communication interface is configured to enable the VPN management computing platform to communicate with the VPN control computing platform, the first and second teleworker computing subsystems, and the office computing subsystem via the WAN;
    wherein the VPN management computing platform is configured to provide the deployment service using the deployment service application program in accordance with the mesh VPN service profile and the management platform profile;
    wherein the VPN management computing platform is configured to provide the management service using the management service application program in accordance with the mesh VPN service profile and the management platform profile.

6. The system of claim 4, the VPN control computing platform comprising:
   at least one processor and associated memory;
   at least one application storage device configured to store a control service application program;
   at least one data storage device configured to store the hub node profile and the plurality of end node profiles;
   at least one VPN concentrator in operative communication with the at least one processor;
   at least one first WAN communication interface in operative communication with the at least one processor and the WAN, wherein the at least one first WAN communication interface is configured to enable the VPN control computing platform to communicate with the VPN management computing platform via the WAN;
   at least one second WAN communication interface in operative communication with the at least one VPN concentrator and the WAN, wherein the at least one second WAN communication interface is configured to enable the VPN control computing platform to communicate with the first teleworker computing subsystem via the mesh VPN;
   at least one third WAN communication interface in operative communication with the at least one VPN concentrator and the WAN, wherein the at least one third WAN communication interface is configured to enable the VPN control computing platform to communicate with the second teleworker computing subsystem via the mesh VPN;
   at least one fourth WAN communication interface in operative communication with the at least one VPN concentrator and the WAN, wherein the at least one fourth WAN communication interface is configured to enable the VPN control computing platform to communicate with the office computing subsystem via the mesh VPN;
   wherein the VPN control computing platform is configured to provide the control service using the control service application program in accordance with the hub node profile.

7. The system of claim 4, the first teleworker computing subsystem comprising:
   a VPN edge device at a fixed remote site, comprising;
      a WAN communication interface in operative communication with the WAN, wherein the WAN communication interface is configured to enable the VPN edge device to communicate with the VPN management computing platform via the WAN, wherein the WAN communication interface is configured to enable the VPN edge device to communicate with the VPN control computing platform and the office computing subsystem via the mesh VPN;
      a storage device configured to store a VPN client application program and configured to store the first end node profile of the plurality of end node profiles, wherein the first end node profile is associated with the first VPN end node; and
      a local area network (LAN) router;
   a teleworker computing device configured to enable a teleworker associated with the organization to perform work tasks assigned by the organization, the teleworker computing device comprising:
      a LAN communication interface in operative communication with the LAN router via a LAN, wherein the LAN communication interface is configured to enable the teleworker computing device to communicate with the office computing subsystem via the mesh VPN through the VPN edge device;
   wherein the first teleworker computing subsystem is configured to use the VPN client application program in accordance with the first end node profile to communicate via the mesh VPN.

8. The system of claim 4, the second teleworker computing subsystem comprising:
   a WAN edge device, comprising;
      a WAN communication interface in operative communication with the WAN, wherein the WAN communication interface is configured to enable the WAN edge device to communicate with the VPN management computing platform, the VPN control computing platform, and the office computing subsystem via the WAN; and
      a local area network (LAN) router;
   a teleworker computing device configured to enable a teleworker associated with the organization to perform work tasks assigned by the organization, the teleworker computing device comprising:
      a LAN communication interface in operative communication with the LAN router via a LAN, wherein the LAN communication interface is configured to enable the teleworker computing device to communicate with the office computing subsystem via the mesh VPN through the WAN edge device; and
      a storage device configured to store a VPN client application program and configured to store the second end node profile of the plurality of end node profiles,
   wherein the second end node profile is associated with the second VPN end node;
   wherein the teleworker computing device is configured to use the VPN client application program in accordance with the second end node profile to communicate via the mesh VPN.

9. The system of claim 4, the office computing subsystem comprising:
   a VPN edge device at an office site, comprising;
      a WAN communication interface in operative communication with the WAN, wherein the WAN communication interface is configured to enable the VPN edge device to communicate with the VPN management computing platform via the WAN, wherein the WAN communication interface is configured to enable the VPN edge device to communicate with the VPN control computing platform and the first and second teleworker computing subsystems via the mesh VPN;
      a storage device configured to store a VPN client application program and configured to store the third end node profile of the plurality of end node profiles, wherein the third end node profile is associated with the third VPN end node; and
      a local area network (LAN) router;
   an office computing device configured to enable teleworkers associated with the organization to access office resources in conjunction with performing work tasks assigned by the organization from remote locations using the first and second teleworker computing subsystems, the office computing device comprising:
      a LAN communication interface in operative communication with the LAN router via a LAN, wherein the LAN communication interface is configured to enable the office computing device to communicate with the first and second teleworker computing subsystems via the mesh VPN through the VPN edge device;

wherein the office computing subsystem is configured to use the VPN client application program in accordance with the third end node profile to communicate via the mesh VPN.

10. A method for managing and controlling a mesh virtual private network (VPN), comprising:

provisioning a VPN management computing platform with a deployment service application program, a management service application program, and a mesh VPN service profile;

providing the deployment and management services to an organization from the VPN management computing platform in conjunction with operation of a mesh VPN in a wide area network (WAN) using the deployment and management service application programs in accordance with the mesh VPN service profile, wherein the mesh VPN includes a VPN hub node and a plurality of VPN end nodes, wherein each of the plurality of VPN end nodes is configured to communicate with the VPN hub node via at least one spoke communication path to form a star VPN topology, wherein each of the plurality of VPN end nodes is configured to communicate with at least one other VPN end node via peer-to-peer communication paths between the plurality of VPN end nodes that form at least a partial mesh VPN topology;

implementing the VPN hub node as a VPN control computing platform and provisioning the VPN control computing platform with a control service application program;

providing a control service from the VPN control computing platform in conjunction with operation of the mesh VPN using the control service application program in accordance with the mesh VPN service profile;

implementing a first VPN end node of the plurality of VPN end nodes as a first teleworker computing subsystem and provisioning the first teleworker computing subsystem with a first VPN client application program to use the mesh VPN in accordance with the mesh VPN service profile;

implementing a second VPN end node of the plurality of VPN end nodes as a second teleworker computing subsystem and provisioning the second teleworker computing subsystem with a second VPN client application program to use the mesh VPN in accordance with the mesh VPN service profile; and implementing a third VPN end node of the plurality of VPN end nodes as an office computing subsystem and provisioning the office computing subsystem with a third VPN client application program to use the mesh VPN in accordance with the mesh VPN service profile.

11. The method of claim 10 wherein the mesh VPN service profile includes i) a management platform profile associated with the VPN management computing platform, ii) a hub node profile associated with the VPN control computing platform, and iii) a plurality of end node profiles corresponding to the plurality of VPN end nodes, wherein the plurality of end node profiles includes a first end node profile associated with the first teleworker computing subsystem, a second end node profile associated with the second teleworker computing subsystem, and a third end node profile associated with the office computing subsystem.

12. The method of claim 11, further comprising:

receiving an activation request message at the VPN management computing platform from at least one of the first teleworker computing subsystem, the second teleworker computing subsystem, and the office computing subsystem in response to activation of the VPN client application program by the corresponding computing subsystem, wherein the activation request message includes identification and authentication data associated with the corresponding computing subsystem; and comparing the identification and authentication data in the activation request message to identification and authentication parameters retrieved from the management platform profile at the VPN management computing platform to confirm the corresponding computing subsystem is authorized to access the VPN control computing platform and authorized to use the mesh VPN.

13. The method of claim 11, further comprising:

receiving an activation request message at the VPN control computing platform from at least one of the first teleworker computing subsystem, the second teleworker computing subsystem, and the office computing subsystem in response to activation of the VPN client application program by the corresponding computing subsystem, wherein the activation request message includes identification and authentication data associated with the corresponding computing subsystem; and comparing the identification and authentication data in the activation request message to identification and authentication parameters retrieved from the hub node profile to confirm the corresponding computing subsystem is authorized to access the VPN control computing platform and authorized to use the mesh VPN.

14. The method of claim 11, further comprising:

receiving a service request message at the VPN control computing platform from at least one of the first teleworker computing subsystem, the second teleworker computing subsystem, and office computing subsystem, wherein the service request message includes identification and authentication data associated with the corresponding computing subsystem and a requested service;

comparing the requested service in the service request message with local service parameters retrieved from the hub node profile to confirm the requested service is available; and comparing the identification and authentication data in the service request message to the identification and authentication parameters and local service parameters retrieved from the hub node profile to confirm the corresponding computing subsystem is authorized to access the VPN control computing platform and authorized to use the requested service.

15. The method of claim 11, further comprising:

receiving a relay request message at the VPN control computing platform from at least one of the first teleworker computing subsystem, the second teleworker computing subsystem, and the office computing subsystem, wherein the relay request message includes identification and authentication data associated with the corresponding computing subsystem and a request for a relay service to internally connect a first VPN tunnel between the corresponding computing subsystem and the VPN control computing platform to a second VPN tunnel between the VPN control computing platform and a select destination computing subsystem, wherein the select destination computing subsystem is another VPN end node;

comparing the relay service in the relay request message with local service parameters retrieved from the hub node profile to confirm the relay service is available; and comparing the identification and authentication data in the relay request message to the identification and authentication parameters and local service parameters retrieved from the hub node profile to confirm the corresponding computing subsystem is authorized to access the VPN control computing platform and authorized to use the relay service.

16. The method of claim 11, further comprising:

measuring health and operating characteristics at the first teleworker computing subsystem in accordance with local measurement parameters retrieved from the first end node profile, wherein the local measurement parameters identify health and operating characteristics to be measured by the first teleworker computing subsystem;

comparing the local measurements of the health and operating characteristics to local measurement parameters retrieved from the first end node profile to identify acceptable characteristics, degraded characteristics, and failed characteristics, wherein the local measurement parameters include threshold values associated with acceptable, degraded, and failed health and operating characteristics;

determining a local parameter update to the first end node profile based at least in part on the local measurements for degraded and failed characteristics; and updating the first end node profile stored at the first teleworker computing subsystem based on the local parameter update to form an updated first end node profile.

17. The method of claim 11, further comprising:

sending a service request message from the first teleworker computing subsystem to the office computing subsystem based on remote service parameters retrieved from the first end node profile, wherein the service request message includes identification and authentication data associated with the first teleworker computing subsystem based on identification and authentication parameters stored in the first end node profile, wherein the service request message includes a requested service based on remote service parameters stored in the first end node profile identifying remote services hosted by the office computing subsystem.

18. The method of claim 11, further comprising:

sending a relay request message from the first teleworker computing subsystem to the VPN control computing platform, wherein the relay request message includes identification and authentication data associated with the first teleworker computing subsystem and a request for a relay service to internally connect a first VPN tunnel between the first teleworker computing subsystem and the VPN control computing platform to a second VPN tunnel between the VPN control computing platform and a select destination computing subsystem, wherein the select destination computing subsystem is another VPN end node.

19. The method of claim 11, further comprising:

measuring health and operating characteristics at the office computing subsystem in accordance with local measurement parameters retrieved from the third end node profile, wherein the local measurement parameters identify health and operating characteristics to be measured by the office computing subsystem;

comparing the local measurements of the health and operating characteristics to local measurement parameters retrieved from the third end node profile to identify acceptable characteristics, degraded characteristics, and failed characteristics, wherein the local measurement parameters include threshold values associated with acceptable, degraded, and failed health and operating characteristics;

determining a local parameter update to the third end node profile based at least in part on the local measurements for degraded and failed characteristics; and updating the third end node profile stored at the office computing subsystem based on the local parameter update to form an updated third end node profile.

20. The method of claim 11, further comprising:

receiving a service request message at the office computing subsystem from at least one of the first teleworker computing subsystem and the second teleworker computing subsystem, wherein the service request message includes identification and authentication data associated with the corresponding computing subsystem and a requested service;

comparing the requested service in the service request message with local service parameters retrieved from the third end node profile to confirm the requested service is available; and comparing the identification and authentication data in the service request message to the identification and authentication parameters and local service parameters retrieved from the third end node profile to confirm the corresponding computing subsystem is authorized to access the office computing subsystem and authorized to use the requested service.

21. The method of claim 11, further comprising:

sending a relay request message from the office computing subsystem to the VPN control computing platform, wherein the relay request message includes identification and authentication data associated with the office computing subsystem and a request for a relay service to internally connect a first VPN tunnel between the office computing subsystem and the VPN control computing platform to a second VPN tunnel from the VPN control computing platform to a select destination computing subsystem in the mesh VPN, wherein the select destination computing subsystem is another VPN end node.

* * * * *

UNITED STATES PATENT AND TRADEMARK OFFICE
CERTIFICATE OF CORRECTION

PATENT NO. : 11,582,196 B2
APPLICATION NO. : 17/379006
DATED : February 14, 2023
INVENTOR(S) : Olson et al.

It is certified that error appears in the above-identified patent and that said Letters Patent is hereby corrected as shown below:

In the Specification

Column 6, Line 26 replace "client endpoints 12 within the network 10." with --clients 12 within the WAN mesh VPN topology 10.--
Column 6, Line 29 replace "inside private remote networks 12." with --inside the clients 12.--
Column 6, Line 36 replace "office(s) 13" with --office(s)--
Column 6, Line 47-48 replace "between access points 18 and office locations 13." with --between the access points 18 and the spoke devices 13.--
Column 6, Line 52 replace "impacted network resources 19," with --impacted network resources,--
Column 6, Lines 62-63 replace "within the network 20." with --within the WAN mesh VPN 20.--
Column 7, Line 8 replace "within the network 20." with --within the WAN mesh VPN 20.--
Column 18, Lines 1-2 replace "the office computing subsystem 1330" with --networked peripheral devices 1330--
Column 29, Line 36 replace "at least one of the relay service" with --at least one of the relay services--
Column 29, Lines 52-53 replace "control tunnels 724" with --the communication path 724--
Column 35, Line 13 replace "the relay service" with --the relay services--
Column 35, Lines 50-51 replace "at least one of the relay service" with --at least one of the relay services--
Column 39, Line 22 replace "at least one of the requested service" with --at least one of the requested services--
Column 39, Line 55 replace "at least one of the requested service" with --at least one of the requested services--
Column 40, Line 26 replace "at least one of the requested service" with --at least one of the requested services--
Column 45, Lines 5-6 replace "at least one of the requested service" with --at least one of the requested services--
Column 45, Line 39 replace "at least one of the requested service" with --at least one of the requested services--

Signed and Sealed this
Eighteenth Day of April, 2023

Katherine Kelly Vidal
*Director of the United States Patent and Trademark Office*

CERTIFICATE OF CORRECTION (continued)
U.S. Pat. No. 11,582,196 B2

Column 46, Line 4 replace "at least one of the requested service" with --at least one of the requested services--

Column 46, Lines 40-41 replace "at least one of the relay service" with --at least one of the relay services--

Column 47, Line 18 replace "at least one of the relay service" with --at least one of the relay services--

In the Claims

Column 50, Line 31 replace "The method of claim 1" with --The system of claim 1--